(12) United States Patent
Golitschek Edler Von Elbwart et al.

(10) Patent No.: US 7,965,793 B2
(45) Date of Patent: Jun. 21, 2011

(54) METHOD FOR REDUCING AMBIGUITY LEVELS OF TRANSMITTED SYMBOLS

(75) Inventors: Alexander Golitschek Edler Von Elbwart, Darmstadt (DE); Christian Wengerter, Kleinheubach (DE); Isamu Yoshii, Langen (DE)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 11/718,500

(22) PCT Filed: Sep. 30, 2005

(86) PCT No.: PCT/EP2005/010602
§ 371 (c)(1),
(2), (4) Date: Oct. 23, 2007

(87) PCT Pub. No.: WO2006/048090
PCT Pub. Date: May 11, 2006

(65) Prior Publication Data
US 2009/0034635 A1    Feb. 5, 2009

(30) Foreign Application Priority Data

| Nov. 3, 2004 | (EP) | .................................... 04026071 |
| Nov. 3, 2004 | (EP) | .................................... 04026082 |
| Jul. 20, 2005 | (WO) | ................. PCT/EP2005/007928 |
| Jul. 20, 2005 | (WO) | ................. PCT/EP2005/007929 |
| Jul. 25, 2005 | (WO) | ................. PCT/EP2005/008081 |

(51) Int. Cl.
*H04L 27/20* (2006.01)

(52) U.S. Cl. ......... 375/308; 375/260; 375/295; 375/341
(58) Field of Classification Search .................. 375/260, 375/295, 341, 308
See application file for complete search history.

(56) References Cited

U.S. PATENT DOCUMENTS

| 6,101,168 | A | 8/2000 | Chen et al. |
| 6,226,337 | B1 | 5/2001 | Klank et al. |
| 2002/0114270 | A1* | 8/2002 | Pierzga et al. ................ 370/208 |
| 2003/0072286 | A1 | 4/2003 | Kim et al. |
| 2004/0042565 | A1* | 3/2004 | Garrett .......................... 375/341 |
| 2004/0148552 | A1 | 7/2004 | Matsumoto et al. |

FOREIGN PATENT DOCUMENTS

| DE | 10156822 | 5/2003 |
| EP | 1179905 | 2/2002 |

(Continued)

OTHER PUBLICATIONS

International Search Report in PCT/EP2005/010602 dated Mar. 29, 2006.

(Continued)

Primary Examiner — Shuwang Liu
Assistant Examiner — Michael R Neff
(74) Attorney, Agent, or Firm — Dickinson Wright PLLC

(57) ABSTRACT

The present invention is directed to a transmitter and method for transmitting data in a digital communication system, the method comprising generating an original symbol by mapping the bits of the original bit sequence using a modulation constellation, generating at least one counter part symbol from the original symbol or from at least one counter part bit sequence generated from the original bit sequence where a combination of the original symbol and the at least one counter part symbol forms a quasi pilot symbol.

26 Claims, 60 Drawing Sheets

FOREIGN PATENT DOCUMENTS

| | | |
|---|---|---|
| EP | 1293059 | 3/2003 |
| WO | 02067491 | 8/2002 |
| WO | 03019794 | 3/2003 |
| WO | 2004036817 | 4/2004 |
| WO | 2004036818 | 4/2004 |

OTHER PUBLICATIONS

International Search Report dated Oct. 6, 2005.
International Search Report dated Nov. 21, 2005.
International Search Report dated Dec. 19, 2005.
European Search Report dated Apr. 15, 2005.
European Search Report dated Apr. 19, 2005.
M. Dottling et al., "Incremental Redundancy and Bit-Mapping Techniques for High Speed Downlink Packet Access," Globecom' 03, 2003—IEEE Global Telecommunications Conference, Conference Proceedings, San Francisco, Dec. 1-5, 2003, IEEE Global Telecommunications Conference, New York, NY, IEEE, US, vol. 7 of 7, XP010678454, pp. 908-912, Dec. 1, 2003.
Morelos-Zaragoza, et al., "Multilevel Coded Modulation for Unequal Error Protection and Multistage Decoding-Part 1: Symmetric Constellations," IEEE Transactions on Communications, IEEE Inc., New York, US, vol. 48, No. 2, XP000930507, pp. 204-212, Feb. 2000.
L. Lampe et al.: "Iterative Decision-Feedback Differentials Demodulation of Bit-Interleaved Coded MDPSK for Flat Rayleigh Fading Channels," IEEE Transactions on Communications, vol. 49, No. 7, Jul. 2001, pp. 1176-1184.

* cited by examiner

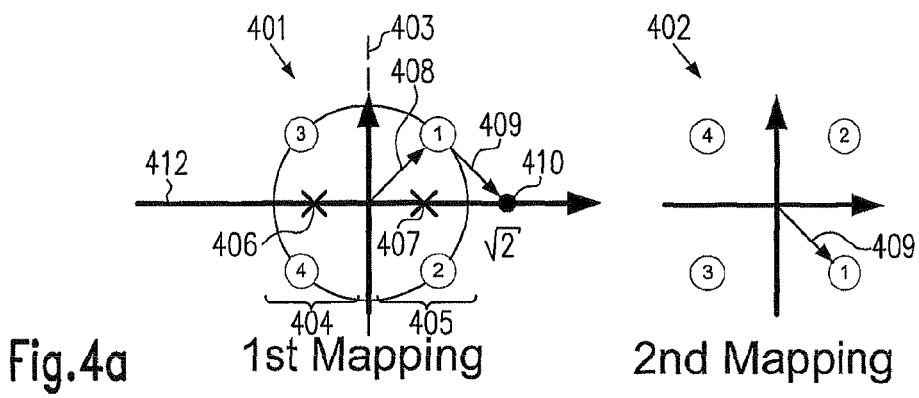
Fig.4a  1st Mapping    2nd Mapping
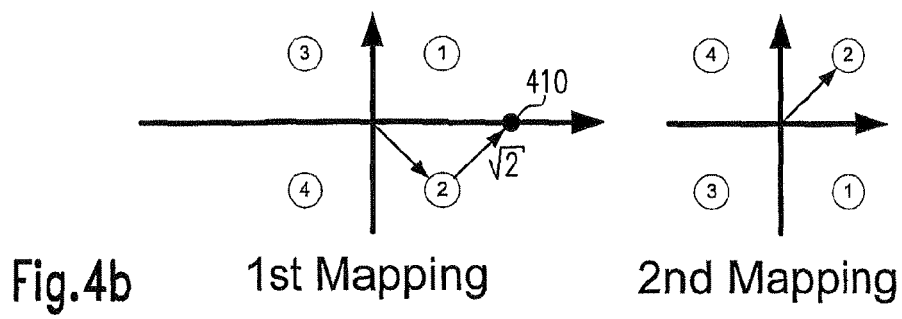
Fig.4b  1st Mapping    2nd Mapping
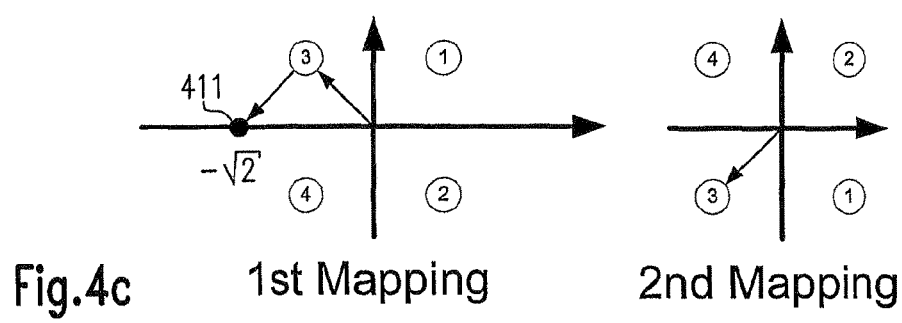
Fig.4c  1st Mapping    2nd Mapping
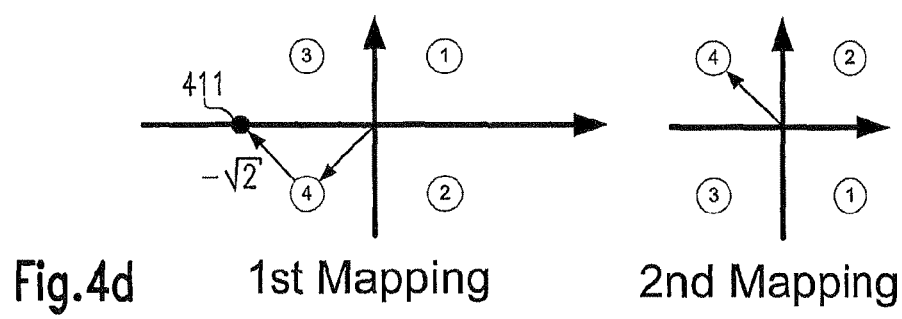
Fig.4d  1st Mapping    2nd Mapping

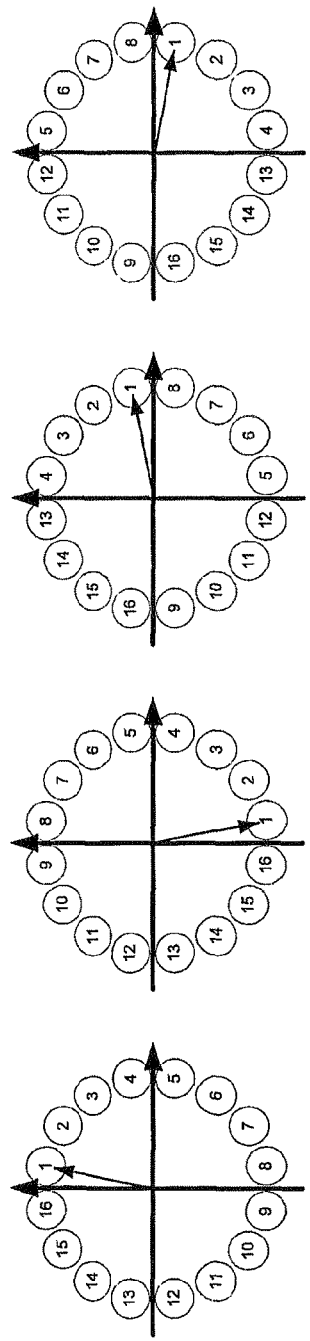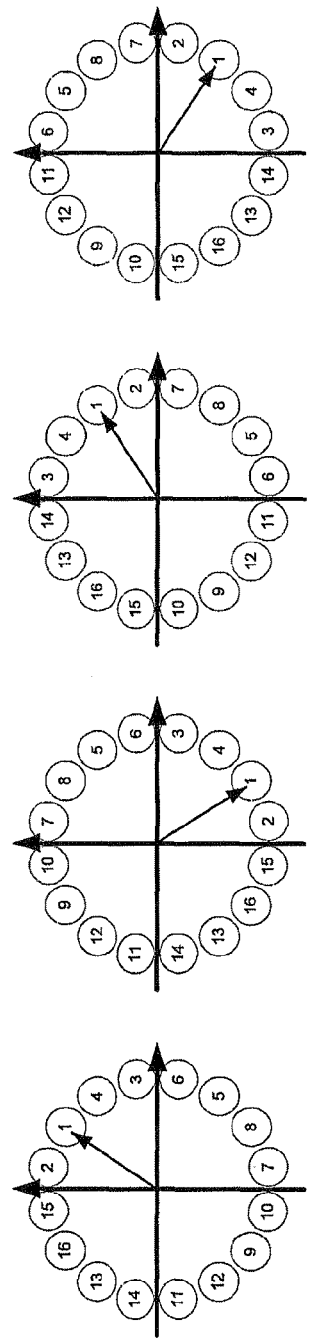
Fig.9

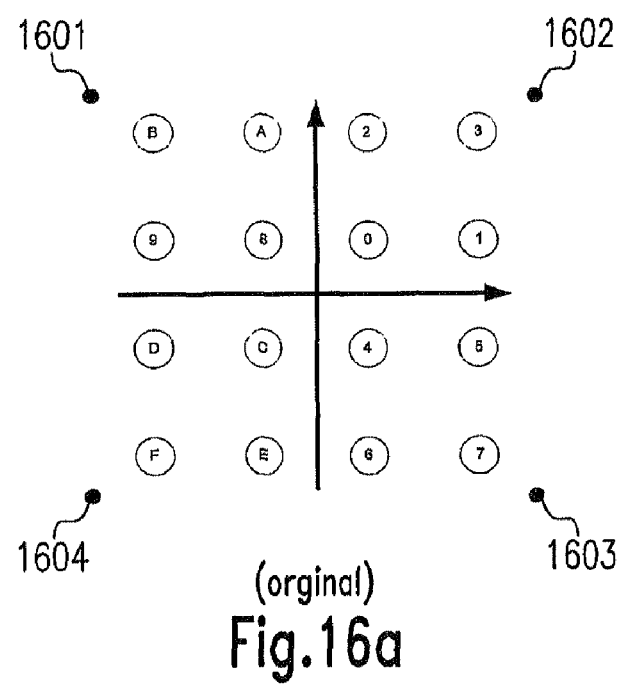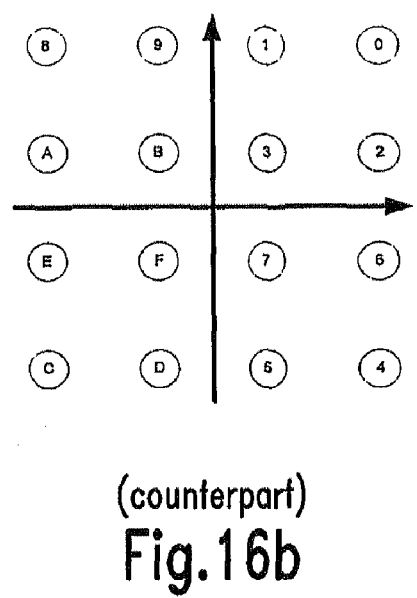
(orginal)
Fig.16a
(counterpart)
Fig.16b

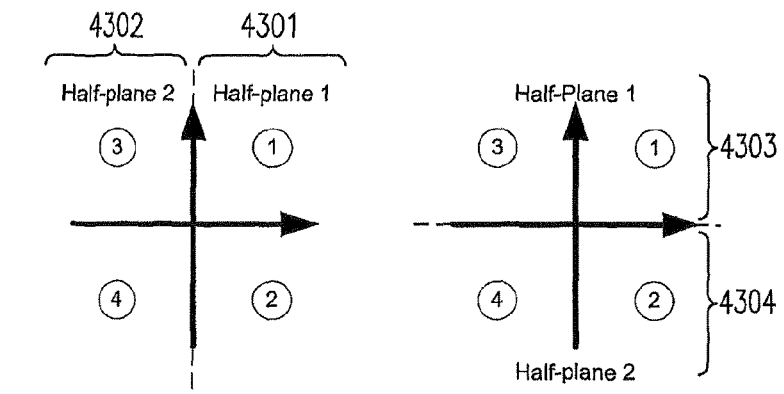
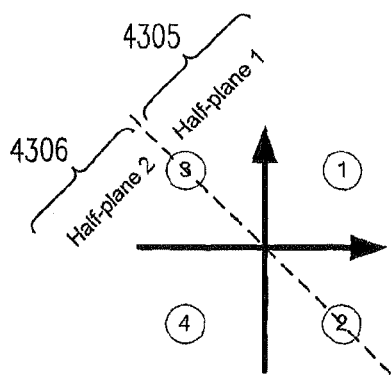
Fig.43
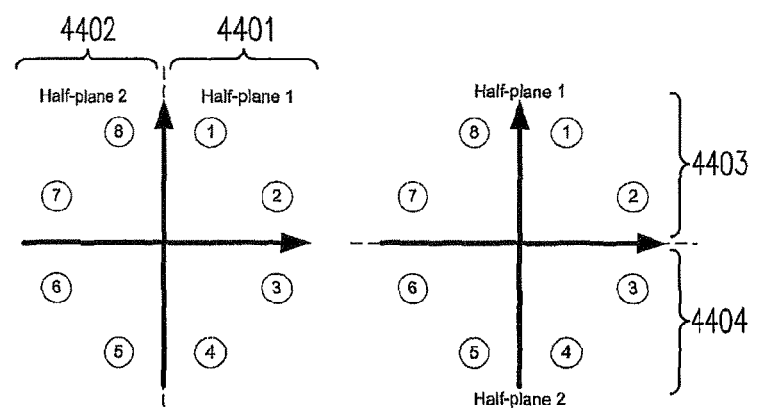
Fig.44
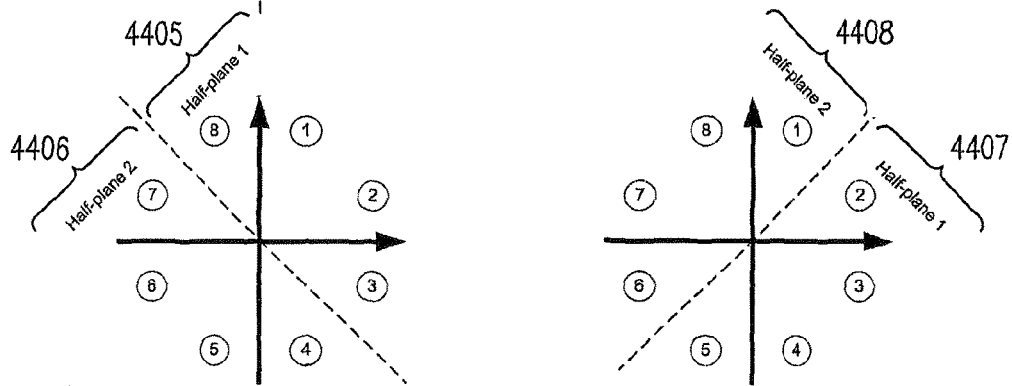

$$\begin{pmatrix} c_1 \\ c_2 \\ c_3 \\ c_4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$
Element-wise multiplication with spreading code $c_2$
Fig. 57

$$\begin{pmatrix} c_1 \\ c_2 \\ c_3 \\ c_4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$
Quasi-pilot-wise multiplication with spreading code $c_2$
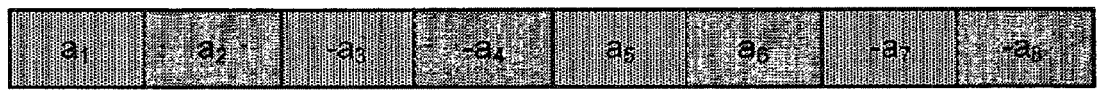
Fig. 58

$$\begin{pmatrix} c_1 \\ c_2 \\ c_3 \\ c_4 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$
Element-wise spreading with spreading code $c_2$
Fig. 59

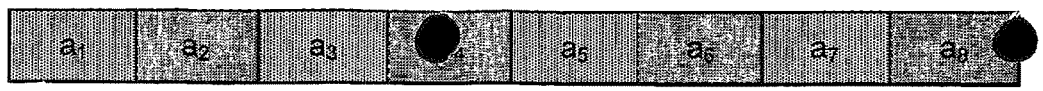
Phase shift 45°
= multiplication by
$e^{j\pi/4}$
Fig. 61

METHOD FOR REDUCING AMBIGUITY LEVELS OF TRANSMITTED SYMBOLS

BACKGROUND OF THE INVENTION

1. Field of the Invention

The invention relates to digital communication systems. It is particularly applicable to communication systems where data is transmitted over a time-variant or frequency-variant channel, such as in mobile communication systems or satellite communication. It is particularly applicable to communication systems where data is transmitted over a channel that suffers from noise or interference effects.

2. Description of the Related Art

For transmission over long distances or wireless links, digital data is modulated onto one or more carriers. Various modulation schemes are known in prior art, such as amplitude shift keying (ASK), phase shift keying (PSK) and mixed amplitude and phase modulation like quadrature amplitude modulation, QAM. In all mentioned modulation types, the modulated signal, in terms of for example voltage or field strength, can be expressed by $$u(t) = Re(\underline{A} \cdot e^{j\omega t})$$

A bit sequence, or data word, is represented by a symbol which has a complex value $\underline{A}$ for a certain time interval (symbol duration), wherein $$|\underline{A}| = \sqrt{(Re(\underline{A}))^2 + (Im(\underline{A}))^2}$$

represents the momentary amplitude of the modulated signal and $$\varphi(\underline{A}) = \arctan(Im(\underline{A})/Re(\underline{A}))$$

represents the momentary phase of the modulated signal. The assignment between bit value combinations and complex values (modulation states) is called mapping. Generally a data word consisting of a b-bit bit sequence results in a mapping of $2^b$ bit sequences to $2^b$ complex values.

As real transmission channels distort the modulated signal by phase shift and attenuation, and as they add noise to the signal, errors occur in the received data after demodulation. The probability for errors usually rises with rising data rate, that is with rising number of modulation states and falling symbol duration. To cope with such errors, redundancy can be added to the data, which allows to recognise and to correct erroneous symbols. A more economic approach is given by methods which repeat only the transmission of data in which un-correctable errors have occurred, such as hybrid automatic repeat request, HARQ, and incremental redundancy.

In a basic approach to transmit repeated data in prior art, the same mapping as applied in the first transmission is re-used for re-transmission. Thus the complex value representing the repeated data word is identical to that of the original data word. This will be referred to as "Simple Mapping".

EP 1 293 059 B1 shows a method to rearrange digital modulation symbols in order to improve the mean reliabilities of all bits. This is achievable by changing the mapping rule of bits onto modulation symbols. This patent focuses on the rearrangement for retransmitted data words in an ARQ system.

WO 2004 036 817 and WO 2004 036 818 describe how to achieve the reliability averaging effect for a system where an original and a repeated data word are transmitted over different diversity branches, or in combination with an ARQ system.

The methods and mechanisms of the patent publications cited above will be referred to as "Constellation Rearrangement" or "CoRe" for simplicity.

A major difference between wired communication systems and wireless communication systems is the behaviour of the physical channel over which information is transmitted. The wireless or mobile channel is by its very nature variant over time and/or frequency. For a good performance in most modern mobile communication systems a demodulation of data symbols in a receiver requires an accurate estimation of the channel, usually measured by a channel coefficient, which includes knowledge about the gain, the phase shift, or both properties of the channel. To facilitate this, usually some sort of pilot symbols are inserted into or between the data symbol stream, which have a predetermined unambiguous amplitude and/or phase value which can be used to determine the channel coefficient. This information is then used for correction measures like adaptive filtering.

A communication channel may also suffer from noise or interference effects. These effects also influence the transmission of such pilot symbols. Even if the channel does not change its amplitude and phase characteristic, a receiver may make an erroneous estimation of the channel due to noise or interference. For simplicity the present document is referring to noise and interference effects just as noise; it will be apparent to those skilled in the art that the statements included hereafter about noise are mutatis mutandis applicable to interference.

"Decision-Feedback Demodulation" is an iterative process where a first rough channel estimate (or none at all) is used to demodulate the data symbols. After demodulation, and preferably after decoding, the obtained information is fed back to the channel estimator for an improved estimation resulting from the data symbols. It should be apparent that this process causes not only delay and requires a lot of computations in each iteration step, but it also depends greatly on the quality of the first rough channel estimate due to the feedback loop. Such procedure is known for example from Lutz H.-J. Lampe and Robert Schober, "Iterative Decision-Feedback Differential Demodulation of Bit-Interleaved Coded MDPSK for Flat Rayleigh Fading Channels" in IEEE Transactions on Communications, Volume: 49, Issue: 7, July 2001, Pages:1176-1184.

Usually the data symbols themselves cannot be accurately used for channel estimation, since the amplitude and/or phase are not known a priori to demodulation. The receiver has to conclude on a sent symbol based on the received signal, before channel estimation is possible. As the recognition of the symbol might be erroneous, ambiguity is introduced to the channel estimation. This behaviour can be seen from FIG. 1 and is further detailed in Table 1 to show the number of ambiguities involved in different digital modulation schemes.

TABLE 1

Properties of selected digital modulation methods

| Modulation Scheme | Bits per Symbol | Amplitude Ambiguity | Phase Ambiguity |
|---|---|---|---|
| BPSK | 1 | None/1 Level | 2 Levels |
| QPSK | 2 | None/1 Level | 4 Levels |
| 8-PSK | 3 | None/1 Level | 8 Levels |
| 2-ASK/4-PSK | 3 | 2 Levels | 4 Levels |
| 4-ASK/2-PSK | 3 | 4 Levels | 2 Levels |
| 8-ASK | 3 | 8 Levels | None/1 Level |
| 16-PSK | 4 | None/1 Level | 16 Levels |
| 16-QAM | 4 | 3 Levels | 12 Levels |
| 4-ASK/4-PSK | 4 | 4 Levels | 4 Levels |
| 64-QAM | 6 | 9 Levels | 52 Levels |

From Table 1 it follows also easily that the performance of an iterative decision-feedback demodulation scheme will further depend greatly on the number of ambiguities involved in the modulation scheme. A wrong assumption about the sent symbol leads to a wrong result of the channel estimation. Especially in modulation schemes with a high number of modulation states there is a high probability of erroneous symbols due to inevitable noise. A wrong channel estimation, in turn, leads to wrong correction and consequently more errors in received symbols. Therefore there is a need in the related art for improved reliability of the channel estimation.

The above-mentioned prior art addresses only the aspect of averaging the mean bit reliabilities of bits that are mapped onto one digital symbol by rearranging the mappings or by bit operations prior to mapping. While this has a good effect if the time-/frequency-variant or noisy channel is known very accurately, it does not provide means to improve the knowledge of the time-/frequency-variant channel at the receiver if the coherence time/frequency is relatively small compared to a data packet, nor means to improve the knowledge of a noisy channel at the receiver.

SUMMARY OF THE INVENTION

It is therefore the object of the present invention to provide a method which improves the reliability of the channel estimation in a digital transmission system.

It is a further object of the present invention to provide a transmitter for a digital communication system which enables improved reliability of the channel estimation.

It is a particular object of the present invention to completely remove phase ambiguity after combination of an original symbol with retransmitted symbols representing the same data.

This object is achieved by defining a special way of mapping repeated data words onto signal constellation points. A rearranged constellation pattern is selected that reduces the number of ambiguities when the original and the repeated data symbols are combined. That is, the number of different results that can be obtained by adding the complex values or vectors in the complex number plane representing the constellation points of a first transmission and of a re-transmission of the same data word is lower than the number of original constellation points or modulation states. The number of phase ambiguities is further reduced to one (i.e. phase ambiguity is completely removed) by using only a subset of all modulation states which are possible according to the employed modulation (mapping) scheme for the original and counterpart symbol. This subset is chosen such that the complex values (modulation states) representing all modulation symbols comprised in the subset are within one half-plane of the complex plane or within a sub-plane of said half-plane. For convenience and clarity, this subset is called "phase ambiguity one subset" or shortly "PAO subset".

Reducing amplitude ambiguities and removing phase ambiguities facilitates a better channel estimation, less dependent on or independent of the actual data symbol transmitted.

To achieve a reduced number of amplitude ambiguities:
1. Determine the amplitude and phase values for each constellation point of the original constellation. This may be represented by a complex value.
2. For each constellation point of the original constellation, determine one or more complex counterpart(s) such that
   a. The coherent combination of original complex value and counterpart complex value(s) for all data words results in a reduced number of amplitude levels compared to the original constellations
   b. The average transmit power of the counterpart constellation(s) is identical to the average transmit power of the original constellation (optional).

To remove phase ambiguities proceed as follows:
1. Determine the amplitude and phase values for each constellation point of the original constellation. This can be represented by a complex value.
2. For each constellation point of the original constellation, determine one or more complex counterpart(s) such that
   a. the coherent combination of original complex value and counterpart complex value(s) for each one or at least a part of all data words results in a reduced number of phase levels compared to the original constellations;
   b. the average transmit power of the counterpart constellation(s) is identical to the average transmit power of the original constellation (optional).
3. Select a PAO subset of modulation symbols (constellation points) from the original constellation to be used for transmission, such that the complex values representing all modulation symbols comprised within the PAO subset are within one half-plane of the complex plane, where the boundary of the half-plane passes through the complex origin 0+j0, and for each symbol within the PAO subset the respective complex values of the counterpart(s) according to item 2 is (are) comprised within the same half-plane.

Step b is optional in both cases, as it is not required for the reduction of ambiguity. However it provides the advantage of uniform transmission power on the channel over transmitted and re-transmitted signals.

It should be noted that of course there is a one-to-one correspondence for each data word between the original constellation and a counterpart constellation. Therefore the relation between constellation points in the original constellation and each counterpart constellation is unambiguous, but may be arbitrary. Furthermore, all counterpart constellations have the same number of constellation points (distinct modulation states, different assigned complex values) as the original constellation.

The counterpart constellation(s) can be generated and the PAO subset can be selected by the following method:
1. Divide the complex plane into two non-overlapping adjacent sub-planes that each contain half of the constellation points.
2. For each sub-plane, obtain an average complex value point of all constellation points in that sub-plane.
3. For each sub-plane, obtain a counterpart constellation by approximately mirroring the constellation points of each sub-plane on the average complex value point.
4. Choose the symbols within one of the two sub-planes as the PAO subset of symbols to be used for transmission.

Step 4 is not required if all available modulation states of the modulation scheme are already at least within a half-plane of the complex plane. This is for example the case with pure amplitude modulation like the 8-ASK shown in FIG. 1.

As each system adds noise and distortion to transmitted signals anyway, it is preferable, but not required, that the mentioned mirroring is mathematically exact. An approximate mirroring would be sufficient in a real system. Approximate means that the distance between the actual constellation point and the ideal mirrored position is less than half the distance to the closest constellation point representing a different value of the data word. Such approximate mirroring may be beneficially employed in a fixed-point representation of the complex values, where the mathematically exact solution cannot be represented due the reduced accuracy of fixed-point numbers.

If the condition of constant average transmit power is not required, the following, more general method may be applied:
1. Divide the complex plane into two non-overlapping adjacent sub-planes that each contain half of the constellation points.
2. For each sub-plane, obtain a symmetry axis with respect to at least some of the constellation points in that sub-plane.
3. For each sub-plane, obtain a counterpart constellation by approximately mirroring the constellation points of each sub-plane on one pre-defined point on the symmetry axis in that sub-plane.
4. Choose one of the two sub-planes as the PAO subset of symbols to be used for transmission.

Again step 4 is not required if all available modulation states of the modulation scheme are already at least within a half-plane of the complex plane.

It will be appreciated by those skilled in the art that these steps require very simple geometrical or calculus skills.

It should be noted that for constellations that are symmetrical to at least one arbitrary axis in the complex plane, preferably a division into two half-planes is done with respect to such a symmetry axis that does not include any signal point. For constellations that are symmetrical to the real or imaginary axis, that respective axis is used; otherwise the symmetry axis will be tilted.

It should be apparent that this method may result in counterpart constellations that are different in shape than the original constellation if the constellation is not point-symmetric to the mirroring point within each sub-plane. This is particularly true if the original constellation represents a PSK or any mixed ASK/PSK modulation apart from QAM. Keeping the shape of the original constellation may have advantages in the implementation of the demodulator (LLR calculator) of the receiver, which will not be discussed in further detail herein.

To keep the same shape for the counterpart constellations as for the original constellation, step 1 to step 4 of the counterpart constellation generation should then be altered as follows:
1. Divide the complex plane into two non-overlapping adjacent sub-planes that each contain half of the constellation points.
2. Create counterpart constellations such that the number of counterpart constellations is one less than the number of constellation points in a sub-plane.
3. For each sub-plane in each counterpart constellation, permute the mapping of data words onto constellation points such that in original and counterpart constellations, each data word is mapped only and exactly once on each of the constellation points.
4. Choose one of the two sub-planes as the PAO subset of symbols to be used for transmission.

It may be noted that for identical shapes of original and counterpart constellations, the complex values representing the symbols contained in said PAO subset of the original constellation are identical to the complex values representing the symbols that are within the same half-plane of the counterpart constellation.

For certain modulation schemes, a reduction of both amplitude and phase ambiguities at the same time is not necessarily required for demodulation. For example in PSK schemes all data information is contained in the phase angle of the modulation symbol, the amplitude is quite irrelevant. For PSK the following procedure may be applied to obtain a counterpart constellation which removes phase ambiguities:

1. Divide the complex plane into two non-overlapping adjacent sub-planes that each contain the same number of constellation points.
2. For each sub-plane, determine a symmetry axis with respect to the position of at least a part of the constellation points within this sub-plane.
3. Obtain a counterpart constellation by mirroring the constellation points of each sub-plane on the symmetry axis of this sub-plane.
4. Choose one of the two sub-planes as the PAO subset of symbols to be used for transmission.

The mapping of a word using the original constellation, i.e. the mapping of a data word onto a complex value according to the original constellation, results in the original constellation symbol or simply original symbol. Similarly the mapping of a data word using a counterpart constellation, i.e. the mapping of a data word onto a complex value according to a counterpart constellation, results in the counterpart constellation symbol or simply counterpart symbol.

In an alternative of the present invention, the object is achieved by using an identical mapping of pluralities of bits (constituting the data words) to modulation symbols, and using pre-determined bit manipulations on each plurality of bits for the retransmission(s). In an analogous way, the selection of a PAO subset of the symbols to be used for transmission is done by replacing at least one of the bits within a word (plurality of bits) mapped to a modulation symbol, by a fixed value, e.g. 0 or 1.

According to one aspect of the present invention, a method for transmitting data in a digital communication system comprises a) selecting a subset of all available modulation states in a pre-determined modulation scheme, to be used for transmission; b) a first transmission step transmitting a first symbol representing a first plurality of bits, the symbol having a first modulation state comprised in said subset; and c) at least one further transmission step (1206) transmitting further symbols representing the first plurality of bits, each of the further symbols having a further modulation state comprised in said subset. The addition of complex values associated with said first and said further modulation states yields, for each combination of bit values within the plurality of bits, the same phase of the complex result.

According to a further aspect of the present invention, a computer-readable storage medium has stored thereon program instructions that, when executed in a processor of a transmitter of a digital communication system, cause the transmitter to perform the method according to the first aspect.

According to still another aspect of the present invention, a transmitter for a digital communication system is configured to perform the method of the first aspect.

According to still a further aspect of the present invention, a base station for a mobile communication system comprises the transmitter according to the preceding aspect.

According to still a further aspect of the present invention, a mobile station for a mobile communication system comprises the transmitter defined in the aspect further above.

According to still another aspect of the present invention, a method for receiving data in a digital communication system, comprises a) first and second reception steps receiving a first and a second symbol, both representing a first plurality of bits; b) a likelihood calculation step of calculating likelihood values from the received first and second symbol for at least a subset of the first plurality of bits; and c) a step of setting likelihood values for at least one pre-determined bit out of said first plurality of bits to a value indicating an unknown bit value.

According to a further aspect of the present invention, a computer-readable storage medium has stored thereon program instructions that, when executed in a processor of a receiver of a digital communication system, cause the receiver to perform the method according to perform the method of the preceding aspect.

According to still another aspect of the present invention, a receiver for a digital communication system is configured to perform the method of the aspect further above.

According to still a further aspect of the present invention, a base station for a mobile communication system comprises the receiver as defined above.

According to still a further aspect of the present invention, a mobile station for a mobile communication system comprises the receiver as defined above.

Another aspect of the present invention is directed to a transmitter and method for transmitting data in a digital communication system, the method comprising a first transmission step transmitting a first symbol representing a first plurality of bits, the symbol having a first modulation state and at least one further transmission step transmitting further symbols representing the first plurality of bits, each of the further symbols having a further modulation state, wherein a combination of at least one parameter of the first symbol with at least one parameter of one of the further symbols results in a smaller number of different possible resultant parameter states after combination than the number of different parameter states before combination.

Another aspect of the present invention is directed to a transmitter and method for transmitting data in a digital communication system, the method comprising generating an original symbol by mapping the bits of the original bit sequence using a modulation constellation, generating at least one counter part symbol from the original symbol or from at least one counter part bit sequence generated from the original bit sequence where a combination of the original symbol and the at least one counter part symbol forms a quasi pilot symbol.

Another aspect of the present invention is directed to a receiver and a method for receiving data in a digital communication system comprising reception of a first and at least one further symbol, obtaining at least one combination of at least one parameter of the first symbol with at least one parameter of the at least one further symbols using the at least one combination to obtain an estimation of a communication channel parameter.

BRIEF DESCRIPTION OF THE DRAWINGS

The accompanying drawings are incorporated into and form a part of the specification for the purpose of explaining the principles of the invention. The drawings are not to be understood as limiting the invention to only the illustrated and described examples of how the invention can be made and used. Further features and advantages will become apparent from the following and more particular description of the invention, as illustrated in the accompanying drawings, wherein FIG. 1 gives an overview over various digital modulation mapping constellations;

FIG. 4 depicts the effect of the described method when applied to QPSK modulation;

FIG. 9 shows an example of eight mappings for 16-PSK modulation;

FIG. 16 shows an example for an original mapping and a counterpart mapping in 16-QAM yielding four different combination result values similar to QPSK modulation states;

FIG. 21 shows steps for determining bits to be replaced by a fixed value and bits to be inverted for re-transmission with ASK;

FIG. 23 shows steps for determining bits to be replaced by a fixed value and bits to be inverted for re-transmission with mixed ASK/PSK;

FIGS. 43 and 44 show examples of half-planes in QPSK and 8-PSK.

FIG. 57 shows the process of element-wise multiplication of quasi-pilot components with a spreading code.

FIG. 58 shows the process of quasi-pilot-wise multiplication of quasi-pilot symbols with a spreading code.

FIG. 59 illustrates the process of element-wise spreading of quasi-pilot components with a spreading code.

FIG. 61 shows the process of an element-wise constant phase shift of quasi-pilot components.

FIG. 65 illustrates the usage of different modulation schemes depending on whether Quasi-Pilot symbols or simple data symbols are used.

In all Figures that show mappings or constellations, a point is identified by a numeric label. It should be apparent to those skilled in the art that this labelling is meant to represent a given data word or bit sequence in the context of communication; the labels themselves are solely used to represent a fixed but arbitrary data word; sequential labels therefore do not have to represent sequential bit sequences in terms of their binary, octal, decimal, hexadecimal, or other numeric representation.

DETAILED DESCRIPTION OF THE INVENTION

Figure 1:
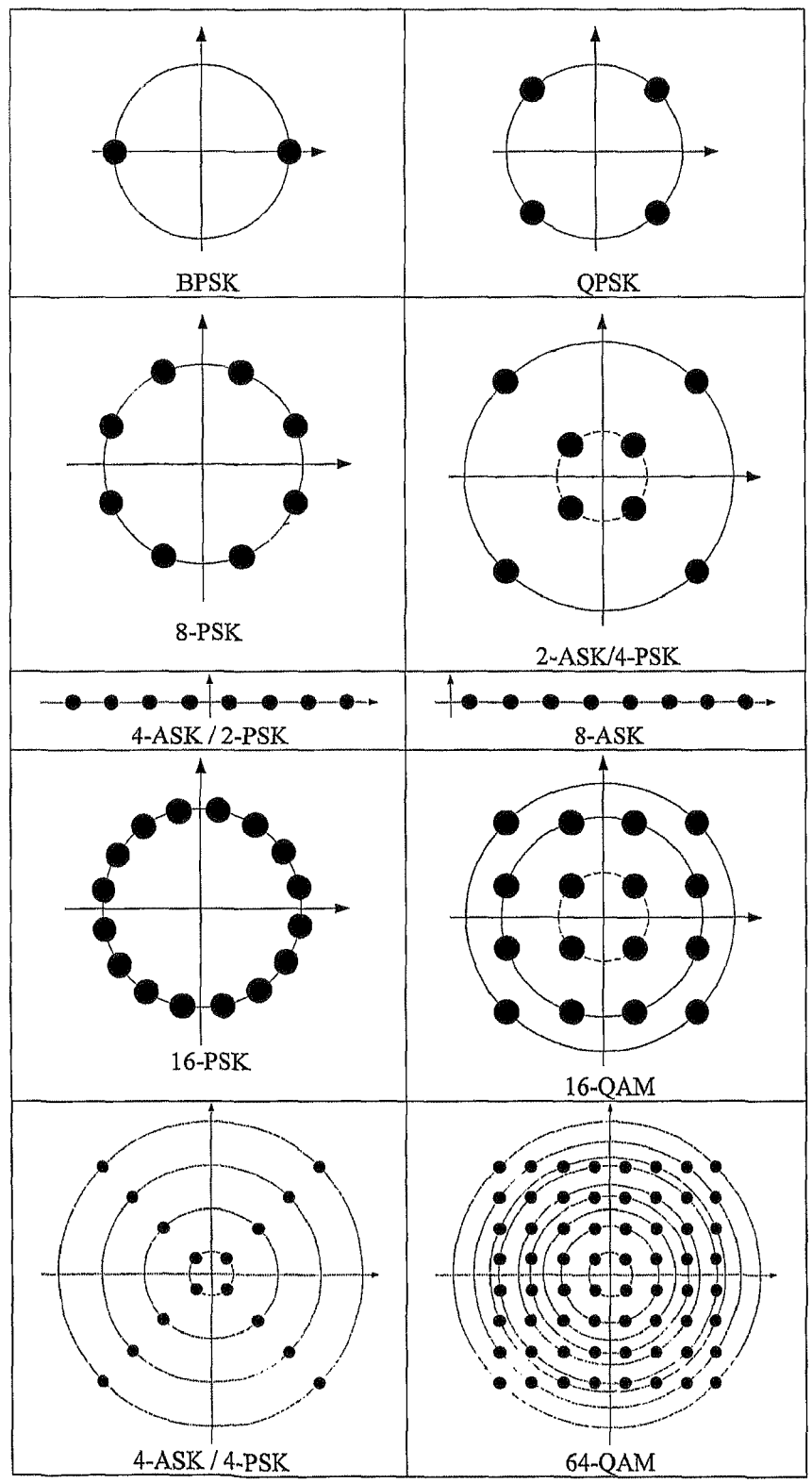
Figure 2:
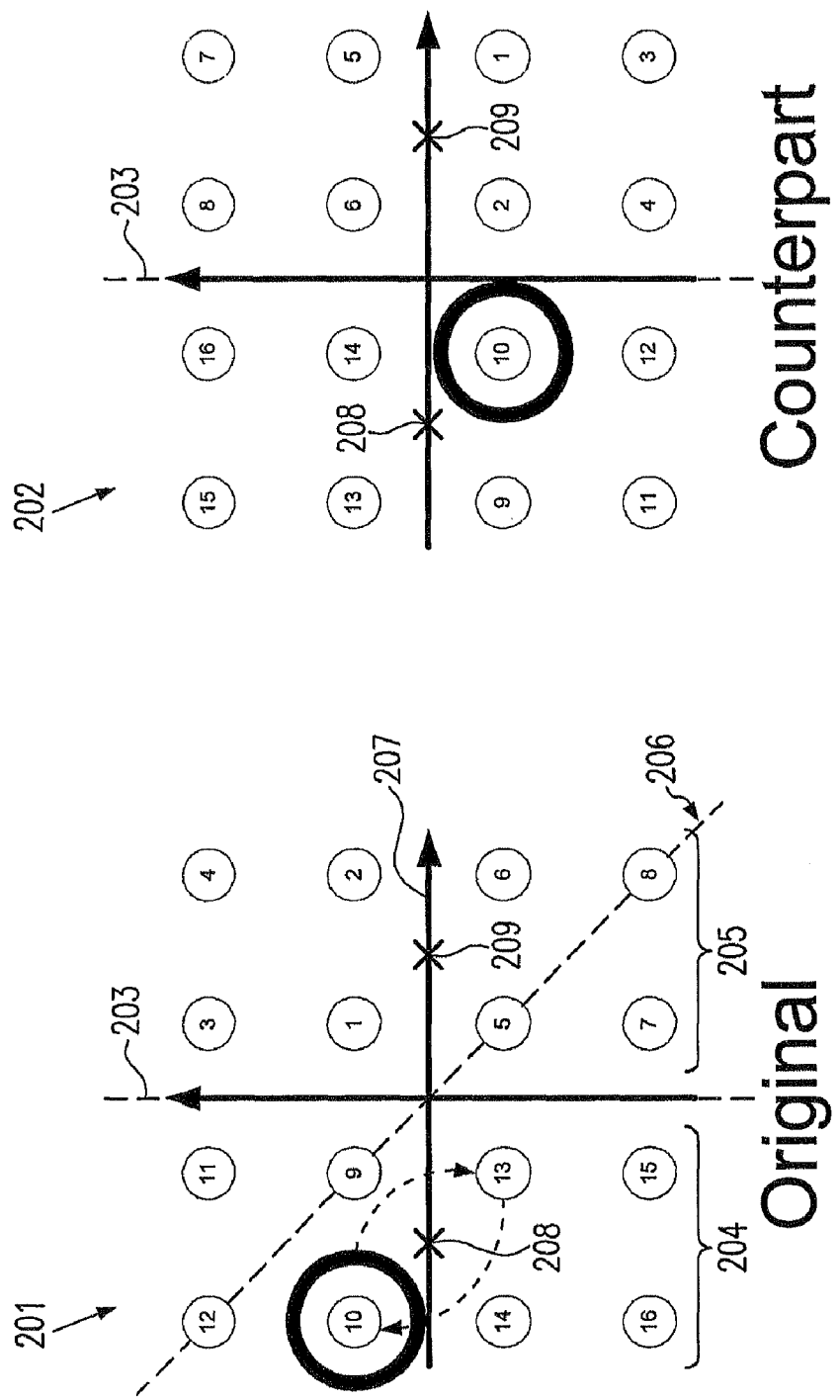
FIG. 2 illustrates an example of original and repeated data word location for data word no. 10 in 16-QAM.

FIG. 2 shows an example of a transmission using the 16-QAM modulation scheme. According to Table 1, such a data modulation symbol carries four bits. In the method described herein, these four bits are transmitted twice:

1. Using a first constellation mapping 201 for the original data word of four bits;
2. Using a second, different, constellation 202 for the repeated data word of four bits.

Without loss of generality we assume in the following that the average transmit power of a constellation is equal to 1. The values given in the figures refer to this situation. It should be apparent to those skilled in the art how to adjust the values properly if the average transmit power is different from 1. It is also obvious how to obtain transmit power values of digital modulation symbols such that the average transmit power of all digital modulation symbols is 1, or any other arbitrary value.

To obtain counterpart constellation 202 from original constellation 201, the complex plane is divided along imaginary axis 203 into two non-overlapping adjacent sub-planes 204 and 205. For the constellation in FIG. 2, the imaginary axis is a symmetry axis. Diagonal line 206 might also be used, but it is advantageous to select a parting line for both sub-planes, on which no constellation points are located. Next, symmetry axes for both sub-planes are determined. In the case of FIG. 2, the real axis 207 is a symmetry axis for both sub-planes. To obtain a reduced ambiguity after combining an original transmitted data word with its repeated version, the position of a constellation point in the counterpart constellation has to be mirrored with respect to a point 208, 209 on the symmetry axis, that is the real axis 207, from the original constellation point. According to the division into sub-planes 204 and 205, all constellation points belonging to sub-plane 204 have to be mirrored with respect to point 208, while all constellation points belonging to sub-plane 205 have to be mirrored with respect to point 209. In order to achieve identical average transmission power of transmission and re-transmission, this mirroring point 208, 209 should be equal to the average of all complex values in the respective sub-plane.

In FIG. 2, for word number 10 the modulation states or constellation points of the original mapping and the counterpart constellation are highlighted.

In order to remove phase ambiguities after combination of original and counterpart symbol completely, one of the sub-planes 204 and 205 is chosen as PAO subset to be used for the transmission. If sub-plane 204 is chosen, only constellation points (modulation states) 9-16 are used for both transmission and retransmission. Conversely, if sub-plane 205 is chosen as PAO subset, only constellation points 1-8 are used for both transmission and retransmission.

FIGS. 43 and 44 show examples of possible divisions of the complex plane into non-overlapping adjacent sub-planes (here half planes). Modulation states on one of the sub-planes 4301 or 4302, 4303 or 4304, 4401 or 4402, 4403 or 4404, 4405 or 4406, 4407 or 4408 could be chosen as the subset of modulation states to be used for the transmissions. Half planes 4305 or 4306 are not recommended, as there are modulation states on the line dividing the sub-planes.

As the PAO subset contains only some of the constellation points available in the original modulation scheme, data to be transmitted has to be adapted to the reduced channel capacity.

Assuming that the PAO subset contains exactly half of the constellation points available in the original modulation scheme, this can for example be done by
- distributing data bits on a higher number of modulation symbols (for example transmitting 3 words with 4 bits each on 4 symbols instead of 3) or
- puncturing one bit per transmitted symbol;
- alternatively, a higher order modulation scheme may be used, for example 32-QAM instead of 16-QAM.

Figure 3:
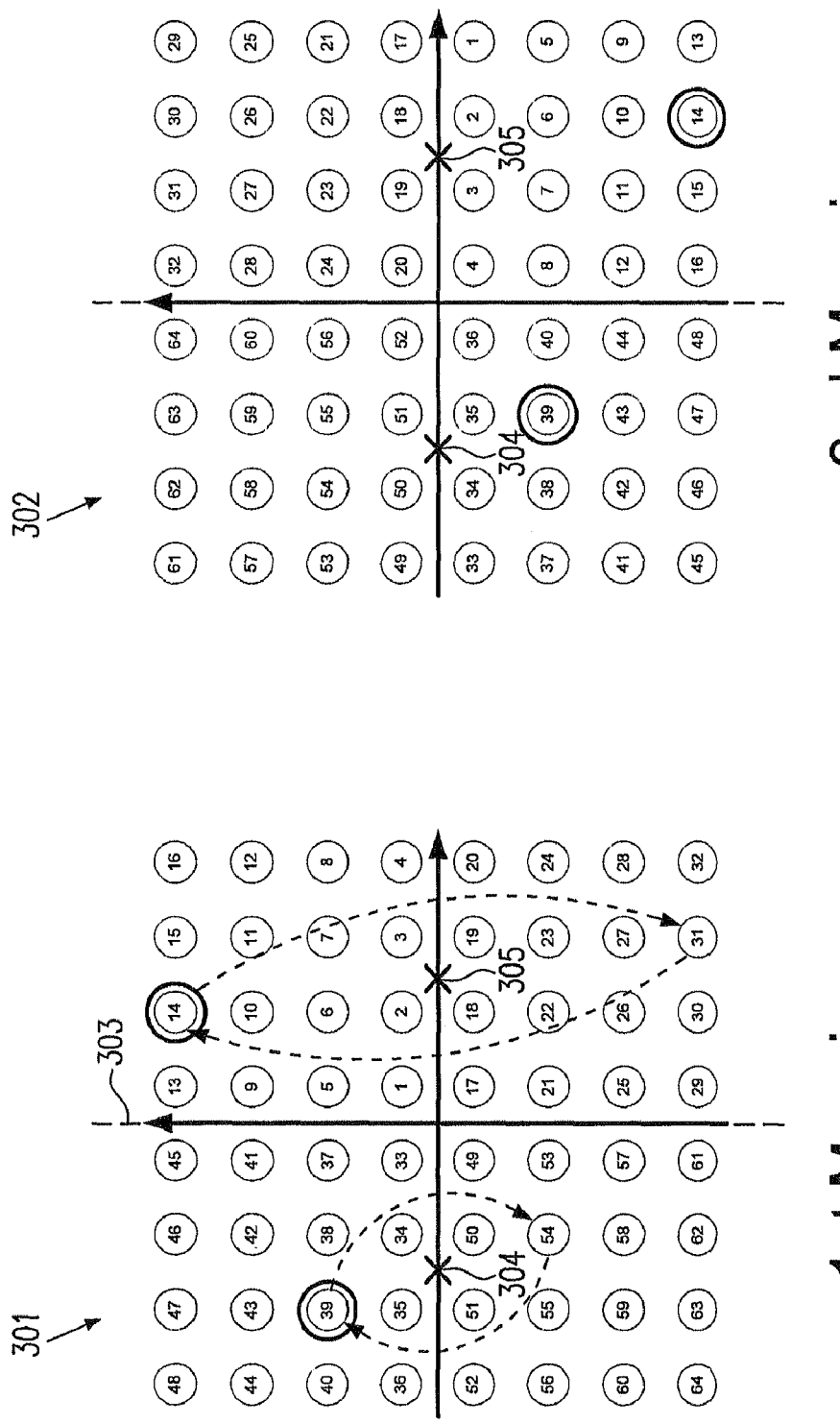
FIG. 3 illustrates an example of original and repeated data word location for data word no. 14 and 39 in 64-QAM.

FIG. 3 shows a first 301 and a further mapping 302 for 64-QAM. Here, again, the complex plane is divided into two non-overlapping adjacent sub-planes along the imaginary axis 303. Then for the second mapping, each constellation point is mirrored from its original position in the first constellation with regard to the average complex value 304, 305 in the same sub-plane, respectively according to the sub-plane to that a constellation point belongs. Either the right or the left half-plane is selected to be used for transmission, i.e. the PAO subset either comprises constellation points 1 to 32 or constellation points 33 to 64.

The result of combining original transmission and repeated (counterpart) transmission of the same arbitrary word is demonstrated in FIG. 4 for the example of QPSK. To obtain the second or further or counterpart mapping 402 from the first or original mapping 401, the complex plane is divided along imaginary axis 403 into two non-overlapping adjacent sub-planes 404 and 405. In each sub-plane, the constellation points are mirrored with regard to average values 406 and 407, respectively. The word number "1" is represented in the first mapping by vector 408 and in the second mapping by vector 409. As average carrier amplitude is defined to be 1, each vector has a length of 1. Coherent combining of the symbols is equivalent to the addition of both vectors which yields a real number 410 of √2. FIG. 4 b-d show the coherent combining for word numbers "2", "3" and "4" respectively. It appears that the number of ambiguities is reduced to one amplitude level and two phase levels 410 and 411, similar to a BPSK modulation. This allows to easily and unambiguously determine the attenuation of a transmission channel, and its phase shift between −π and +π. The reduction of used constellation points to either only "1" and "2" or only "3" and "4" results in a further reduction of possible combination results to either point 410 or point 411 alone, respectively.

The principle explained in conjunction with FIG. 4 for the example of QPSK can be applied in a similar way to all QAM constellations, whereby the coherent combining results in one single value, independent of the number of modulation states or constellation points.

Figure 5:
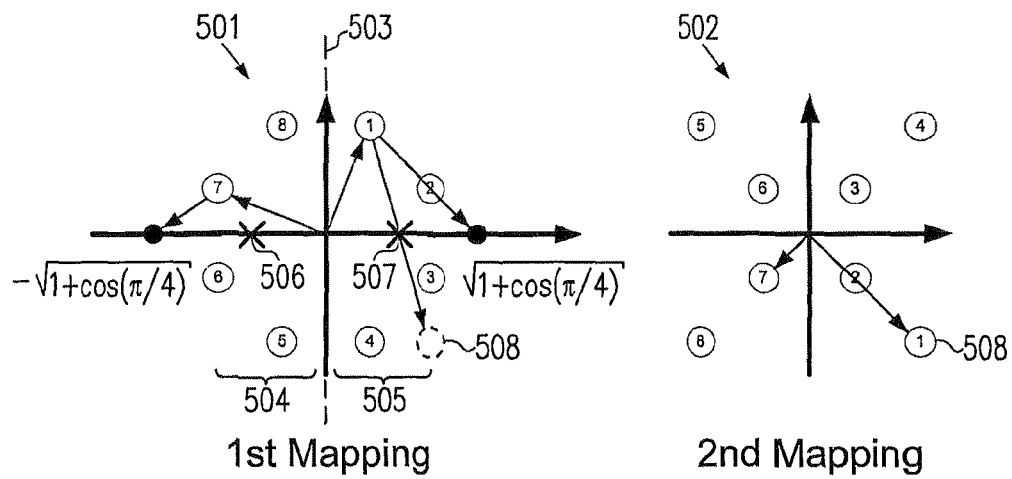
FIG. 5 illustrates an alternative example of two mappings for original 8-PSK modulation.

If it is not required to maintain the shape of the original constellation for the counterpart (or second or further) constellation, it is always possible to find a single counterpart constellation that fulfils the requirements of removing ambiguities completely. An example for this situation is shown in FIG. 5, where the original (first) mapping follows the 8-PSK scheme. To achieve the BPSK-equivalence after coherent combining of two mappings, the complex plane is divided along imaginary axis 503 into non-overlapping adjacent sub-planes 504 and 505. In each sub-plane each constellation point is mirrored with regard to average complex value 506 or 507, respectively. For example, the constellation point for the word number "1" is mirrored with respect to point 507 to position 508. The counterpart (second) mapping 502 results in a mixed ASK/PSK constellation. Again either sub-plane 504 (points 5-8) or sub-plane 505 (points 1-4) is chosen as PAO subset to be used for both transmission and retransmission to remove the remaining phase ambiguity of the BPSK-equivalence.

Figure 6:
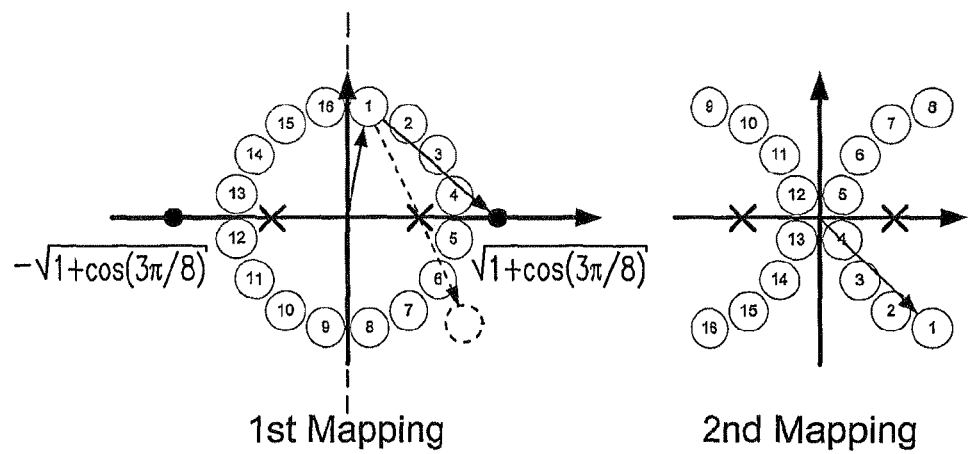
FIG. 6 shows an alternative example of two mappings for original 16-PSK modulation.

FIG. 6 shows a similar situation for the case that the original (first) mapping is a 16-PSK scheme. If the ambiguity is to be removed, then the counterpart (second) mapping is quite irregular.

If the shape of the original constellation should be kept for the counterpart constellation(s), it may happen that more than one counterpart constellation is required to remove the phase ambiguities. This is particularly true for PSK modulations with more than four signal constellation points. Examples for such counterpart constellations and results from coherent combination of same are given in FIG. 7 for 8-PSK, and examples for counterpart constellations in FIG. 9 and the respective results from coherent combining in FIG. 10 a-c for 16-PSK. As can be seen, the constellation points or modulation states for all retransmissions are in the same sub-plane as the constellation point for the original transmission. Therefore Constellation points within one of the sub-planes 706, 707, 804, 805 etc. may be chosen as PAO subset to be used for the transmissions.

Figure 7:
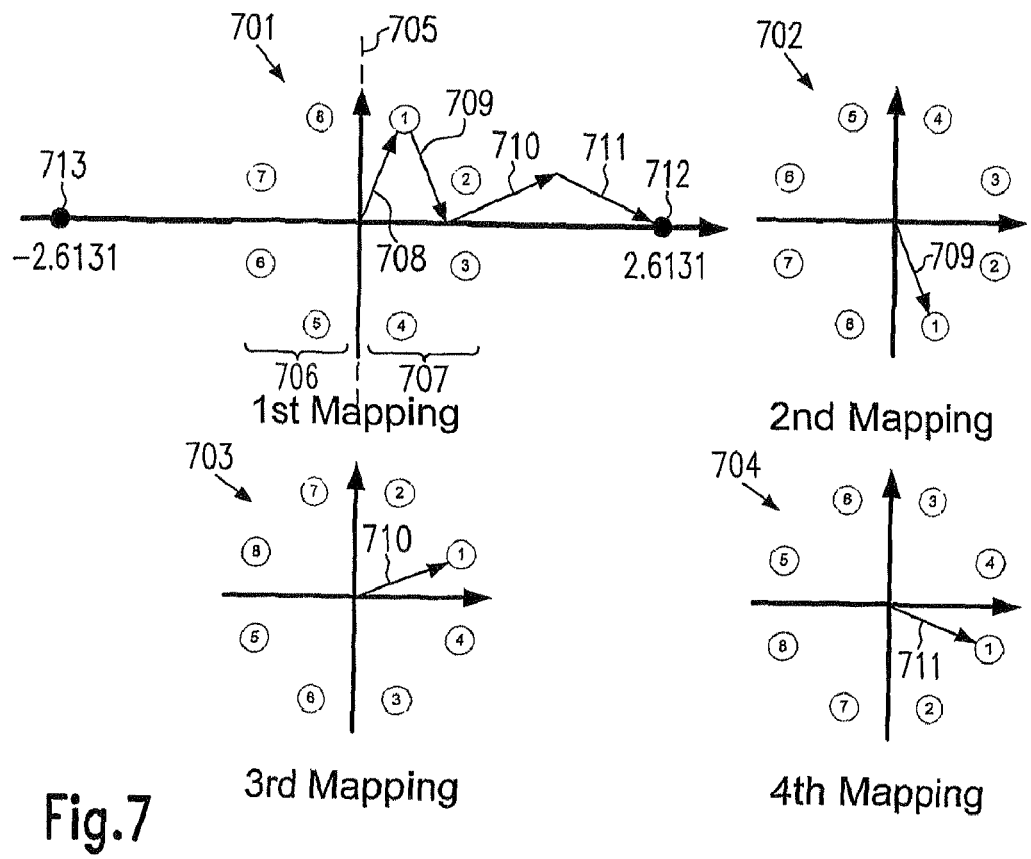
FIGS. 7 and 8 illustrate two alternatives for improving the reliability of the channel estimation in the case of 8-PSK modulation.

Turning to FIG. 7, the complex plane of original constellation (first mapping) 701 is divided into two non-overlapping adjacent sub-planes 706 and 707 by imaginary axis 705. Within each sub-plane the mappings of a given data word onto a constellation point are permuted such that the same word is assigned exactly once to each position (constellation point) in its sub-plane within all mappings 701-704. Consequently, coherent combining of all four transmissions of the same word results in the same value, independent of the word value. In FIG. 7, word number "1" is represented by vector 708 in the first mapping 701, by vector 709 in second mapping 702, by vector 710 in the third mapping 703 and by vector 711 in mapping 704. The result 712 is the real value of roughly 2.6131 for all word values assigned to the right half-plane, as for all word values the same vectors are added, just in different order. Similarly the real value of roughly −2.6131 is the result 713 for all values assigned to the left half-plane. Consequently ambiguity can be completely removed by using four mappings of words onto constellation points and choosing either only modulation states 1-4 or only modulation states 5-8 to be used for the transmissions.

Figure 8:
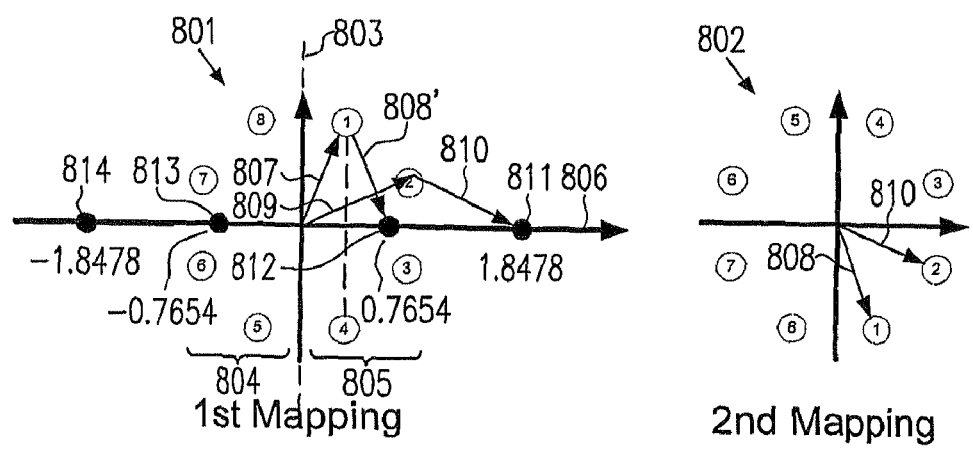
Figure 10A:
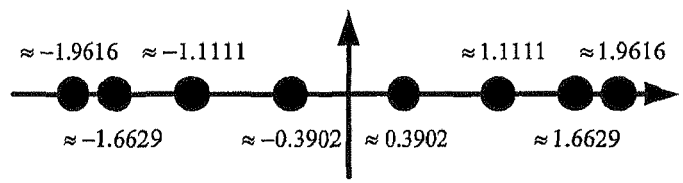
FIGS. 10 a-c depict examples of results from coherent combining of identical data word values using 2, 4 or 8 different mappings of FIG. 9, respectively.
Figure 10B:
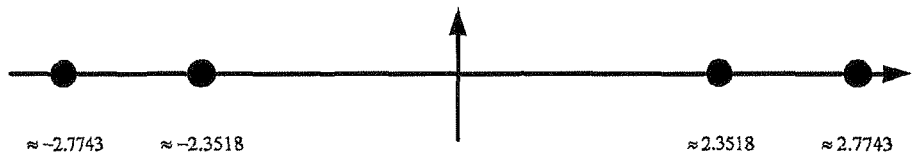
Figure 10C:

If only phase ambiguity should be removed for PSK schemes, it can be enough to use only one counterpart constellation which results in a combined result like in FIG. 8 or FIG. 10a or 10b, which already show only one phase level (in this case either 0 degree or 180 degree to the real axis if either points 1-4 or points 5-8 for 8-PSK (FIG. 8), or either point 1-8 or point 9-16 for 16-PSK (FIG. 9) are chosen for the PAO subset).

In FIG. 8, the complex plane is divided along imaginary axis 803 into non-overlapping adjacent sub-planes 804 and 805. Instead of mirroring each constellation position from its position in first mapping 801 with regard to a point, to obtain the position within second mapping 802, the position is mirrored with regard to the real axis 806, which is a symmetry axis for both sub-planes. The combination of first (original) transmission and repeated transmission of word number "1" is the sum of vectors 807 and 808, which yields the real value of roughly 0.7654 at point 812. The same would hold true for word number "4". When combining vectors 809 and 810 for word numbers "2" or "3", the result is roughly 1.8478 at point 811.

Even though the ambiguity in amplitude is higher than 1, such a scenario will improve the channel estimation capabilities greatly, as the exact amplitude may not be required in the demodulation process of a PSK modulation scheme.

FIG. 9 shows 8 different mappings for 16-PSK. If only first and second mapping are combined, 4 results are possible on either half of the real axis, as shown in FIG. 10a (four amplitude levels). When the first four mappings are combined, two results occur for each possible PAO subset, as shown in FIG. 10b (two amplitude levels). Only when all 8 mappings are combined, ambiguity is completely removed when reducing the set of used constellation points to those on the right or those on the left half-plane.

The procedure disclosed in this invention can be interpreted as a rearrangement of the mapping rules from word (plurality of bits) to constellation point between the original and the repeated version of the word. Therefore we refer to this method also as "Repetition Rearrangement", or "ReRe" for short in following sections.

Figure 11:
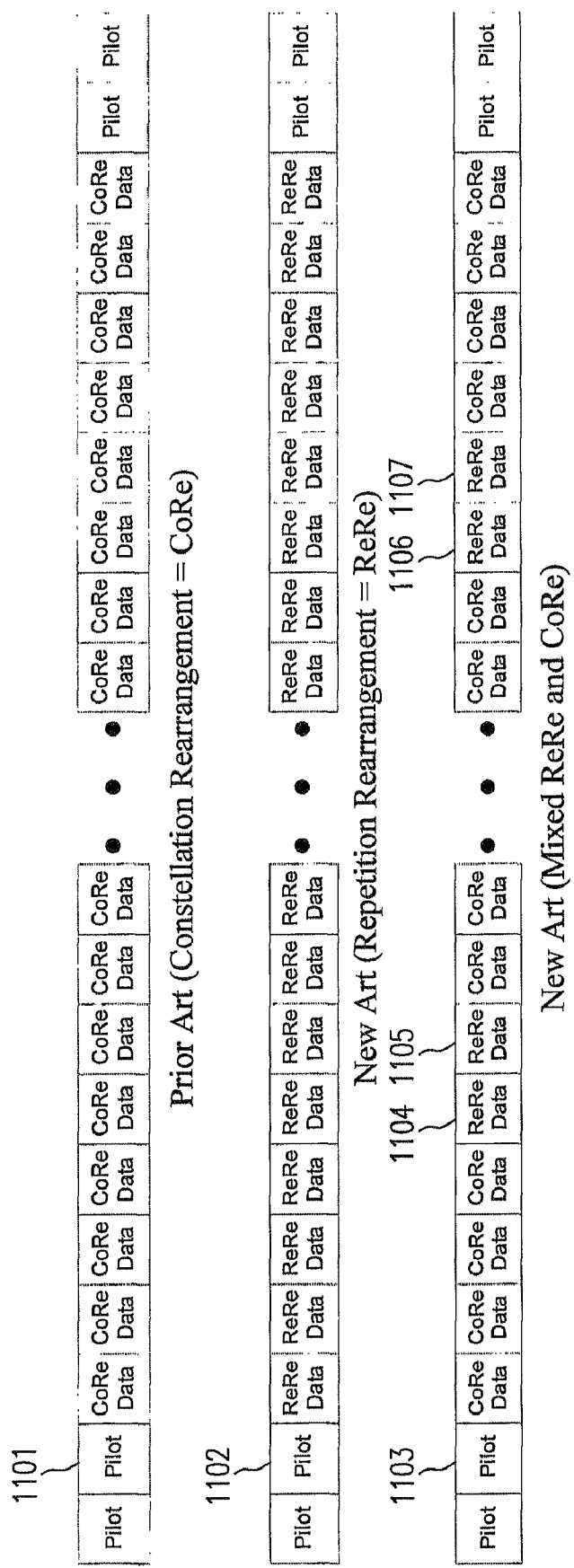
FIG. 11 depicts examples of a one-dimensional frame structure for Pilot and Data symbols.

Not all words in a frame have to be transmitted using the repetition rearrangement approach as disclosed in the present invention. If the channel is only slowly varying, a small number of ReRe words can be sufficient to facilitate good channel estimation conditions for a receiver. Consequently other data words can use other methods known from prior art, such as transmission without repetition, Simple Mapping repetition or Constellation Rearrangement (CoRe) repetition. The latter is the preferred solution in a repetition scenario as it usually provides smaller bit error rates at a receiver. Such repetition alternatives are depicted in FIG. 11. Data frame 1101 contains data transmitted according to prior art, in this case with constellation rearrangement. In contrary, data frame 1102 contains only data transmitted according to the method presented herein. Data frame 1103 contains data transmitted according to both methods. Data word 1104, transmitted using a first (original) mapping, is repeated as data word 1105 according to a second mapping as described in detail above. The same applies to data word 1106, which is re-transmitted as data word 1107.

The amount and position of ReRe data symbols may be additionally signaled in a Control Channel explicitly or by means of a predefined parameter from the transmitter to the receiver, to provide the receiver with knowledge which part of the data frame follows which repetition strategy.

For selective channels, it is advantageous that an original symbol and its counterpart symbol(s) are transmitted in adjacent places within a time frame, since the benefit of repetition rearrangement depends on channel conditions that are as equal as possible for original and counterpart symbols. Alternatively it would be possible to transmit original symbol and counterpart symbol at the same time in different frequency channels of a FDMA system, or in different code channels of a CDMA system. It should be obvious to those skilled in the art that these alternatives can be combined. For example in an OFDM system, the original and counterpart symbol can be transmitted on adjacent subcarriers, in adjacent time slots, or both. The latter possibility is particularly applicable when there are several counterpart symbols to be transmitted with the same original symbol, for example three counterpart symbols for 8-PSK. Then the first counterpart symbol can be transmitted in an adjacent time slot in the same subcarrier as the original symbol; the second counterpart symbol can be transmitted in the same time slot in an adjacent subcarrier to the original symbol; the third counterpart symbol can be transmitted in an adjacent subcarrier in an adjacent time slot to the original symbol.

The examples shown in the figures show mapping constellations that result in combined signal points that come to lie on the right axis in the graphs, usually representing the real part axis in the complex signal plane. It should be apparent to those skilled in the art that other mappings can be defined that reach a reduced number of ambiguities without resulting in combined signal points on the real axis. For example, it is very easy to define QAM mappings that result in signal points on the imaginary axis. Likewise it is easily possible to define mappings for PSK that result in points on a straight line inclined at a certain angle to the real axis. Which of such mappings is chosen can be an implementational choice of the system designer, and has no direct influence on the technical concept as far as this invention is concerned.

This description has focussed on modulation constellations that require coherent demodulation. Consequently the algorithm described is formulated such that original and rearranged constellation points are combined coherently as well. However it should be apparent that the design algorithm as well as the combining method can be easily modified to be suitable for a non-coherent approach. For example, for ASK a simple non-coherent detection of the carrier amplitude would be possible, and the scalar values could be added for combination.

In the detailed description above, always two non-overlapping adjacent sub-planes have been used. As an alternative example for multiple divisions into sub-planes, the division could be done into 4 non-overlapping adjacent quarter planes, each quarter plane resembling a quadrant of the complex plane. A counterpart constellation to the 1st Mapping in FIG. 9 could then be the 3rd mapping in the same figure. In such a case, modulation states within one of the four quarter planes would have to be chosen as PAO subset of modulation states to be used for all transmissions, for example numbers 1-4, 5-8, 9-12 or 13-16.

An original and counterpart mapping with four non-overlapping adjacent quarter planes for 16-QAM is shown in FIG. 16 a-b respectively. Here again only modulation states within one of the four quarter planes may be chosen for the PAO subset to be used for all transmissions. Combination of original symbol and retransmission symbol would result in one of the points 1601-1604, depending on the selected PAO subset.

A further side criterion when choosing counterpart mappings is that under no circumstances the coherent combination should result in the origin of the complex plane. This is simply due to the reason that a receiver could not extract any information on the channel state from a combined signal point of complex value 0.

In another alternative, only a sub-set of all possible modulation states or a sub-set of all existing data word values may be subject to the described method. Even this way ambiguity in the determination of transmission channel properties may be reduced.

This description has assumed that the original and repeated data word consist each of the same b-bit bit sequence. For simplicity of the description, a mapping was assumed that maps b bits onto one complex value. Therefore an original constellation consists of $2^b$ distinct complex values, and a counterpart constellation consists of $2^b$ complex values. An original constellation and one or more counterpart constellations can be summarised into a "super-constellation". This super-constellation may then represent a "super-mapping" that summarises the original mapping and one or more counterpart mappings. In such a case the control information that signifies the original or counterpart mapping has to be included into the super-mapping or super-constellation.

A control word is pre-pended to each data word. The control word assumes a specific value for each transmission, e.g. "1" for the first transmission of a data word, "2" for the second transmission of the same data word, and so on. The super-mapping maps the different values of concatenated control word and data word to modulation states or super-constellation points. Thus, different mappings from data word values to modulation states are obtained for different values of the control word. If the super-mapping is arranged in an appropriate way, the different mappings from data word values to modulation states may exhibit the properties described above.

Figure 14A:
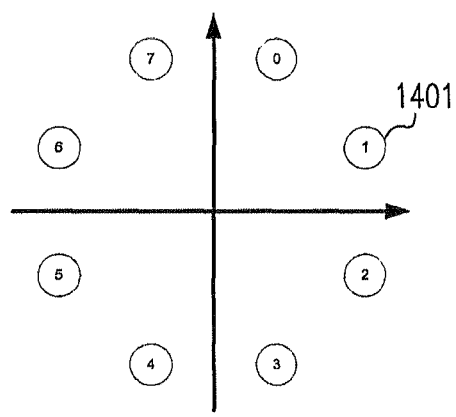
FIGS. 14 a-c show an example of combining original and counterpart mapping into a super-mapping for an original 8-PSK modulation.
Figure 14B:
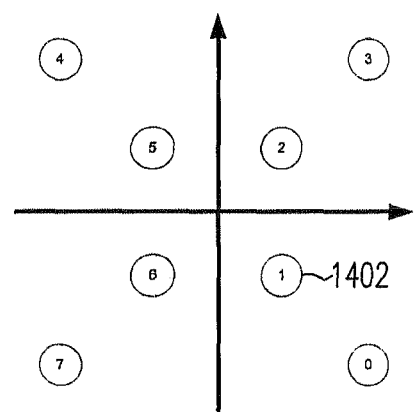

FIG. 14a shows an original constellation for the example 8-PSK, and FIG. 14b shows the related counterpart constellation. For example, constellation point 1401 represents symbol "1" in a first transmission and constellation point 1402 represent the same symbol in a second transmission or re-transmission.

Figure 14C:
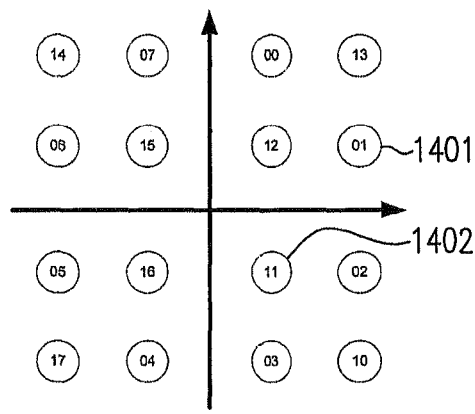

It may be noted that the difference to the constellations shown in FIG. 5 is limited to different labels of the constellation points. This difference is only a matter of convenience; those skilled in the art will realise that it is a matter of convention whether symbols are numbered from 1 to 8 or from 0 to 7. From the constellations in FIGS. 14a and 14b the super-constellation in FIG. 14c is obtained by including the constellation points from both constellations, prepending a leading "0" or "1" to the label to signify whether this constellation point was generated using the original or the counterpart mapping respectively. Consequently in FIG. 14c all points bearing a label that begins with "0" are equivalent to the original constellation points and the respective mapping, and all points bearing a label that begins with "1" are equivalent to the counterpart constellation and the respective mapping.

Figure 15A:
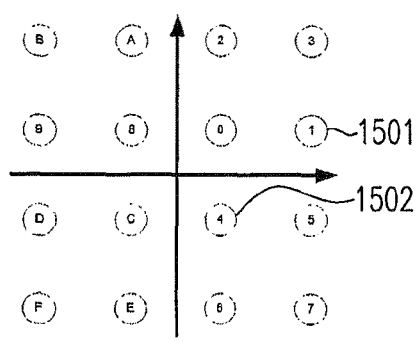
FIGS. 15 a-c show an example of combining original and counterpart mapping into a super-mapping for an original 16-QAM modulation.
Figure 15B:
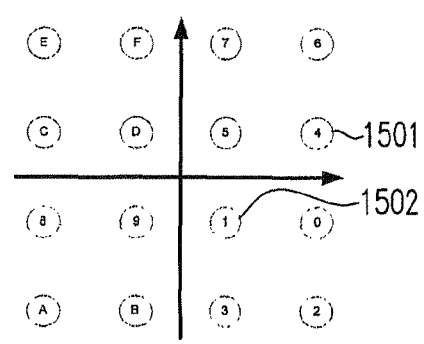
Figure 15C:
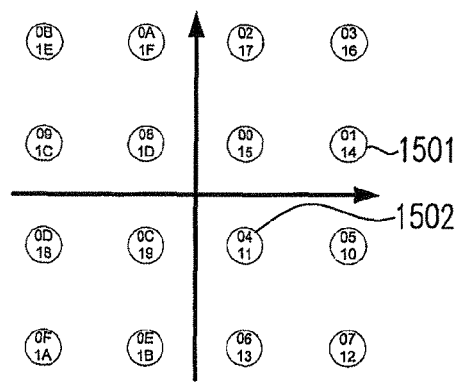

FIG. 15a shows an original constellation for the example 16-QAM, and FIG. 15b shows the related counterpart constellation. It may be noted that the difference to the constellations shown in FIG. 2 is limited to different labels of the constellation points, following the same reason as described above for FIGS. 14a-c. From the constellations in FIGS. 15a and 15b the super-constellation in FIG. 15c is obtained by including the constellation points from both constellations, prepending a leading "0" or "1" to the label to signify whether this constellation point was generated using the original or the counterpart mapping respectively. Since the positions of constellation points are identical, and the original and counterpart constellations vary only in the labelling, in FIG. 15c each constellation point has to represent two labels. For example, constellation point 1501 represents value "1" in a first transmission and value "4" in a second transmission or re-transmission. Consequently, it represents the values "01" and "14" in the super-constellation. Similarly, point 1502 represents "4" in the first transmission and "1" in the second transmission. In the super constellation of FIG. 15c it represents the values "04" and "11".

All labels that begin with "0" are equivalent to the original constellation points and the respective mapping and label, and all labels that begin with "1" are equivalent to the counterpart constellation and the respective mapping and labels.

It may be noted that such super-mappings and super-constellations are similar in nature to the so-called "set partitioning" approach that is known to those skilled in the art of Trellis-Coded Modulation. Example literature for this can be found in G. Ungerboeck, "Trellis-coded modulation with redundant signal sets Part I: Introduction" and "Trellis-coded modulation with redundant signal sets Part II: State of the art", both in IEEE Communications Magazine, Volume: 25, Issue: 2, February 1987, Pages:5-11 and 12-21.

Figure 12:
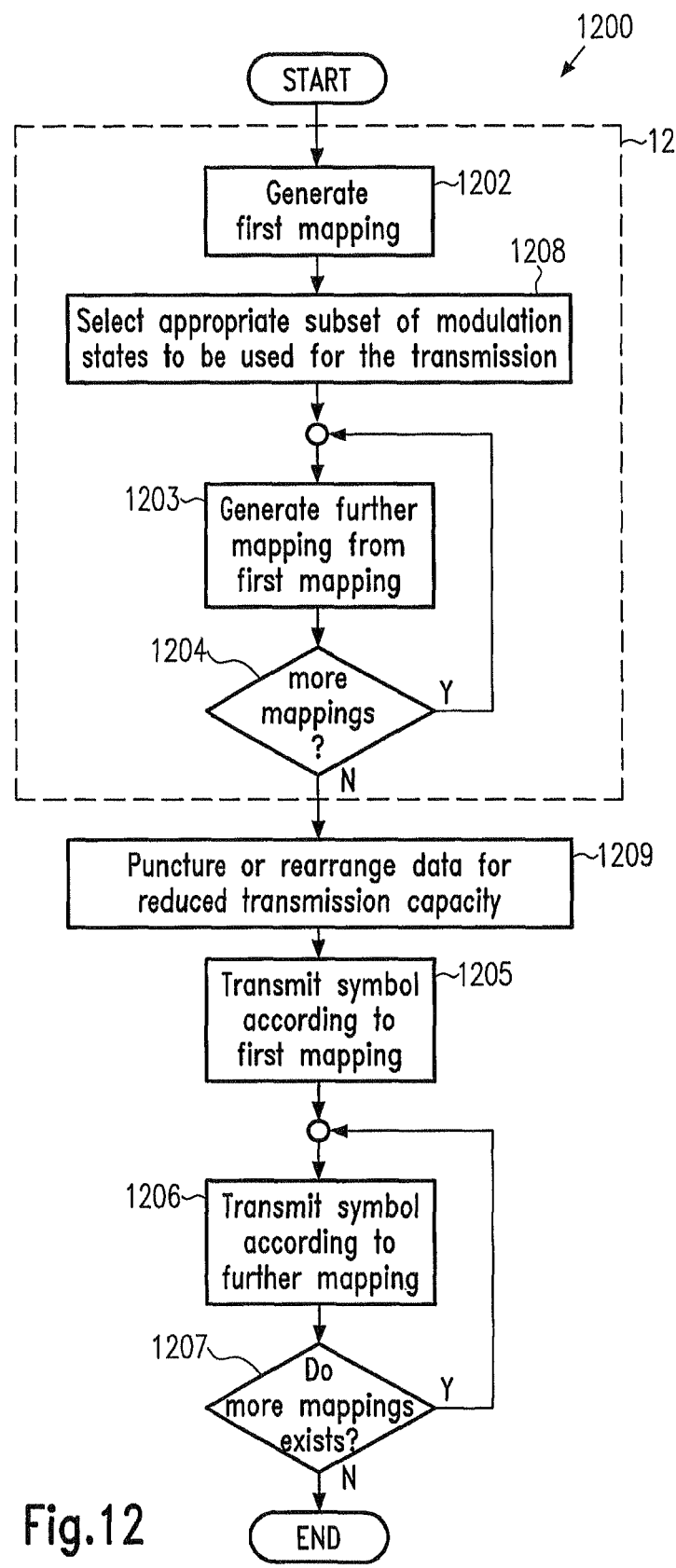
FIG. 12 illustrates steps of a method for data transmission in a digital communication system.

FIG. 12 shows a flow chart for a method which may be used to reduce the ambiguities in data symbols in a digital communication system. The method consists of a mapping generation step 1201, a transmission step 1205 and one or more re-transmission steps 1206.

To start with, a first mapping is generated in step 1202. This mapping may be generated at random, according to a specified algorithm or by simply reading it from a table stored in the transmitter employing this method. This table may further be received from another entity like a base station or a mobile station for which the transmission is designated. Next, in step 1208 an appropriate PAO subset of all modulation states is selected to be used for the transmissions, following the rules given above. This step may alternatively be carried out after step 1204. A further step 1203 then generates a second mapping according to one of the algorithms given above. Step 1204 queries whether more mappings should be generated. In this case the loop returns to step 1203. If not, the method proceeds with step 1209. The generated mappings may be stored in the table for later use. Therefore the generation step 1201 is not necessarily required for each transmission session or even for each transmitted data word. Furthermore, it is also possible to store all used mappings during production of the transmitter, for example with the firmware download, or to receive all mappings from another entity and to store them in the table in the memory.

In step 1209, data to be transmitted is adapted to the reduced transmission capacity, for example by rearranging bits to a higher number of words or by puncturing bits. In step 1205, a symbol is transmitted according to the first mapping representing a data word. The same data word is transmitted again as a re-transmit symbol in step 1206 according to a second mapping generated in step 1203. Step 1207 queries whether more mappings exist according to which the data word should be transmitted. If this is the case, the method goes back to repeat steps 1206 and 1207. If no further mapping exists, the method ends the transmission of this data word. Although all transmissions of the same data word should advantageously be sent in close temporal proximity, other data words might be transmitted in between.

Figure 13:
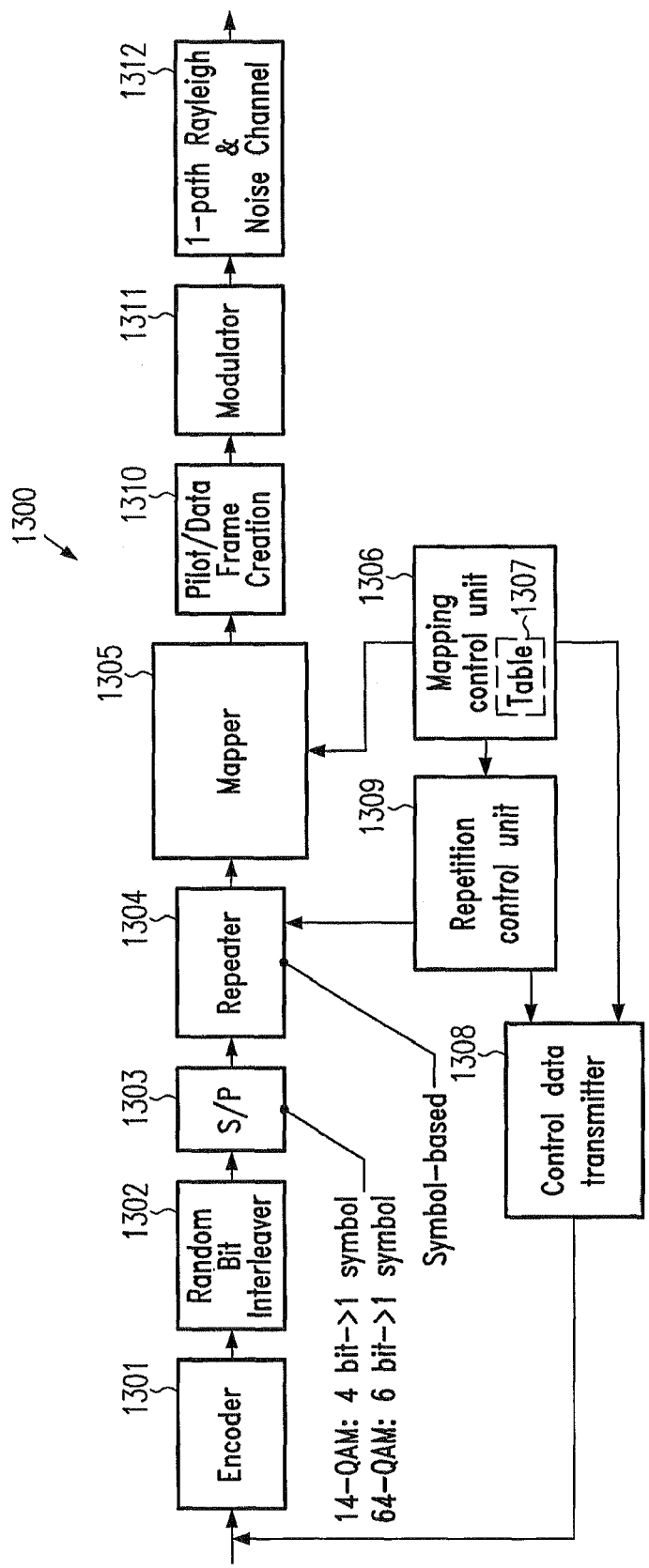
FIG. 13 shows an example of a transmitter chain.

In FIG. 13 a transmitter 1300 is illustrated which can be used to transmit data according to the method described above.

In the transmitter 1300, an information bit stream to be transmitted is encoded in encoder 1301. The encoded bit stream is interleaved in random bit interleaver 1302. In S/P unit 1303, groups of bits are combined to data words. The number of bits to be combined depends on the number of modulation states available. For example, for 16-QAM ld 16=4 bit are combined into one data word, for 64-QAM ld 64=6 bit are combined into one data word. In repeater 1304, data words are repeated for re-transmission. The repetition factor and the ratio of data words to be repeated is depending on the particular version of the method. The generated words are sent to mapper 1305. Mapper 1305 may work according to different modes. In a first mode equivalent to Simple Mapping, it maps un-repeated words or maps repeated words to complex symbols using only one word-to-constellation-point mapping. In a constellation rearrangement mode, mapper 1305 applies the constellation rearrangement described in the prior art section by applying different mappings to the words generated by repeater 1304. In a third mode, mapper 1305 applies the method described herein to the words generated by repeater 1304. Mapper 1305 is controlled by mapping control unit 1306 which selects the mapping mode to be applied to the words. If the third mode is selected, mapper 1305 receives mapping information from mapping control unit 1306 which may comprise a memory 1307 for storing a table containing mapping information. Mapping control unit 1306 is further configured to select in the third mapping mode the second and further mappings (i.e. counterpart mappings or counterpart constellations) for the re-transmissions derived from the first mapping used for the first transmission according to the rules defined above. The mappings may be calculated at run time according to the rules given above. Alternatively they may be read out from the table in memory 1307 where they have previously been stored according to a communication system design.

Various mapping modes as described above may be used alternatively, according to information provided by the network or by the receiving unit. Further they may be used alternately within a single frame according to a pre-defined pattern like with frame 1103 shown in FIG. 11. Information about such a pattern, as well as information about the mappings used may be sent to the receiving unit via control data transmitter 1308 and transmission channel 1312. Further, repetition control unit 1309 controls the repetition factor of repeater 1304 according to the requirements of mapping control unit 1306. For example, in the third mapping mode repetition control unit 1309 receives information from mapping control unit 1306 about the number of repetitions required for the selected mapping.

After the mapping, pilot data is added and frames are combined in Pilot/Data frame creation unit 1310 before the information is modulated onto a carrier in modulator 1311. The modulated signal is sent to a receiving entity via channel 1312.

Depending on the particular implementation, transmitter 1300 may comprise further units like IF stage, mixers, power amplifier or antenna. From a signal flow point of view, such units might also be seen comprised in channel 1312, as they all may add noise to the signal or exert phase shift or attenuation on the signal.

Units 1301 to 1311 may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

Alternatively, the present invention may be implemented using one mapping of words (pluralities of bits) to modulation states together with additional bit manipulation steps.

Figure 17:
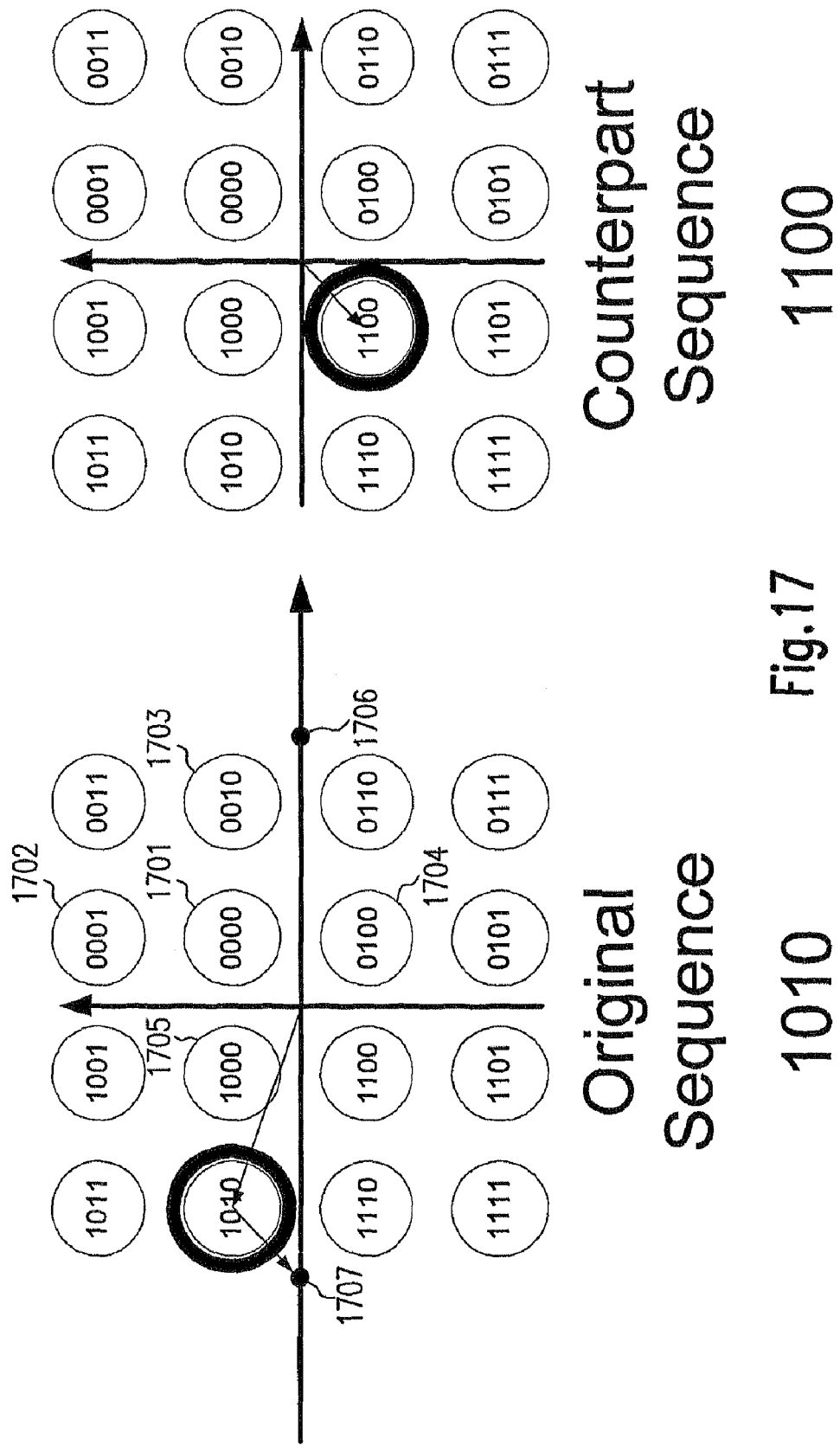
FIG. 17 gives an example of an original and a counterpart 4-bit sequence in 16-QAM.
Figure 28:
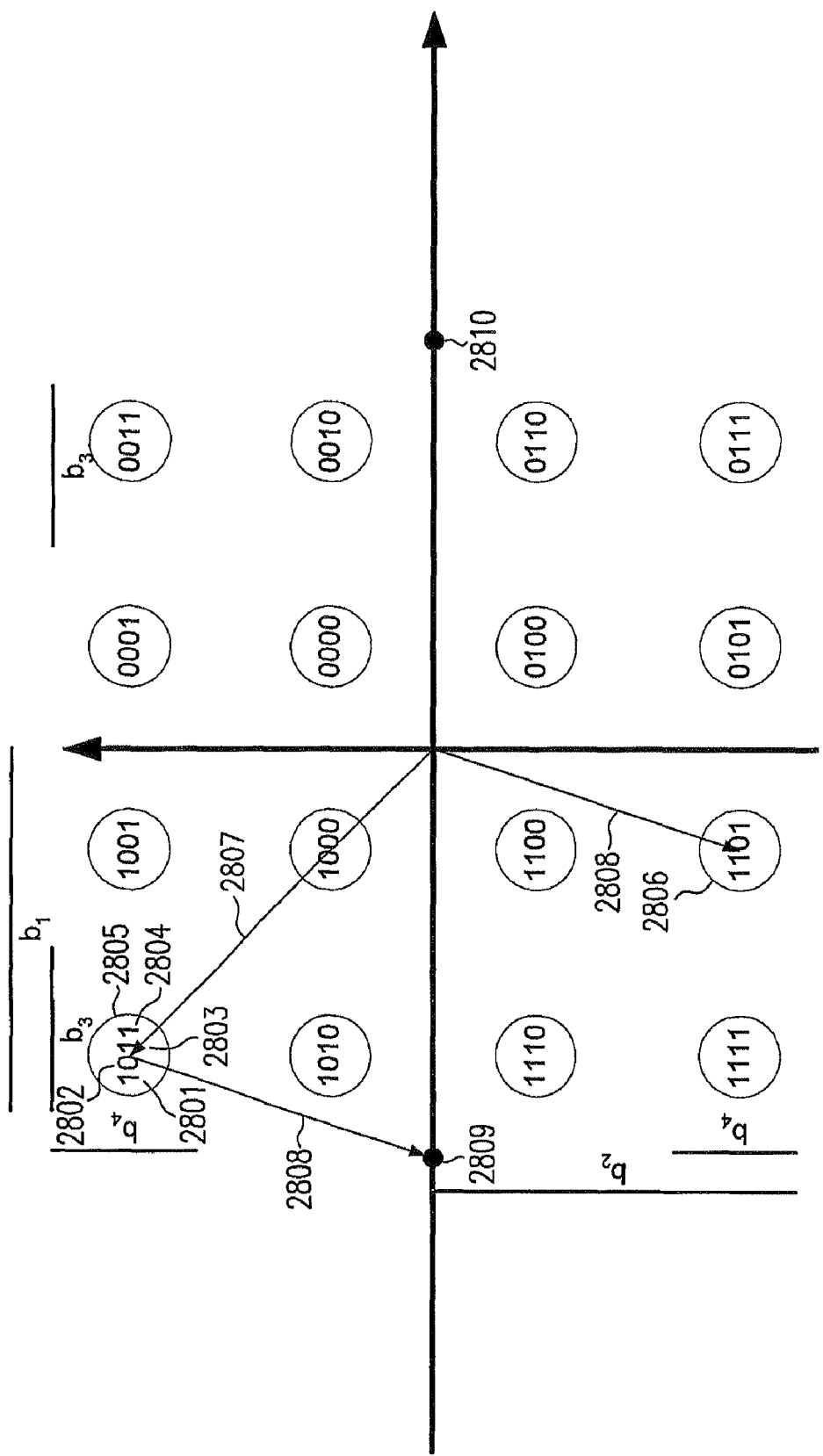
FIG. 28 illustrates an example for re-transmission with bit inversion with 16-QAM.

As an example, let us assume a transmission using the 16-QAM modulation scheme, as it can be seen in FIG. 17 and FIG. 28. According to Table 1, such a data symbol carries four bits. In the method described herein these four bits are transmitted twice:
1. Using the 16-QAM mapping for the original sequence (four bits)
2. Using the same 16-QAM mapping for the counterpart sequence (four bits)

Generally for any modulation scheme which it not a pure ASK, a required bit manipulation step is the replacement of at least one bit by a fixed value to select a sub-plane according to the methods outlined above. This is illustrated in FIG. 17 for a Gray mapping where as an example the original bit sequence 1010 and the counterpart sequence 1100 are highlighted. Each sequence of four bits is mapped to a modulation state of the 16-QAM. As the applied mapping is a Gray mapping, closest neighbours always differ in the value of only one bit. For example modulation state 1701 is assigned to the bit sequence "0000". The four closest neighbours 1702-1705 are assigned to bit sequences "0001", "0010", "0100" and "1000".

Each sequence of four bits is associated with a further bit sequence which is obtained by bit inversion as explained below. Additionally, in both original and counterpart bit sequence, at least one of the bits, which has to be appropriately chosen, is replaced by a fixed value, e.g. 0 or 1. As a result of combining the first symbol resulting from the first bit sequence with the further symbol resulting from the further bit sequence, phase ambiguity is removed and one of two possible vector sum results 1706 or 1707 is obtained, depending on the fixed value of the replaced bit(s). Due to the effect of the reduction of the phase ambiguity to one, these one or more bits that carry said fixed value are referred to as PAO bit(s).

Figure 18:
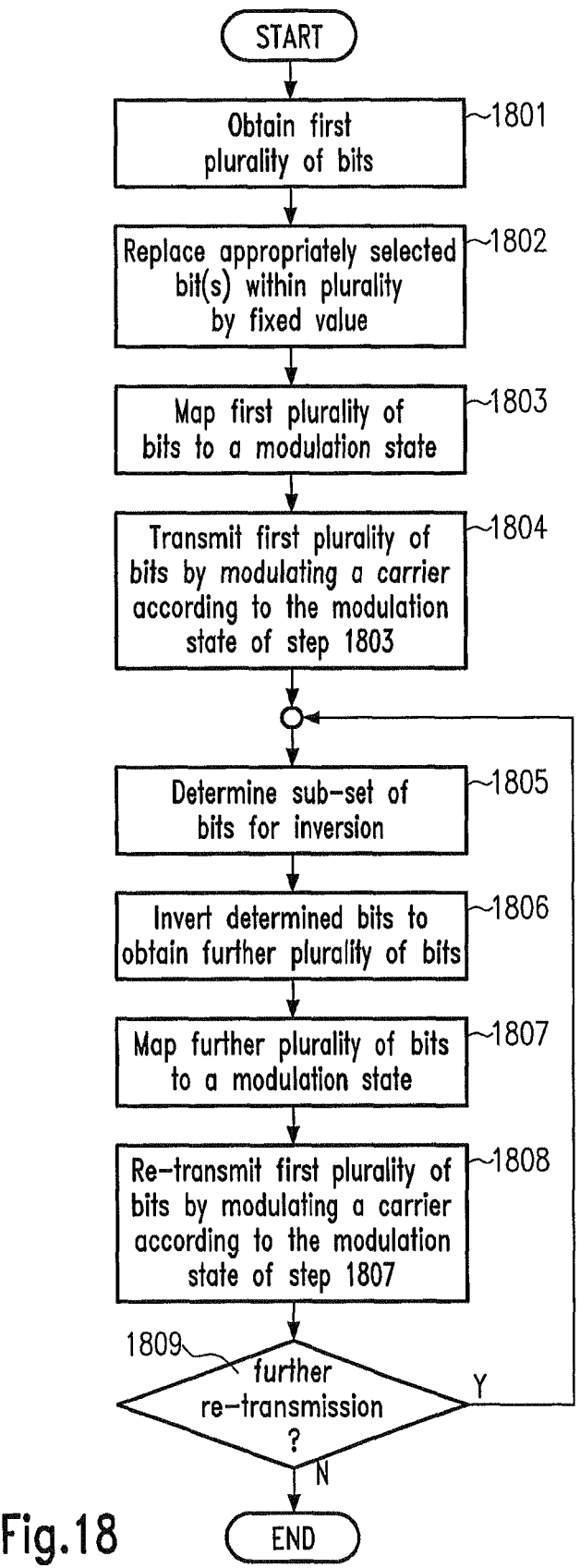
FIG. 18 illustrates steps of a method for improving the reliability in the estimation of transmission channel properties.

The flow chart of FIG. 18 illustrates the steps necessary for removing phase ambiguity in transmission channel estimation.

In step 1801 a first sequence or plurality of bits is received. The number of bits comprised within one sequence depends on the number of different modulation states in the applied modulation scheme. For example, for 64-QAM each sequence contains Id 64=6 bits. For 8-PSK each plurality of bits contains Id 8=3 bits.

In step 1802 one or more bit(s) within the received plurality of bits is replaced by a fixed value. This corresponds to the selection of the PAO subset of modulation states to be used for the transmissions, which is described herein above.

Figure 40:
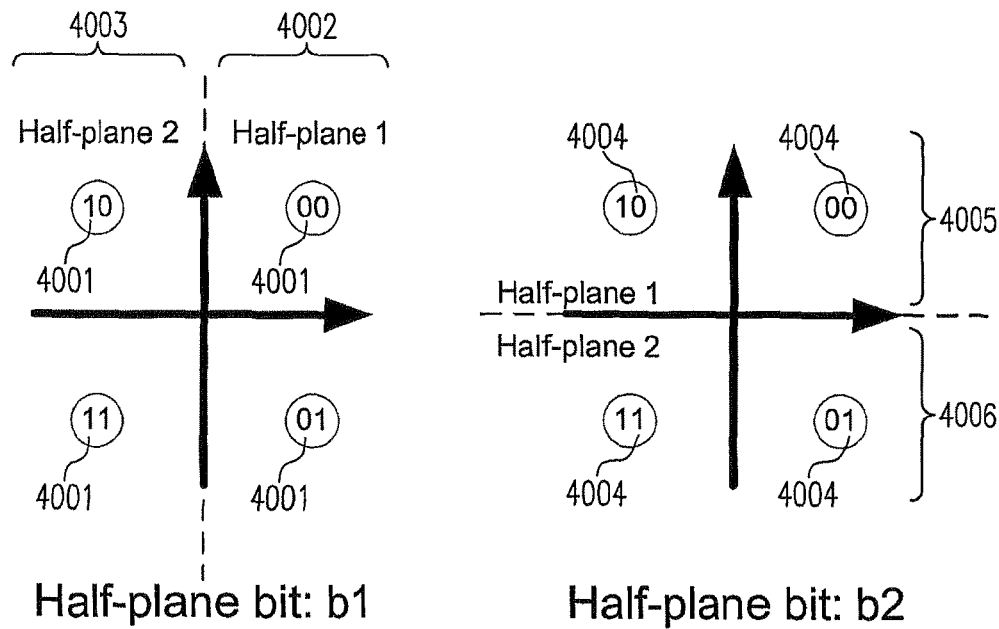
FIG. 40 illustrates half-planes and half-plane bits in original QPSK according to the present invention.
Figure 41:
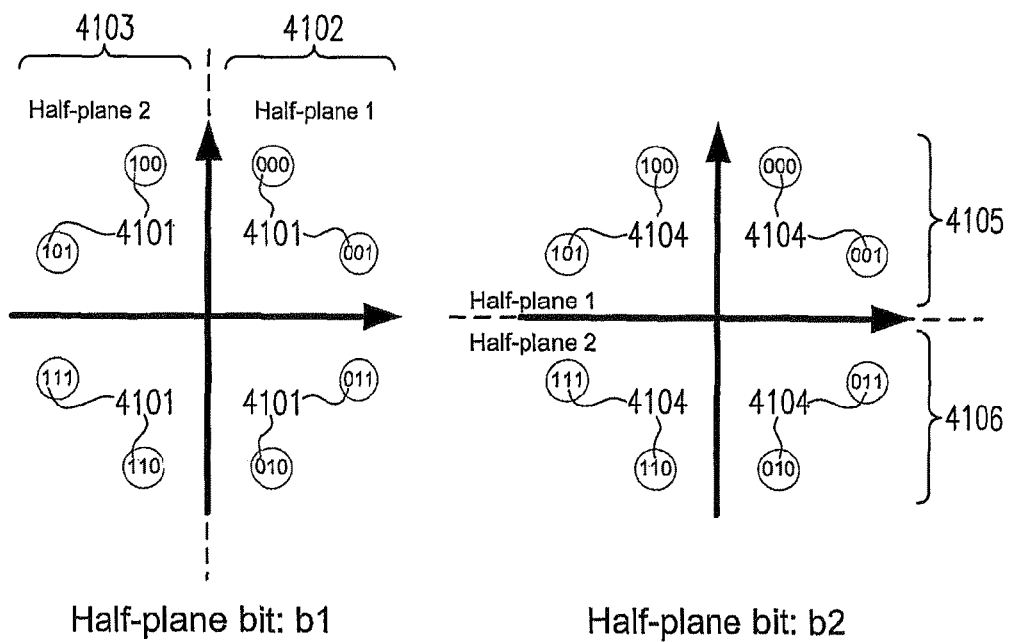
FIG. 41 illustrates half-planes and half-plane bits in original 8-PSK according to the present invention.
Figure 42:
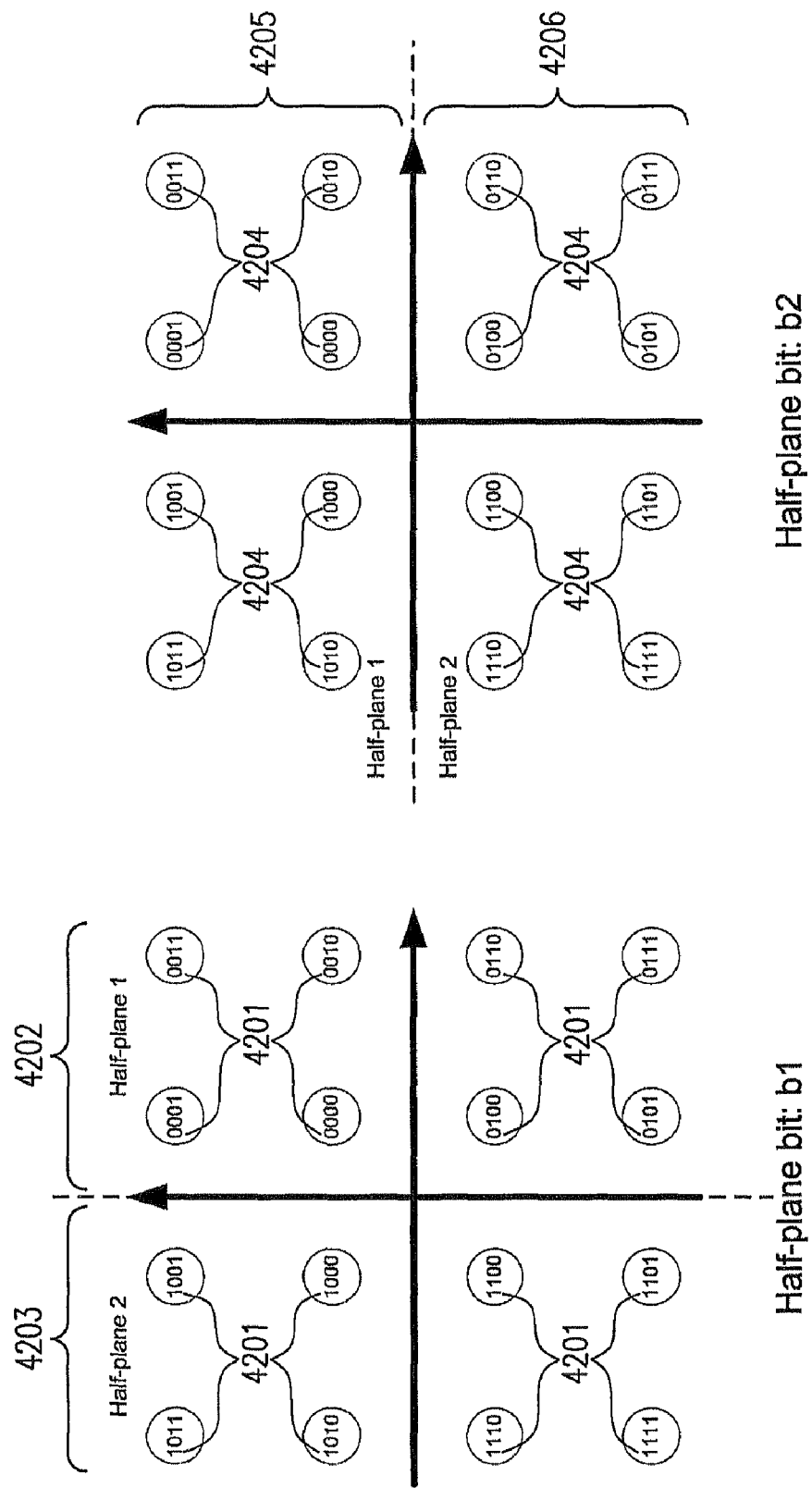
FIG. 42 shows half-planes and half-plane bits in original 16-QAM according to the present invention.

Obviously if one of these bits is replaced by a fixed value, it loses the capability to transmit information in the usual sense. Therefore each used PAO bit within the same sequence of plurality of bits reduces the number of usable different modulation states by a factor of two. For example if one of the six bits defining a 64-QAM modulation symbol is replaced by a fixed value, only 0.5*64=32 remaining modulation symbols of the 64 modulation symbols will be generated, depending on the bit value of the remaining five bits. If a bit separates the set of modulation symbols in such a way that for a first fixed value of said bit the remaining 50% of the modulation symbols can be represented by a first half-plane of the complex plane, and for a second fixed value of said bit the remaining 50% of the modulation symbols can be represented by a second half-plane of the complex plane, and the first and second half-plane are non-overlapping and adjacent and the boundary between the first and second half-plane contains the complex origin 0+j0, then this bit is referred to as a "half-plane bit". Examples for QPSK, 8-PSK and 16-QAM are shown in FIGS. 40 to 42, respectively. In the left examples, half-plane bit 4001, 4101 and 4201 selects vertically separated half-planes 4002, 4102, 4202 or 4003, 4103, 4203 depending on its fixed value. In the right examples, half-plane bit 4004, 4104 and 4204 selects vertically separated half-planes 4005, 4105, 4205 or 4006, 4106, 4206 depending on its fixed value.

In step 1803 the first plurality of bits is mapped to a modulation state according to a pre-defined Gray mapping of bit sequences to modulation states. In step 1804 the first bit sequence is transmitted by modulating a carrier according to the modulation state assigned to the bit sequence in the Gray mapping.

For each re-transmission a sub-set of bits comprised in the bit sequence is determined for inversion in step 1805. Determining step 1805 may for example be carried out by executing a determining algorithm, by receiving data from a peer entity or by just reading data from a memory. In step 1806 a further plurality of bits is obtained by taking the first plurality of bits from step 1801 and inverting those bits according to one of the inversion rules determined in step 1805. This further bit sequence is mapped onto a modulation state in step 1807 according to the same Gray mapping used in step 1803. As will be explained further below, the bit replaced by a fixed value in step 1802 is selected such that the modulation state to which the further plurality of bits is mapped in step 1807 is also comprised within the PAO subset of modulation states selected with the bit operation in step 1802. In step 1808 the first sequence is re-transmitted by transmitting the further sequence obtained in step 1806, that is by modulating the carrier according to the modulation state obtained in step 1807.

Step 1809 queries whether there are further re-transmissions of the same first bit sequence to be done. If this is the case, the method returns to box 1805. If not, the method ends and the transmission and re-transmissions of the first bit sequence are done.

As mentioned above, in determining step 1805 one inversion rule is chosen to obtain a further bit sequence. This inversion rule can be expressed as a sub-set of bits which have to be inverted. Depending on the mapping method chosen, there can be one or several inversion rules required to reduce the ambiguities to the desired target levels. Determining step 1805 should choose one of such rules for each re-transmission, preferably such that each inversion rule will have been determined once for a given first plurality of bits. A half-plane bit that is chosen to be used for phase ambiguity reduction to one (i.e. according to above definition a PAO bit) cannot be chosen as a bit to be inverted in the counterpart sequence, and vice versa. In the following, the determination of inversion rules which should be chosen from in step 1805 and the selection of an appropriate PAO bit step 1802 will be explained in greater detail with reference to different modulation schemes.

Figure 19:
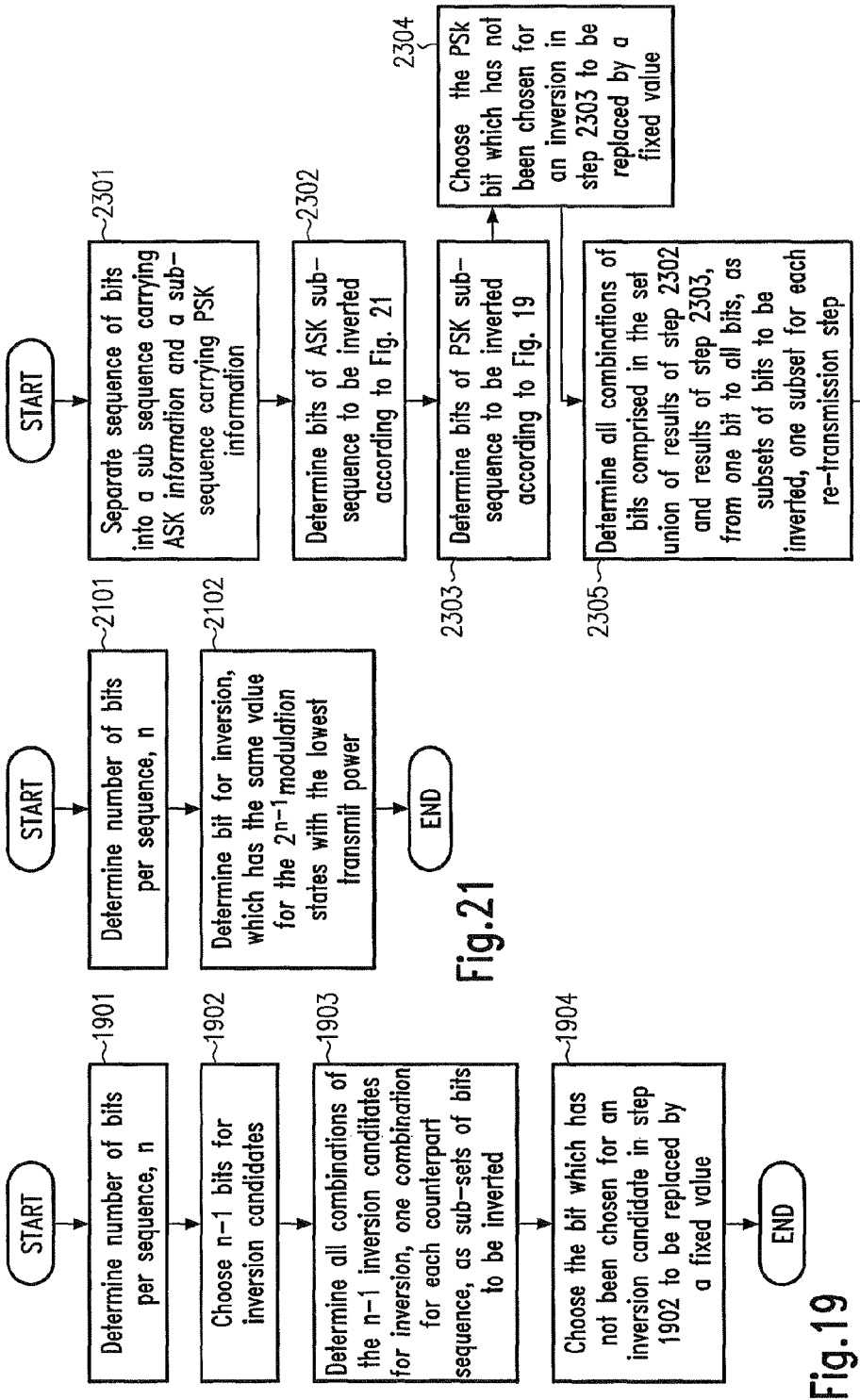
FIG. 19 shows steps for determining bits to be replaced by a fixed value and bits to be inverted for re-transmission with PSK.

For PSK modulations using Gray Mapping the following algorithm shown in FIG. 19 may be applied:

Let n be the number of bits mapped onto one PSK symbol (step 1901).

From the n bits, choose n−1 bits for inversion candidates (step 1902).

Inversion Rule(s): Determine the bits to be inverted by obtaining all possible combinations using 1 to all n−1 bits of the chosen n−1 bits (step 1903).

Obtain the n−1 counterpart bit sequences from the original bit sequences by inverting the bit(s) from the above found combinations.

One half-plane bit which is not chosen for inversion is the PAO bit, i.e. the half-plane bit to be replaced by a fixed value (step 1904).

Figure 20:
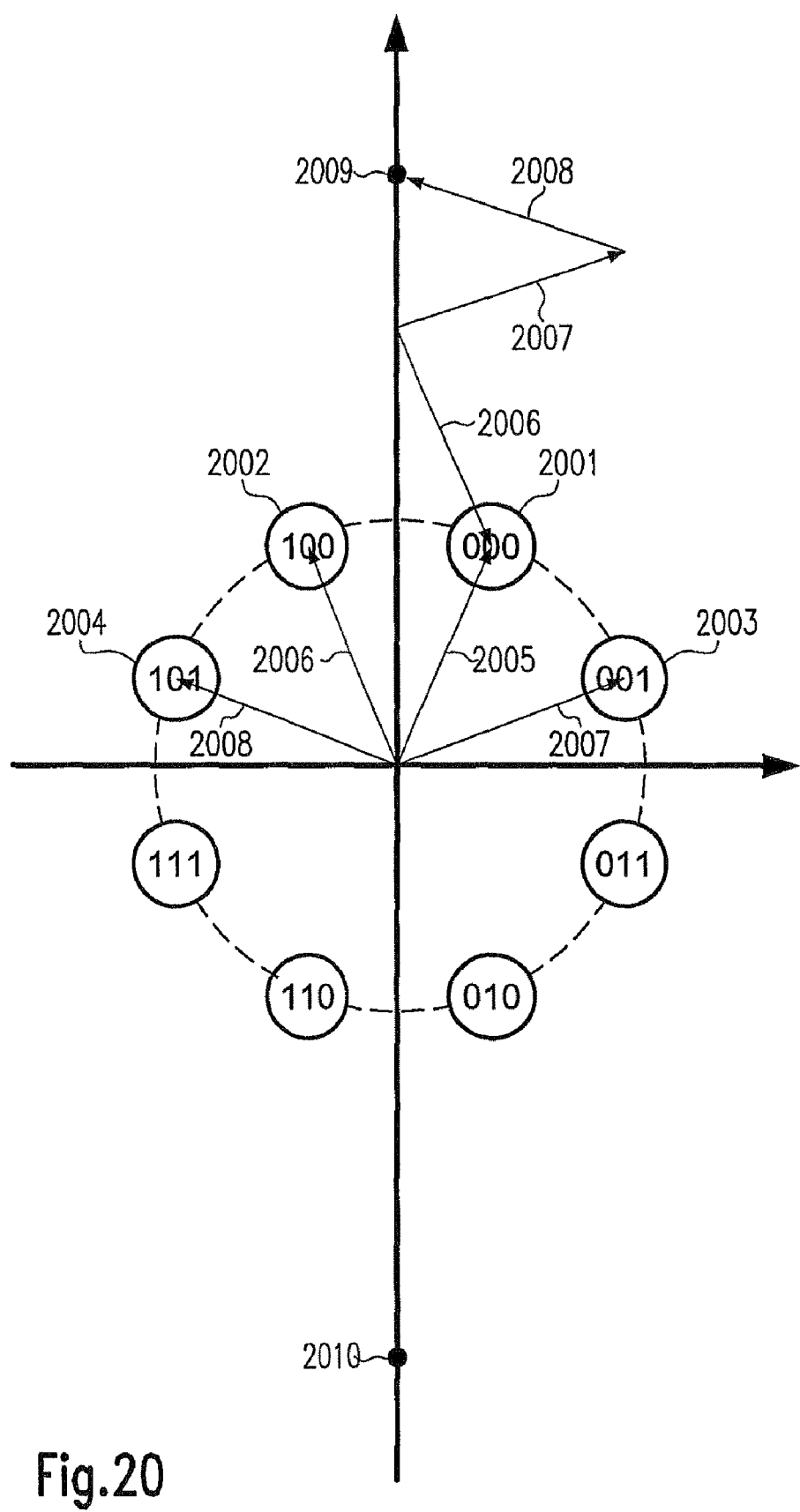
FIG. 20 illustrates an example for re-transmission with bit inversion with 8-PSK.

An example is explained for the constellation shown in FIG. 20.

Using 8-PSK, 3 bits are mapped onto one symbol ⇒n=3.
The first and third bit are chosen for inversion candidates.
Inversion rules: Invert only the 1st, only the 3rd, or both the 1st+3rd bit.
Half-plane bits are the first and the second bit
Since the first bit is used to generate the counterpart constellation in the inversion rule, the second bit is selected as the PAO bit and therefore replaced by a fixed value 0 or 1.

|  | PAO bit set to 0 | PAO bit set to 1 |
|---|---|---|
| Original bit sequences in Gray coding | 000, 001, 101, 100 | 011, 010, 110, 111 |
| Counterpart sequences inverting first bit | 100, 101, 001, 000 | 111, 110, 010, 011 |
| Counterpart sequences inverting third bit | 001, 000, 100, 101 | 010, 011, 111, 110 |
| Counterpart sequences inverting first and third bit | 101, 100, 000, 001 | 110, 111, 011, 010 |

Modulation state 2001 is assigned to bit sequence "000". By applying the inversion rules, bit sequences "100", "001" and "101" are obtained, to which modulation states 2002-2004 are assigned. The symbols are combined by adding the vectors 2005-2008 representing the complex values of the carrier for these modulation states. The result is point 2009 for the fixed PAO bit value of 0, and point 2010 for the fixed PAO bit value of 1. Therefore the result can only have one amplitude value and one phase value.

For all schemes that involve PSK at least partly (for example n-PSK, n-ASK/m-PSK, n-QAM, as outlined above), that is at least part of the information is contained in the phase of an information symbol, the number of ambiguities can be completely removed.

Figure 22:
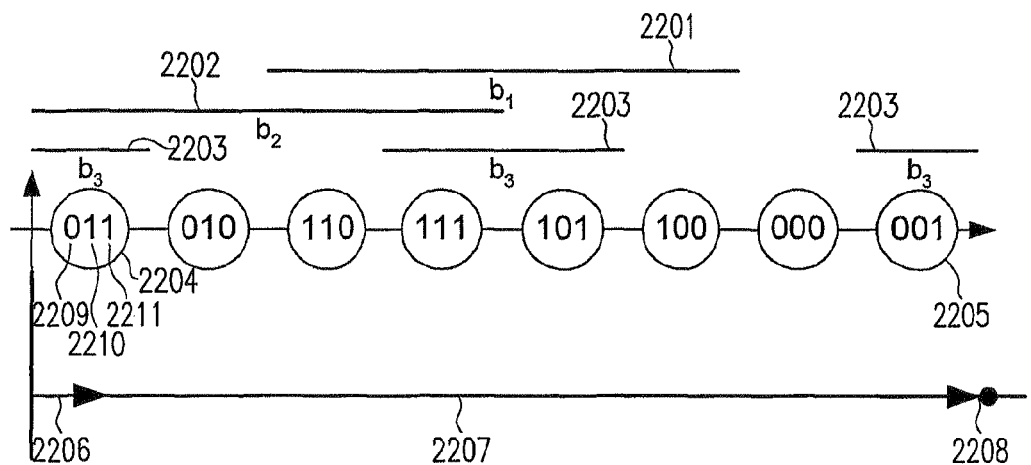
FIG. 22 illustrates an example for re-transmission with bit inversion with 8-ASK.

For ASK modulations where the transmit power of the symbols is sorted either in ascending or descending order according to Gray Coding as shown in FIG. 22, the following algorithm shown in FIG. 21 may be applied:

Let n be the number of bits mapped onto one ASK symbol (step 2101).

Inversion rule: Invert exactly the one bit that carries the same bit value for the exactly $0.5*2=2^{n-1}$ symbols with the lowest transmit powers (step 2102).

Obtain the counterpart sequence by applying the inversion rule to the original bit sequences.

It may be noted by those skilled in the art that the same inversion bit may be alternatively identified as the bit that carries the same bit value for the exactly $0.5*2^n=2^{n-1}$ symbols with the highest transmit powers.

As an example, the 8-ASK-modulation with the mapping of FIG. 22 is regarded. In FIG. 22, bars 2201, 2202 and 2203 indicate where bit 1, 2 and 3, respectively, has a value of "1". The bit order assumed is $b_1 b_2 b_3$.

Using 8-ASK, 3 bits are mapped onto one symbol ⇒n=3
The bit that carries the same value for the exactly $0.5*23=4$ smallest transmit power symbols is the 2nd bit $b_2$, which is equal to one for those symbols.
Inversion rule: Invert the 2nd bit $b_2$.
Original bit sequences in Gray Coding:
011, 010, 110, 111, 101, 100, 000, 001
Counterpart sequences inverting 2nd bit:
001, 000, 100, 101, 111, 110, 010, 011.

Modulation state 2204 is assigned to bit sequence "011". According to the inversion rule above, the counterpart sequence, "001", is obtained by inverting the second bit. To the counterpart sequence "001", modulation state 2205 is assigned. The symbols are combined by adding vectors 2206 and 2207 representing the complex values of modulation states 2204 and 2205. By calculating the combination result of all first bit sequences with their counterpart sequence, it becomes apparent that the result is always point 2208. Therefore in this case there is no ambiguity left in the determination of the transmission channel properties.

For pure ASK modulations the replacement of a bit by a fixed value is not required, as all modulation states are within one half-plane anyway, and any ambiguity can be removed completely by the inversion procedure outlined above alone.

Figure 24:
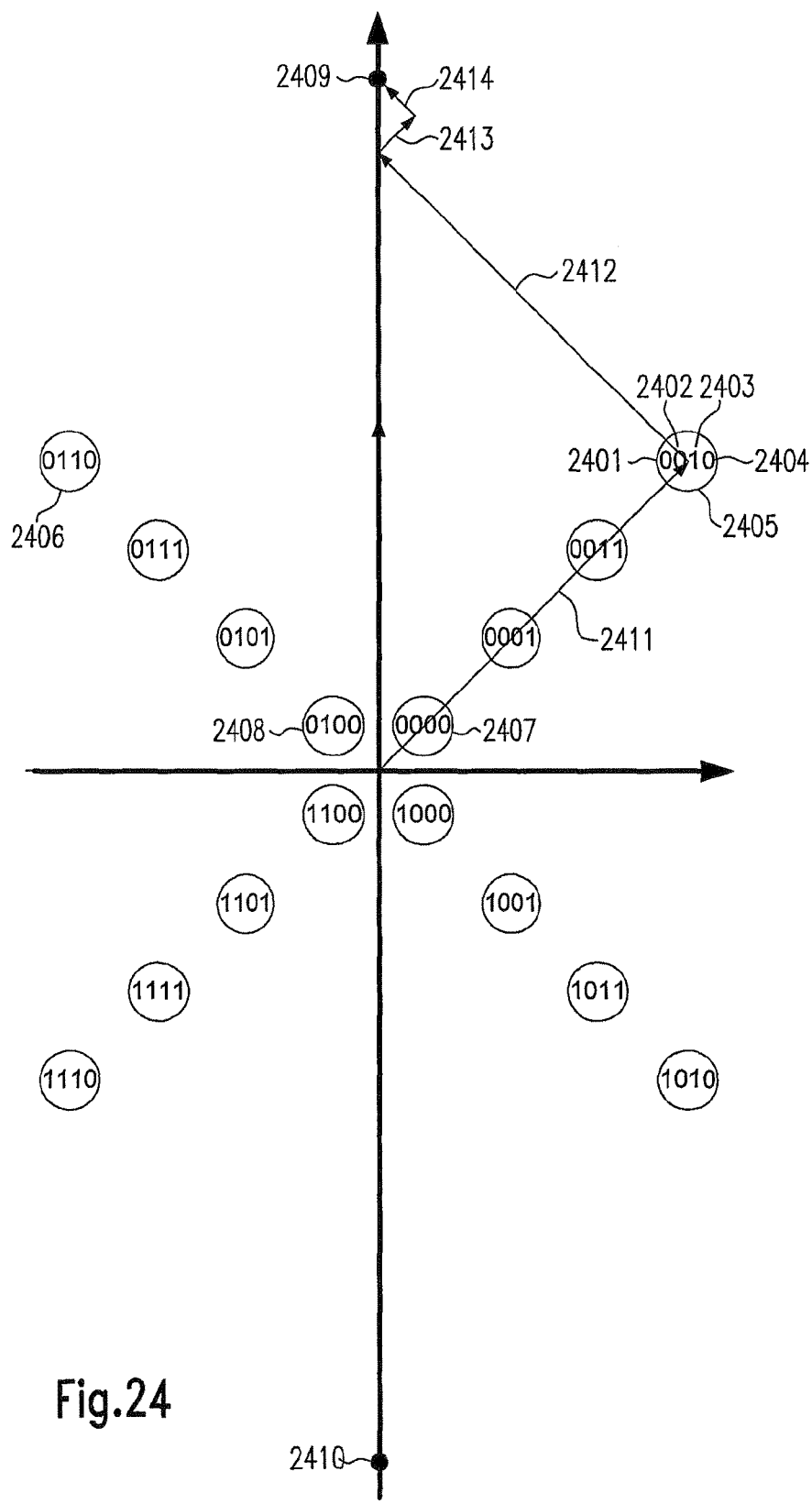
FIG. 24 illustrates an example for re-transmission with bit inversion with 4-ASK/4-PSK.

For mixed ASK/PSK modulations as shown in FIG. 24, where the bits are separable into bits that carry Gray Coded ASK information and bits that carry Gray Coded PSK information ("star QAM"), these bits should be treated individually according to the PSK or ASK rules described above. The resulting algorithm is shown in the flow chart of FIG. 23:

Separate the ASK/PSK modulation into independent ASK and PSK parts (step 2301).

Determine inversion rules separately for the ASK and PSK part according to the algorithms described above.

Determine which ASK/PSK bits correspond to the inversion rule bits from the ASK part (step 2302) and the PSK part (step 2303).

A PSK half-plane bit which has not been selected for inversion in the mentioned PSK part is selected as PAO bit for being replaced by a fixed value (step 2304).

Determine ASK/PSK inversion rules by combining from 1 to all ASK/PSK inversion rule bits (step 2305).

Obtain all counterpart sequences by inverting bits according to the determined ASK/PSK inversion rules.

As an example, the star-QAM of FIG. 24 is regarded.

Using 4-ASK/4-PSK as seen in FIG. 24, the first 2 bits 2401, 2402 are mapped as PSK, and last 2 bits 2403, 2404 are mapped as ASK–>nASK=2, nPSK-2.

Figure 25:
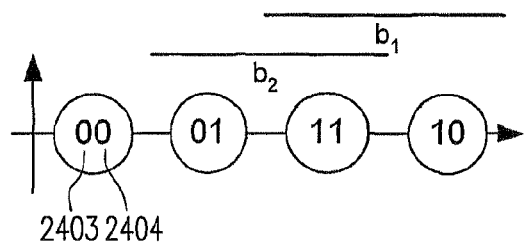
FIG. 25 depicts the 4-ASK part of the modulation scheme of FIG. 24.
Figure 26:
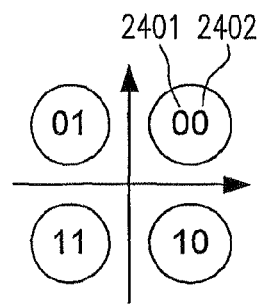
FIG. 26 depicts the 4-PSK part of the modulation scheme of FIG. 24.

ASK part (see FIG. 25):
  The bit that carries the same value for the $0.5*2^2=2$ smallest transmit power symbols is the 1st bit 2403, which is equal to zero for those bits
  Inversion rule: Invert the 1st ASK bit 2403.
  Original ASK bit sequences in Gray Coding: 00, 01, 11, 10
  Counterpart sequences inverting 1st bit 2403: 10, 11, 01, 00
    PSK part (see FIG. 26)
  The second bit 2402 is chosen for inversion.
  Inversion rule: Invert the 2nd PSK bit 2402.
  Original bit sequences in Gray Coding: 00, 01, 11, 10
  Counterpart sequences inverting 2nd bit 2402: 01, 00, 10, 11
    Determining ASK/PSK inversion rule bits:
  1st bit of ASK part 2403 is 3rd bit of ASK/PSK part
  2nd bit of PSK 2402 part is 2nd bit of ASK/PSK part
  Half-plane bits in the PSK part are the first and the second PSK bit
  1st bit 2401 of PSK part is chosen as PAO bit to be replaced by a fixed value 0 or 1, since the second PSK bit has been chosen for inversion.
  Determine ASK/PSK inversion rules
    Inversion rules: Invert only the $2^{nd}$ 2402, only the $3^{rd}$ 2403, or both the $2^{nd}$ and $3^{rd}$ 2402, 2403 ASK/PSK bit

|  | PAO bit set to 0 | PAO bit set to 1 |
| --- | --- | --- |
| Original ASK/PSK bit sequences | 0000, 0001, 0011, 0010, 0100, 0101, 0111, 0110 | 1100, 1101, 1111, 1110, 1000, 1001, 1011, 1010 |
| Counterpart ASK/PSK sequences inverting 2nd bit | 0100, 0101, 0111, 0110, 0000, 0001, 0011, 0010 | 1000, 1001, 1011, 1010, 1100, 1101, 1111, 1110 |
| Counterpart ASK/PSK sequences inverting 3rd bit | 0010, 0011, 0001, 0000, 0110, 0111, 0101, 0100 | 1110, 1111, 1101, 1100, 1010, 1011, 1001, 1000 |
| Counterpart ASK/PSK sequences inverting 2nd and 3rd bit | 0110, 0111, 0101, 0100, 0010, 0011, 0001, 0000 | 1010, 1011, 1001, 1000, 1110, 1111, 1101, 1100 |

Modulation state 2405 is assigned to bit sequence "0010". The PSK sub-sequence is "00" and the ASK sub-sequence is "10". According to the rules above, there is one bit, 2402 determined to be inverted from the PSK sub-sequence and one bit, 2403 determined for inversion from the ASK sequence. Consequently there are three counterpart bit sequences. Only bit 2402 inverted yields "0110", to which modulation state 2406 is assigned. Only bit 2403 inverted yields "0000", to which modulation state 2407 is assigned. Both bits 2402 and 2403 inverted yields "0100", corresponding to modulation state 2408. If all symbols are combined by adding up the vectors 2411-2414 representing the respective complex values, the result is point 2409. If this calculation is done for all possible value combinations of the bit sequence, it appears that the combined result is in point 2409 for the fixed value PAO bit of 0 for bit 2401 and point 2410 for the fixed PAO bit value of 1 for bit 2401. Thus ambiguity is completely removed.

Figure 27:
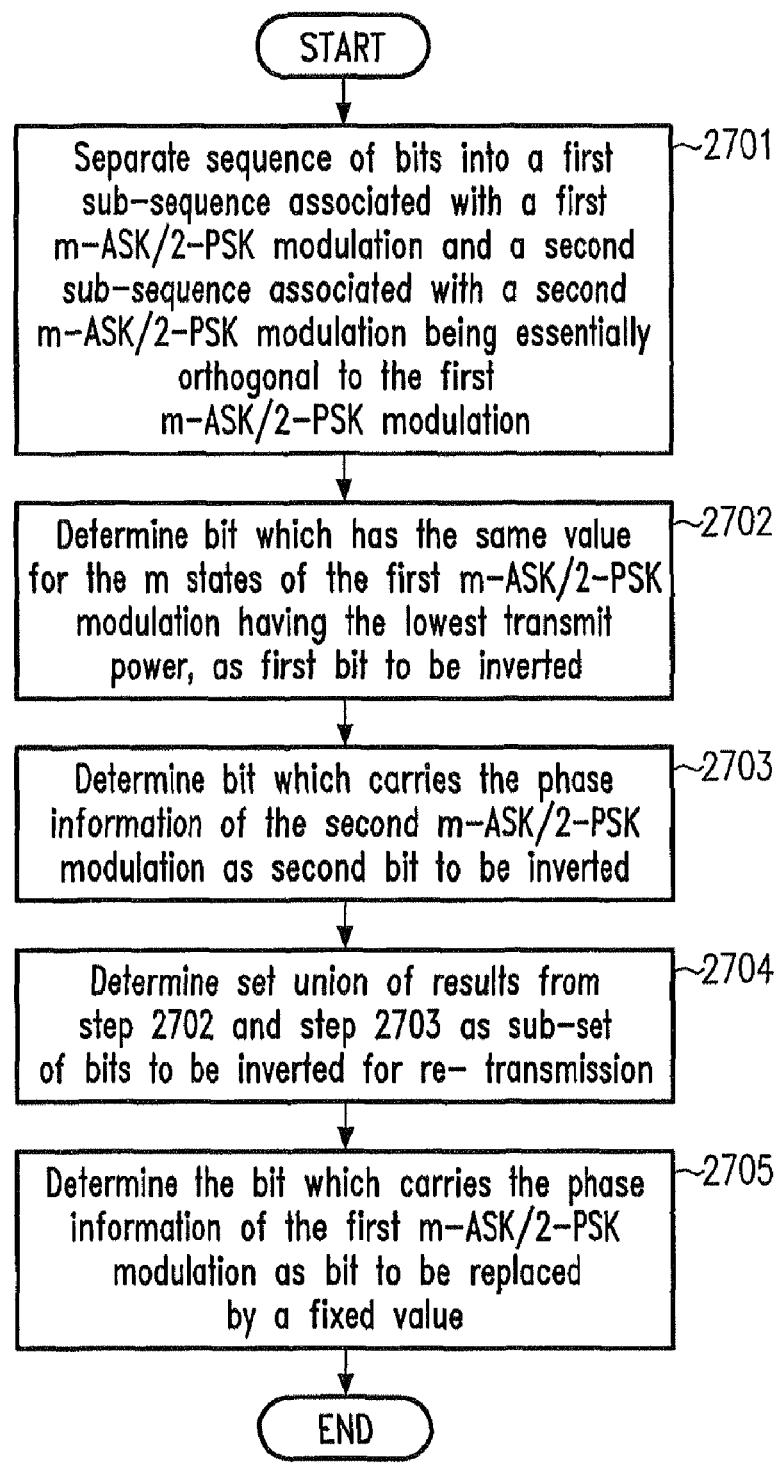
FIG. 27 shows steps for determining bits to be replaced by a fixed value and bits to be inverted for re-transmission with square QAM.

A special way of mixed ASK/PSK modulation is the combination of two orthogonal Gray Coded m-ASK/2-PSK modulations. This mixed constellation is sometimes also called "square QAM", in the following simply sq-QAM. Instead of treating the two ASK/PSK modulations individually, a more efficient way is introduced here with reference to FIGS. 27 and 28.

Separate the sq-QAM into two orthogonal m-ASK/2-PSK modulations, afterwards called AP1 and AP2 (step 2701).

AP1 Inversion rule: The bit to be inverted is the bit that has the same bit value for the exactly m/2 symbols with the smallest transmit power of the m-ASK part (step 2702). This is technically equivalent to the m symbols of the m-ASK/2-PSK with the smallest transmit power.

AP2 Inversion rule: The bit to be inverted is the bit that carries the 2-PSK part information (step 2703).

Determine which bits of the sq-QAM correspond to the separate AP1 and AP2 inverted bits.

Obtain sq-QAM inversion rule by combining both AP1 and AP2 inversion rules for the corresponding QAM bits (step 2704).

Select the bit carrying the PSK information of AP1 (i.e. the half-plane bit) to be the PAO bit, i.e. replaced by a fixed value (step 2705).

Obtain the sq-QAM counterpart sequence by applying the sq-QAM inversion rule.

It may be noted by those skilled in the art that for AP1 the same inversion bit may be alternatively identified as the bit that carries the same bit value for the exactly m/2 symbols with the highest transmit powers of the m-ASK part.

It should be noted that for a constellation layout as in the examples of FIGS. 28 and 31-34, the in-phase component could be chosen to be either AP1 or AP2 with the quadrature component being the respective other one. This does not make a difference to the effect of ambiguity reduction. In one case the combination results have real values, in the other case they have imaginary values. It may further be noted that in the case of any square-QAM the selected half-plane bit from AP1 as PAO bit is also a half-plane bit of the square QAM; specifically it may be a half-plane bit 4201 or 4204 that represents the in-phase or co-phase half-plane 4202, 4203, 4205, or 4206, depending on its value, as can be seen in FIG. 42.

Furthermore, two components orthogonal to each other but not parallel to any of the real and imaginary axes could be chosen to be AP1 and AP2, respectively.

EXAMPLE

Figure 29:
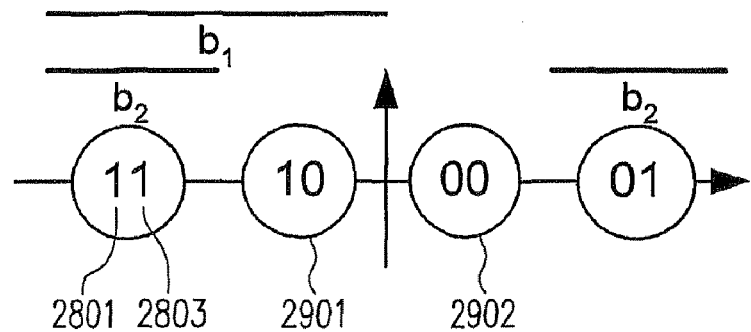
FIG. 29 depicts the in-phase part of the modulation scheme of FIG. 28.
Figure 30:
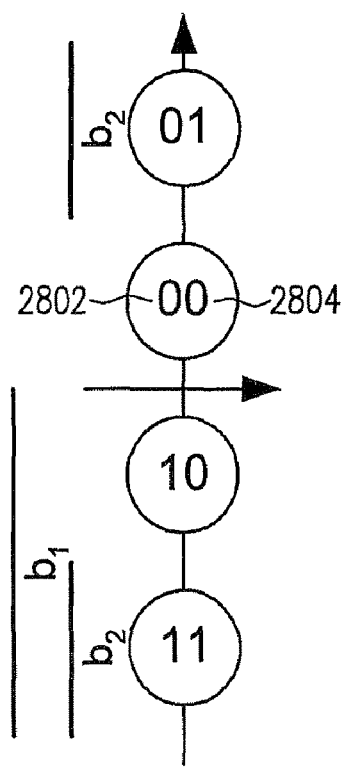
FIG. 30 depicts the quadrature part of the modulation scheme of FIG. 28.
Figure 31:
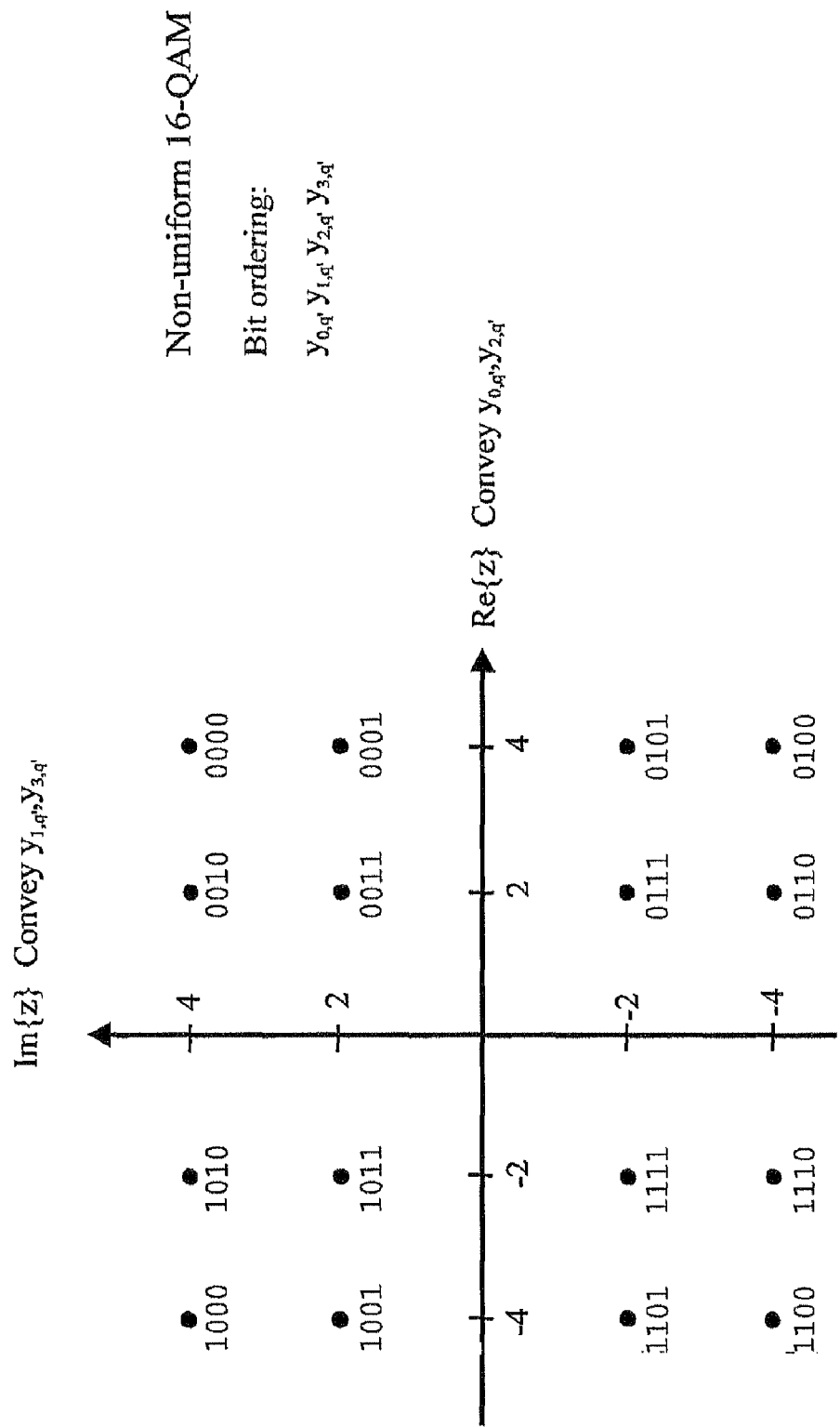
FIGS. 31 to 34 show examples of non-uniform square QAM.
Figure 32:
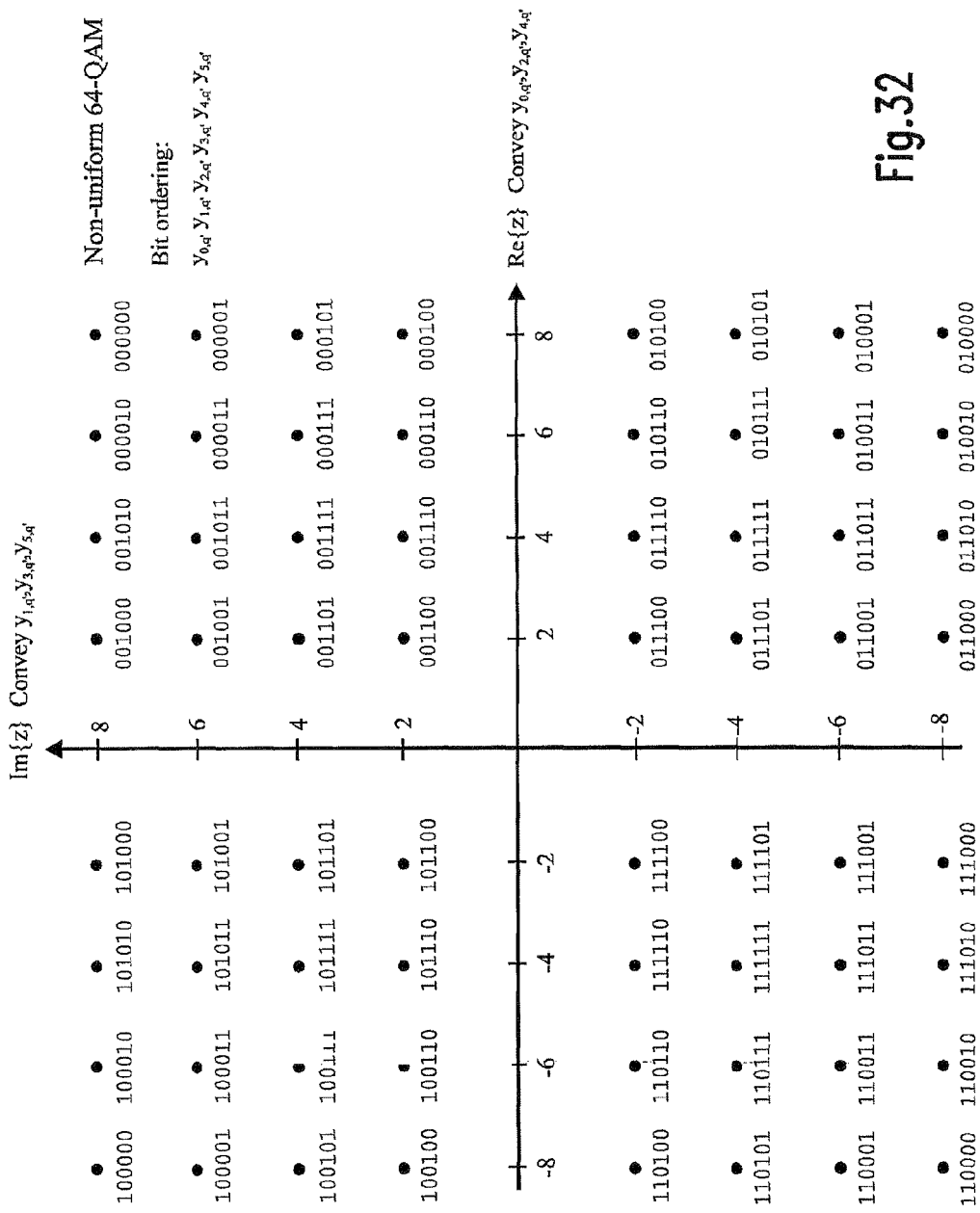
Figure 33:
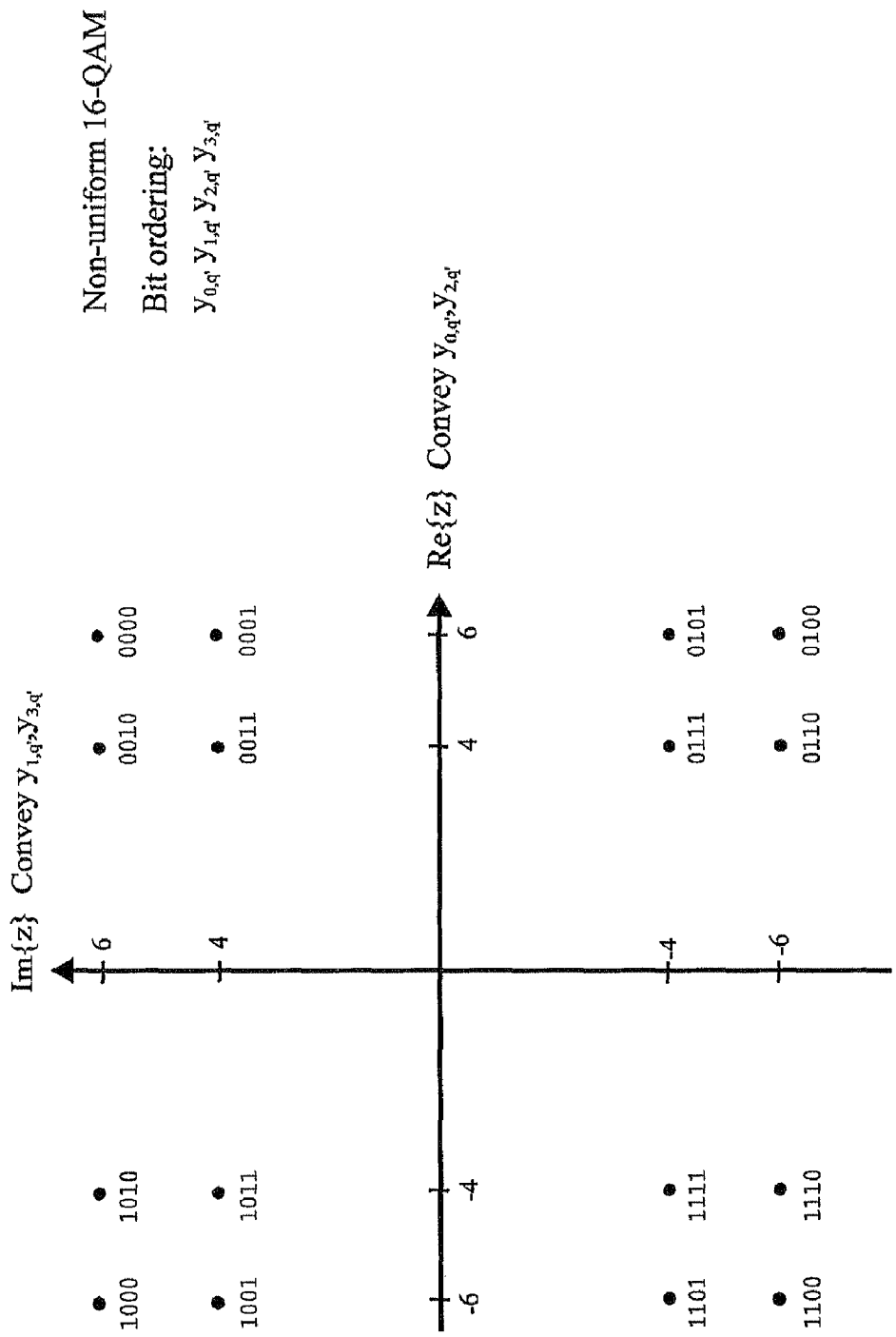
Figure 34:
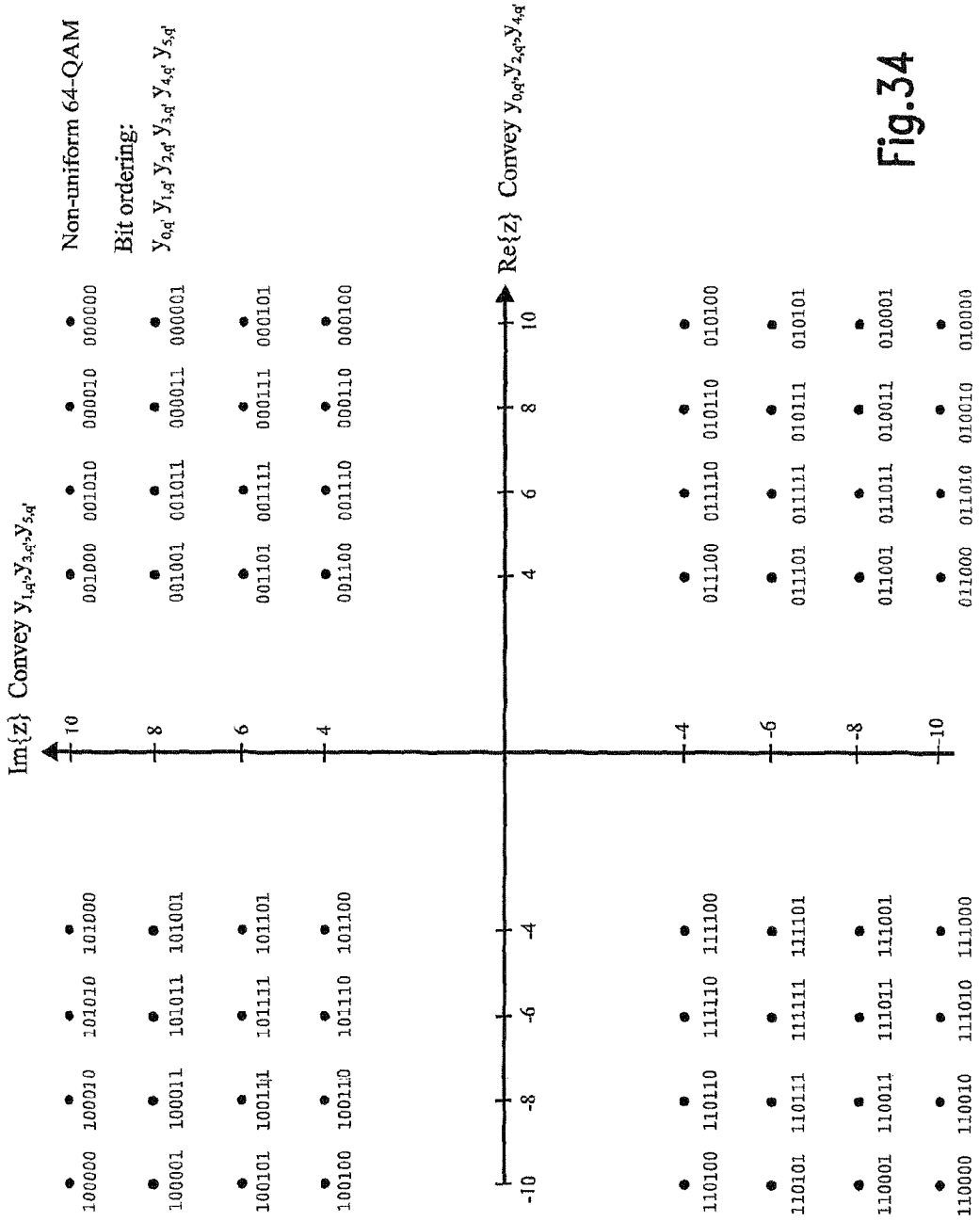

Using 16-sq-QAM as in FIG. 28, AP1 is defined as the 2-ASK/2-PSK in FIG. 29, AP2 as the 2-ASK/2-PSK in FIG. 30.

AP1:
  The bit that carries the same value for the exactly m/2=1 smallest transmit power symbol of the ASK part (2901 or 2902) is the 2nd ASK/PSK bit 2803, which is equal to zero for those symbols (see FIG. 29)
  Inversion rule AP1: Invert the 2nd ASK/PSK bit 2803.
AP2:

The bit that carries the PSK information is the 1st ASK/PSK bit 2802, which is equal to zero for a phase of 90 degrees against the real axis and equal to 1 for a phase of 270 degrees against the real axis (see FIG. 30).

Inversion rule AP2: Invert the 1st ASK/PSK bit 2802.

Correspondence of AP1 and AP2 inversion rule bits to original QAM bits (see FIG. 28):

The 2nd ASK/PSK bit 2803 from AP1 corresponds to the 3rd QAM bit

The 1st ASK/PSK bit 2802 from AP2 corresponds to the 2nd QAM bit

Obtain 16-sq-QAM Inversion rule: Invert both the $2^{nd}$ and the $3^{rd}$ sq-QAM bits.

Select phase bit 2801 (=half-plane bit) of AP1 (see FIG. 29) as PAO bit, i.e. to be replaced by a fixed value 0 or 1. This bit corresponds to the first QAM bit, defining the in-phase half-plane.

Original sq-QAM bit sequences:
0000, 0001, 0011, 0010, 0100, 0101, 0111, 0110 or 1100, 1101, 1111, 1110, 1000, 1001, 1011, 1010

Counterpart sq-QAM sequence inverting 2nd and 3rd bit:
0110, 0111, 0101, 0100, 0010, 0011, 0001, 0000 or 1010, 1011, 1001, 1000, 1110, 1111, 1101, 1100, respectively.

|  | PAO bit set to 0 | PAO bit set to 1 |
| --- | --- | --- |
| Original sq-QAM bit sequences | 0000, 0001, 0011, 0010, 0100, 0101, 0111, 0110 | 1100, 1101, 1111, 1110, 1000, 1001, 1011, 1010 |
| Counterpart sq-QAM sequence inverting 2nd and 3rd bit | 0110, 0111, 0101, 0100, 0010, 0011, 0001, 0000 | 1010, 1011, 1001, 1000, 1110, 1111, 1101, 1100 |

As an example, the first bit as PAO bit is set to the fixed value "1". Modulation state 2805 is assigned to bit sequence "1011". The counterpart "1101" is obtained by inverting the second and third bit and is associated with modulation state 2806. Combination of both symbols is accomplished by adding the vectors 2807 and 2808 representing the respective complex values of the modulation states. The result is point 2809. By repeating this calculation for all possible value combinations of the bit sequence, it appears that all bit sequences with a fixed value of 1 for bit 2801 yield a combination result equal to point 2809 and all bit sequences with a fixed value of 0 for bit 2801 yield a combination result equal to point 2810. Thus ambiguity is removed in both cases.

It should be noted that sometimes the term "square QAM" is strictly applied only to QAM mappings where the distance between nearest neighbouring points is equal for all points of the constellations. However those skilled in the art will appreciate that the algorithm presented here is also applicable for QAM mappings where this property is valid only for a subset of points. Examples are the non-uniform 16-QAM and 64-QAM constellations that are used in DVB, shown in FIGS. 31 to 34. In these constellations, the real axis and the imaginary axis are symmetry axes with respect to the constellation points representing complex values of the modulation states. Consequently we use the term "square QAM" here in a broad sense encompassing, but not restricted to, constellation layouts as in FIGS. 28 and 31-34.

Those skilled in the art will appreciate that a communication system or device may employ different methods to actually realise the determination of inversion rules. In one embodiment the inversion rules are obtained by executing the algorithms described in the present invention. In a preferred embodiment the inversion rules are determined for each modulation scheme used in the communication system or device and are stored in a memory or look-up table for quickly obtaining the inversion rules. In another preferred embodiment the inversion rules are coded into a hardware or software module, where step 1805 is equivalent to controlling which of those hardware or software modules is chosen during transmission.

Some of the algorithms will produce more than one counterpart sequence or inversion rule. This means that for optimum reduction of ambiguity levels more than one repetition of a bit sequence is necessary, i.e. a bit sequence has to be transmitted more than twice. If this is not desired from a system capacity point of view, then one of the counterpart sequences/inversion rule has to be chosen. A non-optimum reduction of amplitude ambiguities or removal of phase ambiguities alone may be considered as sufficient. Consequently a number of counterpart sequences less than the optimum might be sufficient.

The algorithms described so far have assumed that the target is an optimum reduction of ambiguity levels by combining complex values of the first and further pluralities of bits mapped onto modulation states. However it may be desirable or sufficient to define the target as a sub-optimum reduction of amplitude ambiguity levels. For example it might be desirable to reduce the ambiguity to a 4ASK-equivalent level, which means four amplitude levels and one phase level. While a channel estimation for this is generally inferior compared to a situation of a single resultant complex value, it may be beneficial from a demodulated LLR value point of view for the data bits transmitted in the pluralities of bits, or from the point of view of reducing the loss of transmission capacity.

Since the algorithm we have given for ASK results in only one amplitude level when considering the exactly $2^{n-1}$ modulation states with the lowest transmit power in step 2102, with n bits per sequence (compare FIGS. 21 and 22), we can extend the algorithm to any number of target amplitude levels being a power of two. Let $2^k$ be the target number of amplitude levels. Then the procedure to find the inversion rule should be:

Determine bit for inversion, which has the same first value for the $2^{n-k-1}$ modulation states with the lowest transmit power and a value opposite to the first value for the next modulation state with the next higher transmit power value.

Or as mentioned earlier, alternatively:

Determine bit for inversion, which has the same first value for the $2^{n-k-1}$ modulation states with the highest transmit power and a value opposite to the first value for the next modulation state with the next lower transmit power value.

For k=0 we get the same strategy as mentioned earlier and as in block 2102 of FIG. 21. For k=n there is no reduction of amplitude levels possible. Consequently k can take preferably integer values ranging from 0 to n−1.

As an example applying k=1 to the constellation in FIG. 22 where n=3, the two constellation points "011" and "010" have equal bit values $b_1$=0 and $b_2$=1. However since $b_2$=1 not only for the two lowest transmit power points, but for the four lowest transmit power points, it does not fulfil the requirement of having "the same first value for the $2^{n-k-1}$ modulation states with the lowest transmit power and a value opposite to the first value for the next modulation states with the next higher transmit power value". Consequently bit $b_1$ is determined as the bit to be inverted in the inversion rule.

For PSK modulation schemes, a set of inversion rules is obtained. By choosing only a subset of these inversion rules, the ambiguity in phase can already be reduced. In the example for FIG. 20, an inversion of only the first bit results in just two phase levels after combination: Combination of symbol 2001 with 2002 and of symbols 2003 with 2004 results in two different points, however both of which are on the imaginary axis, sharing the same phase level. Overall this inversion rule alone results in combinations of two phase levels and two amplitude levels, equivalent to a 2-ASK/2-PSK. Likewise an inversion of only the third bit results in a QPSK-equivalent combination. Symbol 2001 combined with 2003 results in the same amplitude level as symbol 2002 combined with symbol 2004. Altogether an inversion of the third bit only results in combinations of one amplitude level and four phase levels.

To remove phase ambiguity completely in these cases, the number of half-plane bits that have to be used as PAO bits with a fixed value depends on the number of phase levels that the inversion rules alone can achieve. If the result achieved by the inversion rules comprises two phase levels, then setting one half-plane bit as PAO bit is sufficient. If the result achieved by the inversion rules comprises four phase levels, then setting two half-plane bits as PAO bits is required. Generally for removal of phase ambiguity the number of required PAO bits is the dual logarithm (logarithm to the base 2) of the number of phase levels that results from the used inversion rules. It may be noted that the fixed bit value of a first PAO bit and the fixed bit value of a second PAO bit may be chosen independently. Of course the more PAO bits are used, the higher the loss of transmission capacity.

Figure 38:
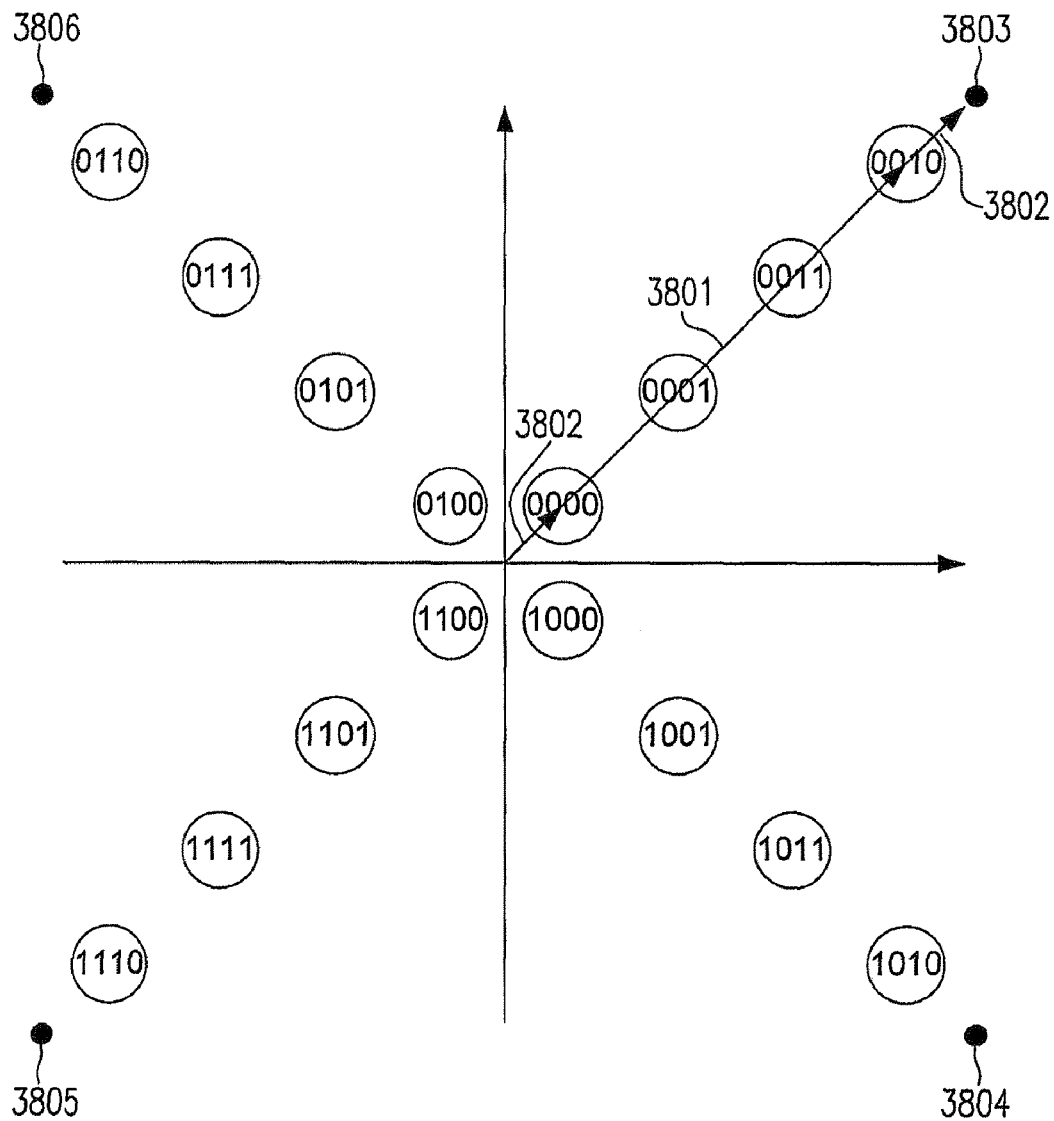
FIG. 38 depicts a suboptimum combination and inversion case resulting in a QPSK-equivalent ambiguity situation for an original 4-ASK/4-PSK.

Obviously the above strategies for reducing the amplitude or phase levels for ASK and PSK are also applicable to a mixed ASK/PSK. In the example of FIG. 38 the 4-ASK part is modified to reduce the number of amplitude levels from four to one by inverting the first ASK bit. The 4-PSK part is not modified, such that altogether the only inversion rule is the inversion of 4-ASK/4-PSK bit number three, being equivalent to 4-ASK bit number one. The combination results in one amplitude and four phase levels, equivalent to a QPSK.

As an example, vector 3801 represents the constellation point for the bit sequence "0010". The first ASK bit is the third bit in the sequence. Therefore the inversion rule determines to invert the third bit, which yields bit sequence "0000" represented by vector 3802. The combination of both transmissions yields value 3803. Other possible combination results for different values of the bit sequence are 3804, 3805 and 3806. To completely remove ambiguity, both the first and the second bit have to be set to fixed values. Depending on the combination of these fixed values, one single of the combination results 3803, 3804, 3805 and 3806 is obtained.

For the square-QAM or sq-QAM, a suboptimum reduction of ambiguity levels can be achieved if either of the AP1 or AP2 inversion rules are modified. As outlined above, for a combination of one amplitude and two phase levels, the AP1 inversion rule is equivalent to reducing ambiguities for an m-ASK part, and the AP2 inversion rule is equivalent to reducing ambiguities for a 2-PSK part. For a suboptimum combination with more amplitude levels than one, the reduction for the m-ASK part of AP1 should follow the extended algorithm as outlined above for reducing n amplitude levels of ASK to $2^k$ amplitude levels. For a suboptimum combination with more phase levels than two, the AP2 inversion rule for reducing the 2-PSK part should be replaced by the inversion rule for reducing the m-ASK part of AP2 to $2^k$ as outlined in the extended algorithm above. It should be mentioned that of course the value of k for AP1 can be different from the value of k for AP2. For the required number of PAO bits to remove phase ambiguity complete, see the explanation further above.

Figure 39:
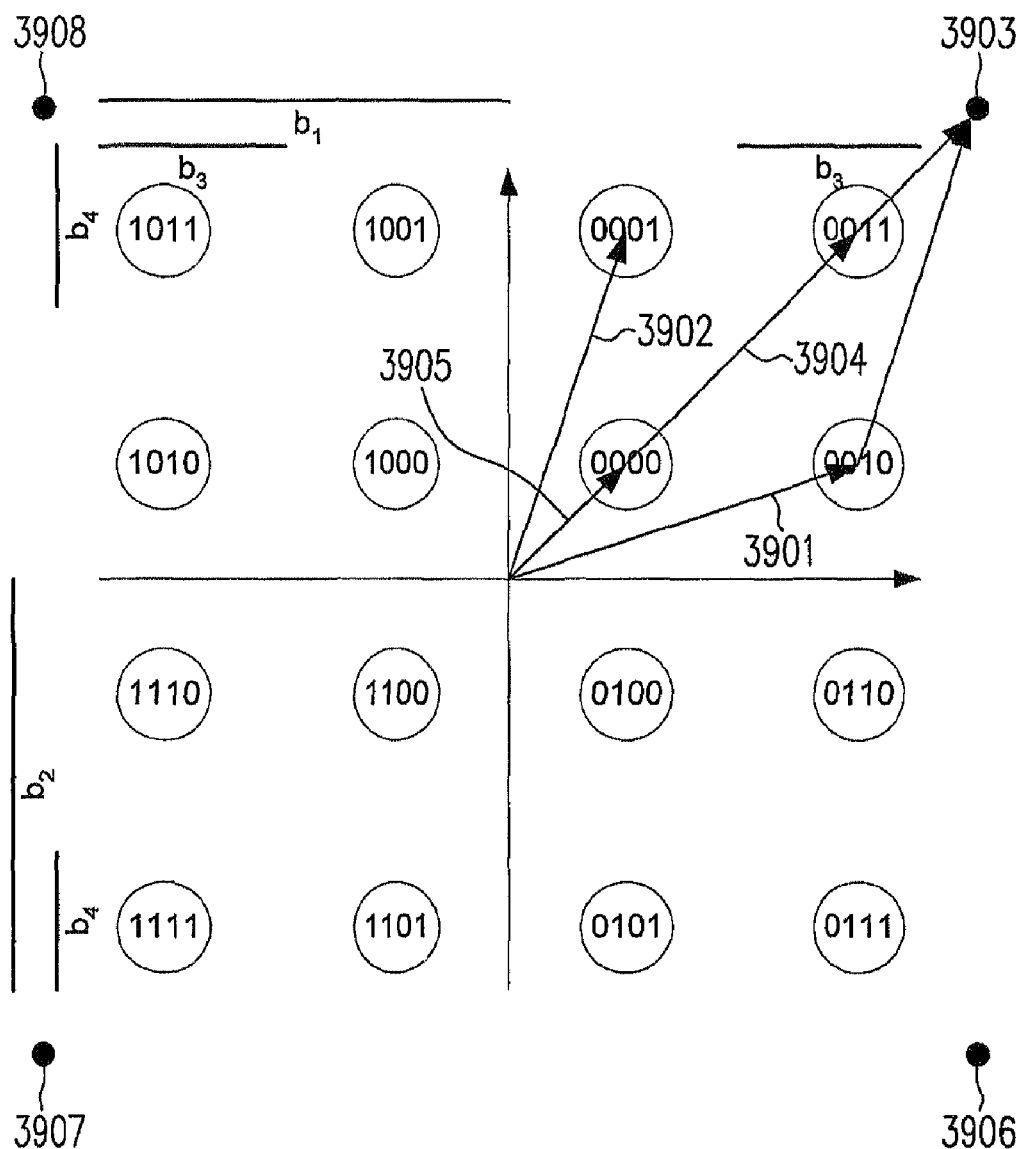
FIG. 39 depicts a suboptimum combination and inversion case resulting in a QPSK-equivalent ambiguity situation for an original 16-square-QAM.

In the example of FIG. 39 it is shown that a combination of one amplitude level and four phase levels is achieved by Applying the AP1 inversion rule for the 2-ASK part, inverting the second bit 2803 of the two AP1 ASK/PSK modulation bits (compare FIG. 29)

Applying the modified AP2 inversion rule for the 2-ASK part, inverting the second bit 2804 of the two AP2 ASK/PSK modulation bits (compare FIG. 30)

Resultant inversion rule: Invert the third and fourth 16-sq-QAM bits $b_3$ and $b_4$, corresponding to the second bits of AP1 and AP2 respectively.

To remove phase ambiguity completely, both half-plane bits b1 and b2 of the 16-QAM have to be set to fixed values.

As an example, bit sequence "0010" is represented by vector 3901. AP1 inversion rule determines the third bit $b_3$ of the bit sequence as bit to be inverted (being the second bit of $b_1$ and $b_3$). AP2 inversion rule determines the fourth bit $b_4$ to be inverted (being the second bit of $b_2$ and $b_4$). The resulting bit sequence for the second transmission (or re-transmission) is "0001", represented in the complex plane of modulation states by vector 3902. The combination of both modulation states, achieved by addition of vectors 3901 and 3902, yields complex point 3903. Similarly, for bit sequence "0011" represented by vector 3904, the bit sequence for the second transmission is "0000" represented by vector 3905. The combination of both values again yields complex value 3903. Other possible combination results for other bit sequences are points 3906, 3907 and 3908. To remove phase ambiguity completely, the half-plane bits (i.e. the first two bits) have to be set to fixed values as PAO bits, which would mean selecting one of the four quadrants as a PAO subset of modulation states to be used in the transmissions.

The original constellation may be different from what is shown in the examples. However the procedure as outlined above can still be used as long as the mapping of bit sequences is compliant to the Gray coding/mapping strategy.

As explained above, not all bit sequences in a frame have to use the approach as disclosed in the present invention. This also applies to the bit manipulation implementation.

Figure 35:
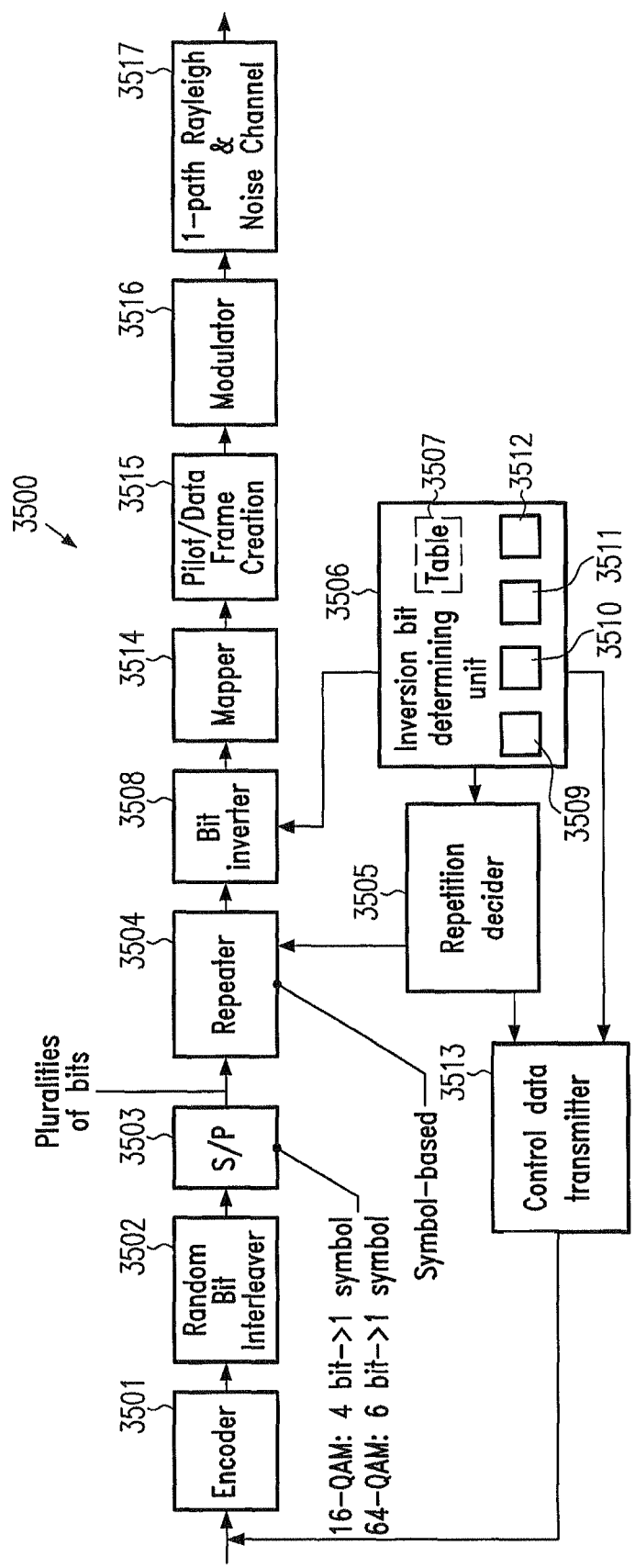
FIG. 35 shows an example of a transmitter chain.

In FIG. 35 a transmitter 3500 is illustrated, which can be used to transmit data according to the method described above.

In the transmitter 3500, a bit stream to be transmitted is encoded in encoder 3501. The encoded bit stream is interleaved in random bit interleaver 3502. In S/P unit 3503, groups of bits are combined into bit sequences (pluralities of bits) which are later represented by one transmitted symbol. The number of bits to be combined depends on the number of modulation states available. For example, for 16-QAM ld 16=4 bit are combined into one sequence, for 64-QAM ld 64=6 bit are combined into one symbol. In repeater 3504, symbols are repeated for re-transmission. The repetition factor and the ratio of symbols to be repeated is depending on the particular version of the method. This is controlled by repetition decider 3505. Inversion bit determining unit 3506, which may comprise a memory 3507 for storing a table containing bit inversion information, determines particular bits of repeated bit sequences to be inverted in the selective bit inverter 3508, depending on the modulation scheme as described above. The bits may be determined for inversion based on information received from a peer entity, by carrying out respective algorithms or by reading stored information from a memory. Inversion bit determining unit 3506 may further comprise sub-units (3509-3512) carrying out sub-steps of the methods for determining the sub-set(s) of bits for inversion and sub-steps of the methods for determining the sub-set(s) of bit(s) for replacement as PAO bit(s) as described above. Bit inverter unit 3508 may further comprise a bit replacement unit to replace PAO bit(s) by a selected fixed value. Transmitter 3500 may further comprise a control data transmitter 3513 transmitting information about repetition of bit sequences and about inverted bits via the same or another transmission channel.

Mapper 3514 maps symbols, representing one bit sequence each, to modulation states using a mapping which is invariant at least between transmission of a symbol and re-transmission of the same symbol with a part of the bits inverted, like described above.

After the mapping, pilot data is added and frames are combined in Pilot/Data frame creation unit 3515 before the information is modulated onto a carrier in modulator 3516. The modulated signal is sent to a receiving entity via channel 3517.

Depending on the particular implementation, transmitter 3500 may comprise further units like IF stage, mixers, power amplifier or antenna. From a signal flow point of view, such units might also be seen comprised in channel 3517, as they all may add noise to the signal or exert phase shift or attenuation on the signal.

Units 3501 to 3516 may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software implementations are possible.

Obviously the described techniques reduce the data transmission capability (capacity) of the transmission channel. Therefore the receiver has to know how to treat the received original and counterpart data. This knowledge may for example be obtained by signalling from the transmitter to the receiver. Preferably some pre-determined patterns are defined for a communication system, which define the location and method to which part of the data and in which fashion the described method is applied. Then it is sufficient to signal a simple parameter that points to or represents one of these pre-defined patterns, from which the receiver can reconstruct the particular method and fashion employed by the transmitter.

The methods outlined above may for example mean that one or more of the bits transmitted is replaced or punctured. In other words, the original value of such bit(s) is lost to the receiver. Since the receiver, by way of the method described in the preceding paragraph, may have knowledge about which of the bits are affected in such a way, it is able to adapt its output to this situation. The receiver should set the information for such affected bits to a value that signifies "unknown". For example if the receiver (demodulator) uses LLR information as the output, an LLR value representing "unknown" is 0. If it uses bit probabilities, the respective probability value is 0.5. If hard decision is used, i.e. either just 0 or 1, the receiver may randomly generate a bit value since it has no information at all on which it could base the decision for the value of said replaced or punctured bit. Preferably a bit that is replaced or punctured in the transmitter is part of a bit sequence after FEC encoding, i.e. adding of redundancy. In such a case the replacement or puncturing of a bit merely removes a part of the redundancy, but does not automatically introduce a loss of bit information or bit error. The remaining transmitted redundancy may still be able to compensate for such loss of redundancy such that after FEC decoding no bit or block error results.

Figure 45:
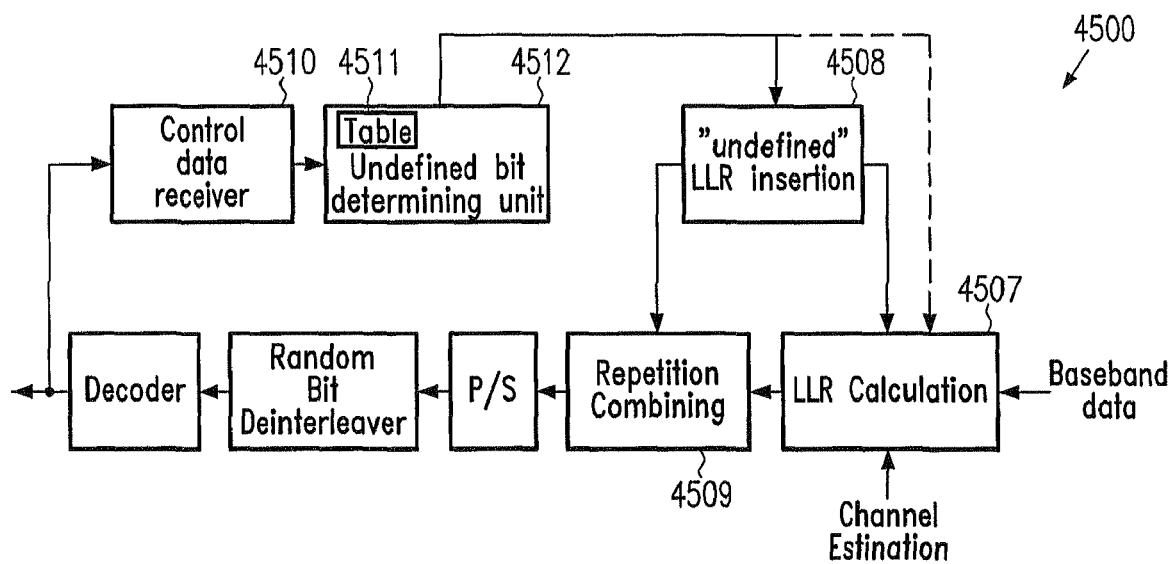
FIG. 45 shows an exemplary receiver structure.

FIG. 45 shows an exemplary structure of a receiver which could be used to receive data transmitted by transmitter 1300 or 3500. Channel estimation values are provided to LLR calculation unit 4507 to be considered for the calculation of the LLR values. Unit 4508 inserts appropriate values (0 for LLR or 0.5 for linear probability) for bits which have been punctured or replaced by a fixed value in transmitter 1300 or 3500, before all LLR values are subject to repetition combining in unit 4509. In order to determine, for which bits LLR values have to be inserted, control data receiver 4510 may receive respective information from the transmitter. The received data may directly specify the replaced bits, or it may specify a pre-defined scheme stored for example in table 4511, from which this information may be derived. Unit 4512 uses this information to control unit 4508 accordingly. Optionally, unit 4507 may be controlled to skip calculation of meaningless LLR values in order to reduce its calculation requirements.

Figure 36:
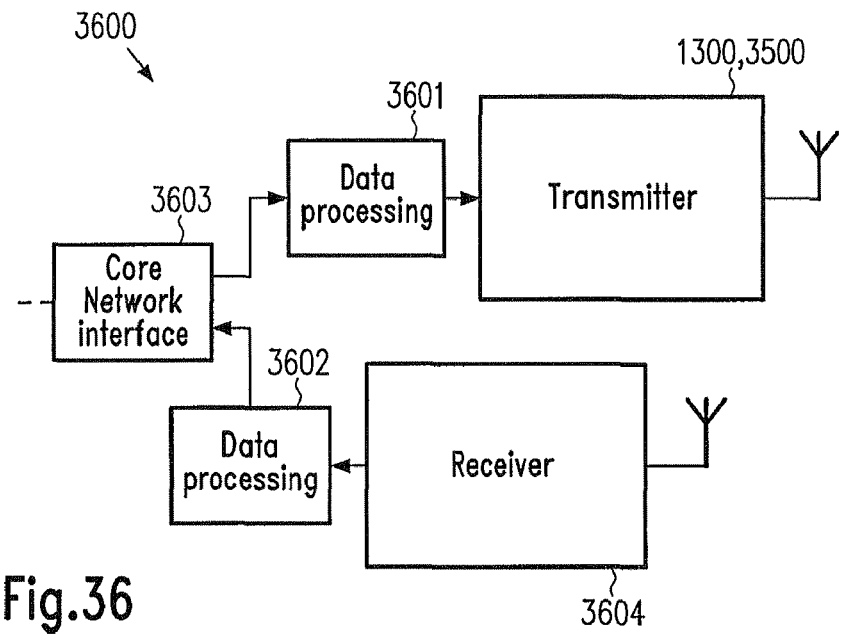
FIG. 36 illustrates an exemplary structure of a base station.

Transmitter 1300 or 3500 and/or receiver 4500 may be part of a base station 3600 as shown in FIG. 36. Such a base station may further comprise data processing units 3601 and 3602, a core network interface 3603 and a corresponding receiver 3604 which may be constructed as shown in FIG. 45.

Figure 37:
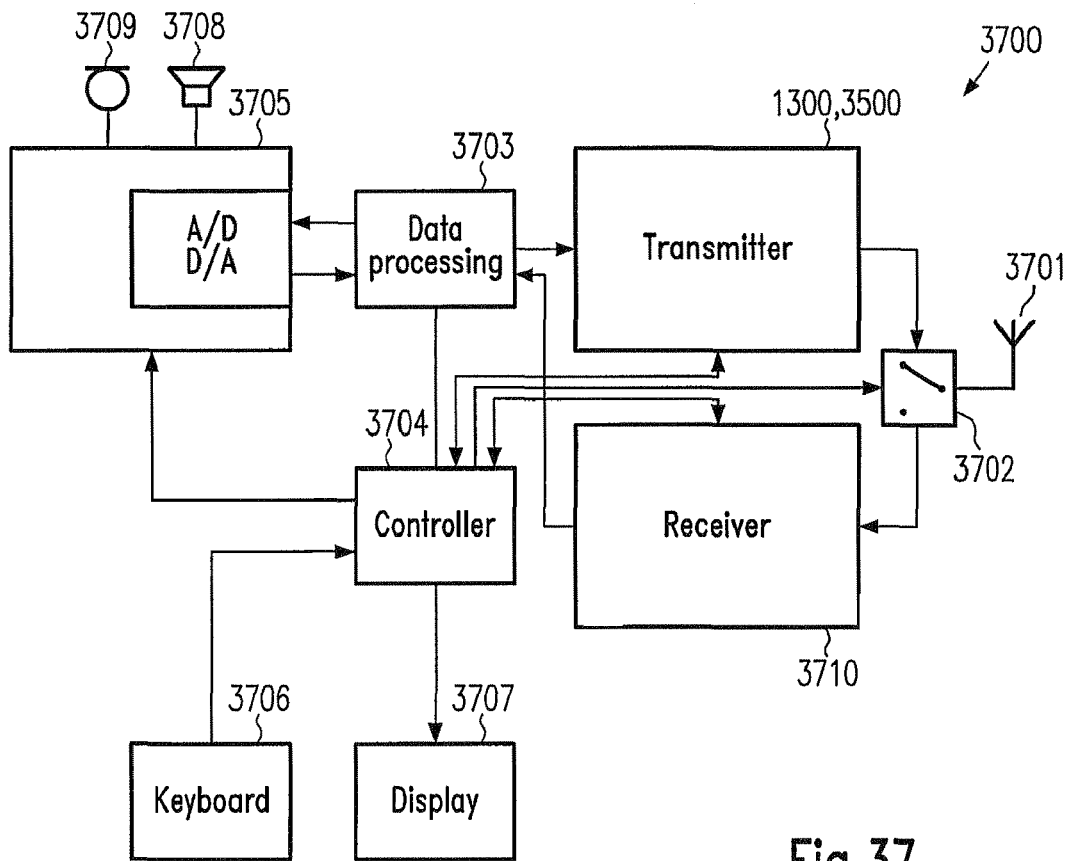
FIG. 37 illustrates an exemplary structure of a mobile station.

A counterpart to base station 3600 might be a mobile station 3700 as shown in FIG. 37. Besides transmitter 1300 or 3500 and receiver 3710 (optionally constructed as shown in FIG. 45), a mobile station may further comprise antenna 3701, antenna switch 3702, data processing unit 3703 and controller 3704.

Mobile station 3700 might be a mobile phone or a module to be integrated into a portable computer, PDA, vehicle, vending machine or the like. A mobile phone may further comprise mixed signal unit 3705 and a user interface comprising keyboard 3706, display 3707, speaker 3708 and microphone 3709.

A method and a transmitter according to the above described embodiment may completely remove ambiguity in the combination result of retransmitted symbols. This may advantageously improve the reliability of the channel estimation in a digital communication system. A better channel estimation has the advantage of reduced error rates and may provide connection with wireless communication systems in areas of weak coverage, fast fading conditions and other adverse circumstances.

Figure 46A:
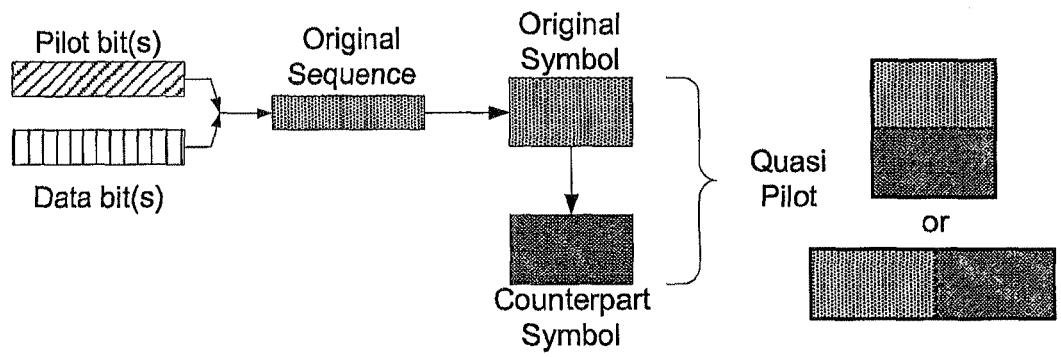
FIGS. 46a and 46b show a simplified structure of original and counterpart symbol generation, and their joint interpretation as a Quasi-Pilot.
Figure 46B:
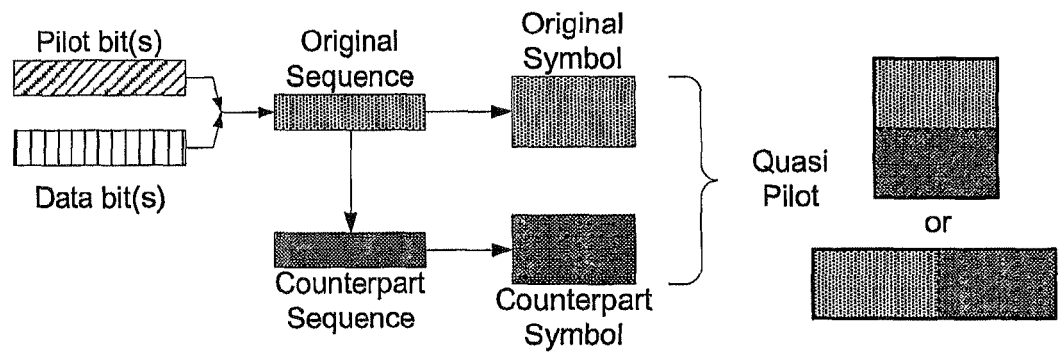

The general and detailed description have shown how data symbols can be used for purposes of e.g. channel estimation. This process is shown in a simplified way again in FIGS. 46a and 46b, assuming that the phase ambiguity is reduced to one by fixing a certain bit; this bit is denoted as "pilot bit" in the figures. The pilot bit is multiplexed together with the data bits to generate the original sequence, which is ultimately used to generate the original symbol and the at least one counterpart symbol. In the following it is described what kind of data may actually be preferably transmitted on such symbols. This is outlined as most applicable for a mobile radio system scenario; however the same considerations can be applied mutatis mutandis to fixed line or other types of communication systems.

For simplicity of the subsequent description, the following terms are defined:

Original Symbol: A symbol that is generated from an original bit sequence as illustrated in FIG. 46.

Counterpart Symbol(s): At least one symbol that is generated from an original symbol, or from at least one counterpart sequence to an original bit sequence, as illustrated in FIG. 46.

Quasi-Pilot Symbol: The combination of an original symbol and the corresponding counterpart symbol(s).

Pilot Symbol: A single symbol that can be used as a reference symbol for channel estimation.

Simple Data Symbol: A single symbol conveying data bits to one or more receivers.

Simple Control Symbol: A single symbol conveying information that is required or helpful for successful system operation.

Generally a simple data symbol may convey any kind of data. This may include control data or signalling data, as well as data pertaining to a user or service application such as voice data, video data, software data etc.

Simple control symbols on the physical layer are generally used for signalling purposes. For signalling purposes a lot of information needs to be transmitted between the network and the terminals. This information includes signalling messages generated above the physical layer, as well as the required physical layer control channels needed for system operation but not necessarily visible for higher layer functionality. This kind of information is usually transmitted as simple control symbols.

The following channels are explained for their use in relation to the UMTS network. Other networks may use different names, however regardless of the name there will exist some data that fulfils the same or similar functionalities as those described here. Therefore the description should be understood as to be not restricting only to a UMTS system or the given names of channels.

A synchronisation channel is needed for the cell search. By means of this channel frame and slot synchronisation is obtained, as well as information on the group the cell belongs to.

A broadcast channel is used to transmit information specific to the network or for a given cell. The most typical data needed in every network is the available random access codes and access slots in the cell, or the types of transmit diversity methods used with other channels for that cell. As the terminal cannot register to the cell without the possibility of decoding the broadcast channel, this channel is needed for transmission with relatively high reliability in order to reach all the users within the intended coverage area.

A forward access channel carries control information to terminals known to locate in the given cell, for example after a random access message has been received by the base station. It may also be used to transport packet data to a terminal.

A paging channel carries data relevant for the paging procedure, that is when the network wants to initiate communication with the terminal. A simple example is a speech call to a terminal; the network transmits the paging message to the terminal in those cells belonging to the location area that the terminal is expected to be in.

A random access channel is intended to be used to carry control information from the terminal to the network. It is typically used for signalling purposes, to register the terminal after power-on to the network, or to perform location update after moving from one location to another, or to initiate a call. For proper system operation the random access channel must be heard from the whole desired cell coverage area, which requires a relatively high reliability of the transmitted data.

An acquisition indicator channel is used to indicate from the base station the reception of the random access channel signature sequence. Therefore it needs to be heard by all terminals in the cell, which requires a relatively high reliability of the transmitted data. This channel commonly is not visible to higher layers.

A paging indicator channel operates together with a paging channel to provide terminals with efficient sleep mode operation. Consequently this channel has to be heard by all terminals in the cell, which requires a relatively high reliability of the transmitted data.

A shared control channel carries necessary physical layer control information to enable reception/demodulation/decoding of data on a shared data channel, and to perform possible physical layer combining of the data sent on a shared data channel in case of retransmission or an erroneous data packet A dedicated physical control channel may furthermore carry necessary control information containing feedback signals, such as ARQ acknowledgements (both positive ACK and negative NAK), as well as link quality information (such as a channel quality indicator CQI).

A shared control channel may contain information detailing one or more of the following items:
  Information about one or more of a spreading code, time instant(s), frequency (sub-)carriers that is used for data transmission
  Modulation scheme used for data transmission, e.g. BPSK, QPSK, 8-PSK, 16-QAM, 64-QAM, etc.
  Redundancy version of the data block in case of ARQ with multiple redundancy versions, i.e. so-called "incremental redundancy"
  ARQ process number in case several ARQ processes can exist in parallel
  First transmission/retransmission indicator, indicating whether a receiver should combine the actual received data with previously received data, or whether buffers should be flushed and filled only with new data
  Channel coding (FEC) type and rate It may be advantageous in a communication to reduce the correlation between different signals in a communication system to reduce the interference. In case of a correlation reduction to zero this process is sometimes called "orthogonalization". Orthogonalization may for example be achieved by spreading or multiplication with orthogonal sequences, e.g. OVSF sequences that result from a Walsh-Hadamard matrix. A possibility to reduce the correlation is scrambling or multiplication with non-orthogonal sequences such as pseudo-noise sequences, e.g. Gold sequences.

Orthogonalization or correlation reduction techniques may also be applied to the present invention. This can be accomplished by applying the symbol-based orthogonalization or correlation reduction techniques jointly to the Quasi-Pilot Symbol, or by applying these techniques individually to each of the original and counterpart quasi-pilot symbol(s). This is shown for the multiplication with a spreading code in FIGS. 57-58.

Alternatively in case of bit-based orthogonalization or correlation reduction techniques, these are applied to the original and counterpart sequence(s) identically, or individually to each of the original and counterpart bit sequence(s).

Figure 60:
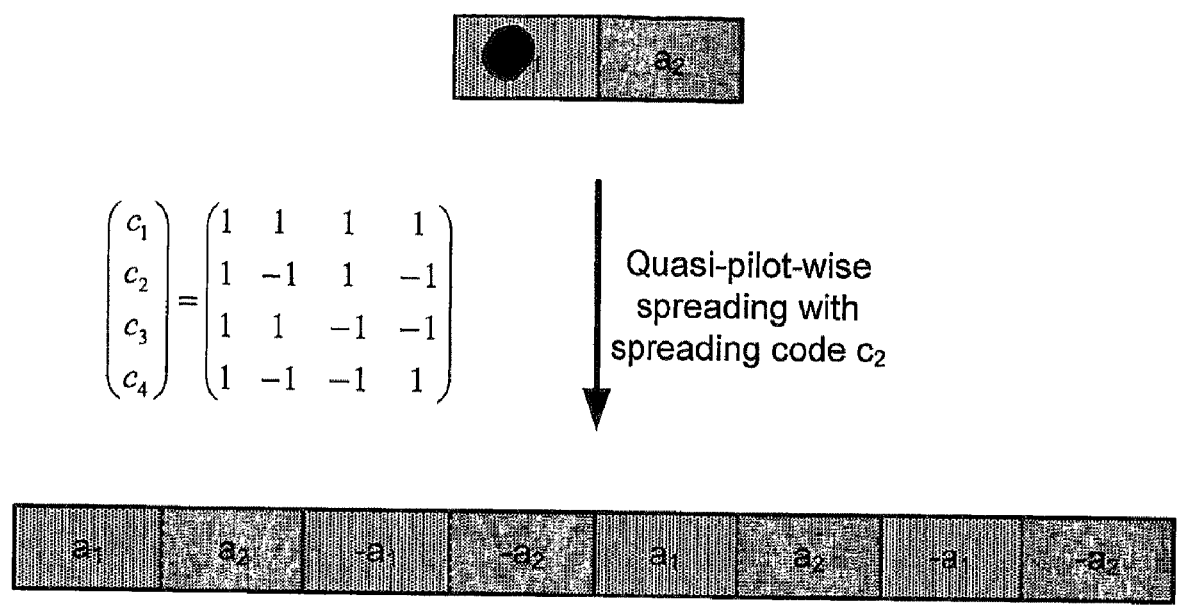
FIG. 60 illustrates the process of quasi-pilot-wise spreading of a quasi-pilot symbol with a spreading code.

Of course the quasi-pilot components may also be spread by bandwidth expansion. Again this spreading may be done based on the constituent components individually, or jointly based on the quasi-pilot symbol. FIGS. 59-60 show an example of bandwidth spreading with a spreading code.

Additionally it may be beneficial in a system to modify the quasi-pilot symbols prior to transmission, for example by multiplication with a constant phase term. For carrier tracking reasons it may be desirable that neither the real part nor the imaginary part of a quasi-pilot symbol is zero. If however the design of the quasi-pilot is such that a quasi-pilot symbol lies on one of the orthogonal axes, the quasi-pilot symbol may be shifted in phase. Evidently a phase shift of a quasi-pilot symbol is equivalent to a phase shift of the original and corresponding counterpart symbol(s). Even though FIG. 61 shows the principle for a constant phase shift applied to all quasi-pilot symbols, those skilled in the art will recognise that the shift may vary from symbol to symbol.

Figure 47:
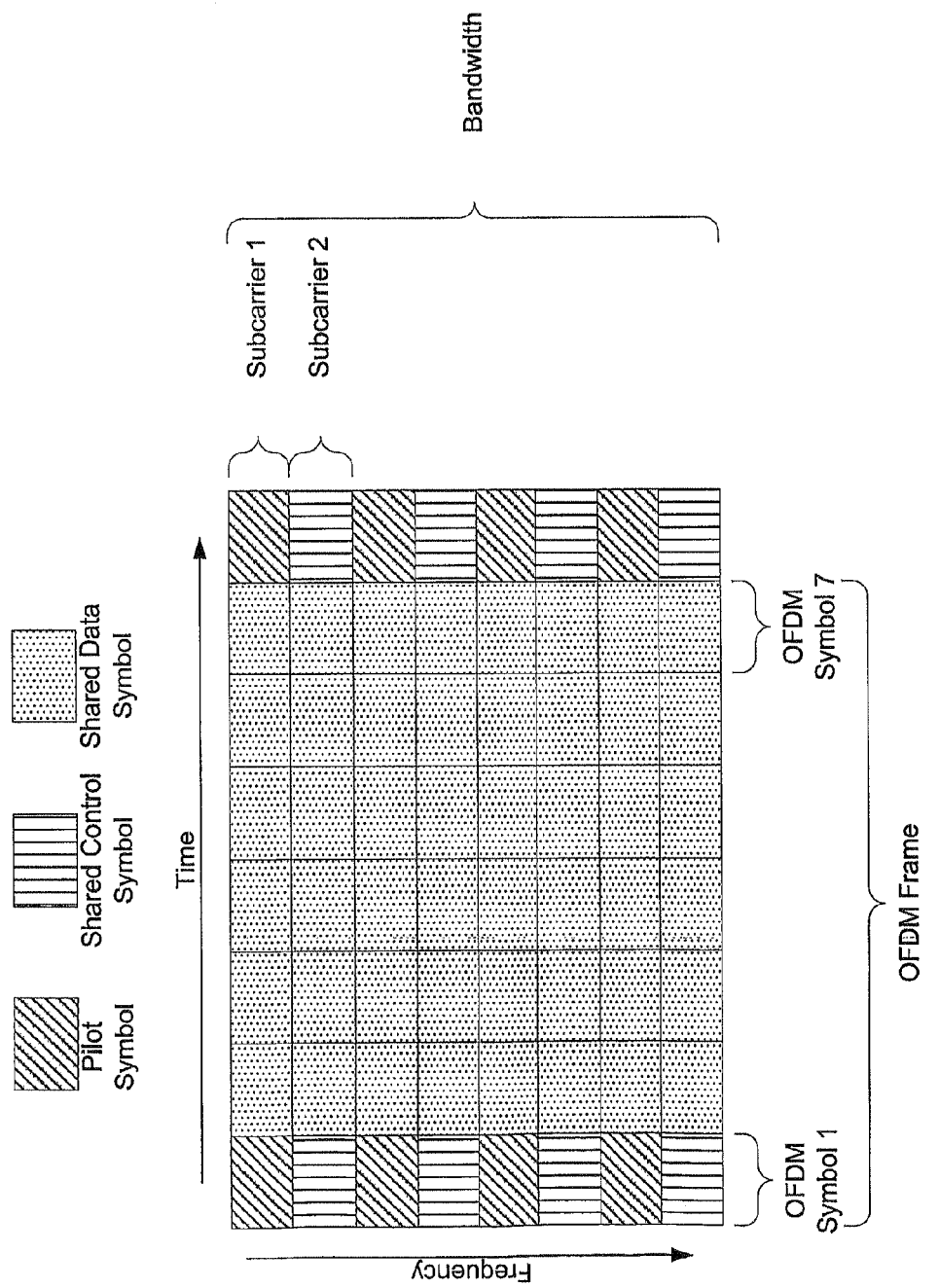
FIG. 47 illustrates a prior art OFDM frame structure including pilot symbols, shared control symbols, and shared data symbols.

FIG. 47 shows a simple case where the ratio of pilot symbols to shared control symbols is one, i.e. the number of such symbols per frame is identical. Therefore it is easy to combine each one pilot symbol with each one control symbol to one quasi-pilot symbol. However in a system it is possible that the said ratio is not equal to one. One solution is that just as many quasi-pilot symbols are constructed as there are both pilot and control symbols. For example if there are n pilot symbols and m control symbols, then min(n,m) quasi-pilot symbols may be generated, and additionally either n-m pilot symbols or m-n control symbols are transmitted as simple symbols according to prior art schemes.

Figure 66:
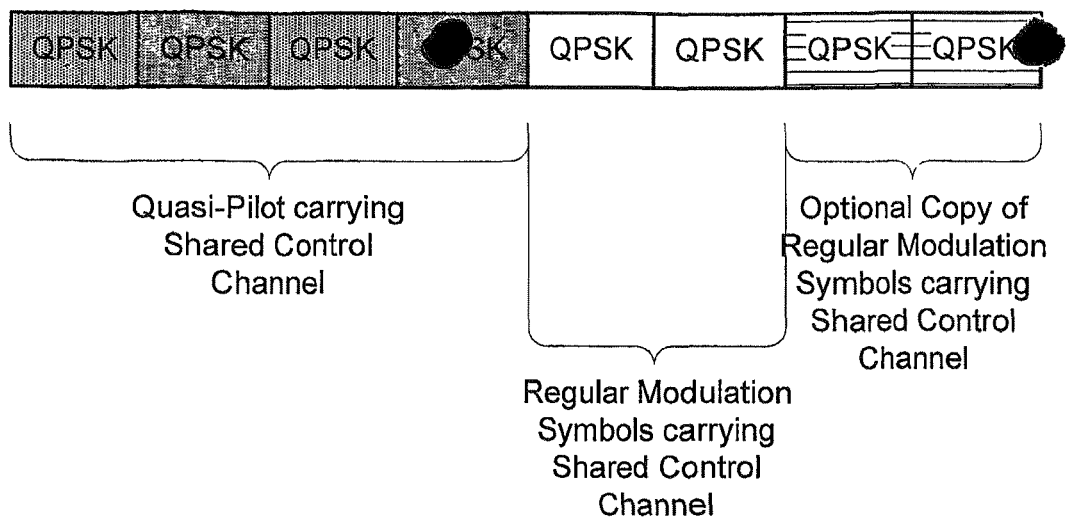
FIG. 66 illustrates the usage of the same modulation schemes for original symbols, counterpart symbols, and simple data symbols.

If the transmission using quasi-pilots requires a modulation scheme that conveys at least two bits per symbol, it may occur that the data that pertains to the same transport channel (e.g. shared control channel) cannot be completely mapped onto quasi-pilot symbols. Generally the excess data may be transmitted using a modulation scheme that is independent from the quasi-pilot modulation scheme, as shown in FIG. 65. From a uniform design point of view however it may be preferable to transmit such a transport channel using a single modulation scheme. In such a case it may be preferable to either reduce the number of symbols, or optionally to repeat some of the non-quasi-pilot symbols to fill out the available bandwidth, as shown in FIG. 66.

For timing reasons it may be preferable to transmit control or signalling data within the first time slot(s) of a frame. Particularly for shared data channels or other channels which transmit user data at least partially in a time-multiplexed fashion, it may be preferable from a timing point of view to transmit a control channel well in advance to the corresponding data channel to which the control data pertains, in order to allow a receiver time to process the control data and take the required actions for proper reception of the data information. This is particularly applicable for shared control and data channels. An example for a conventional solution is given in FIG. 47 for an OFDM system. An OFDM frame consists of several time slots, in this case 7 "OFDM Symbols", and of several carrier frequencies, here 8 "subcarriers". The pilot and shared control symbols are frequency-multiplexed inside the first OFDM symbol; both together are time-multiplexed with the shared data symbols.

Figure 48:
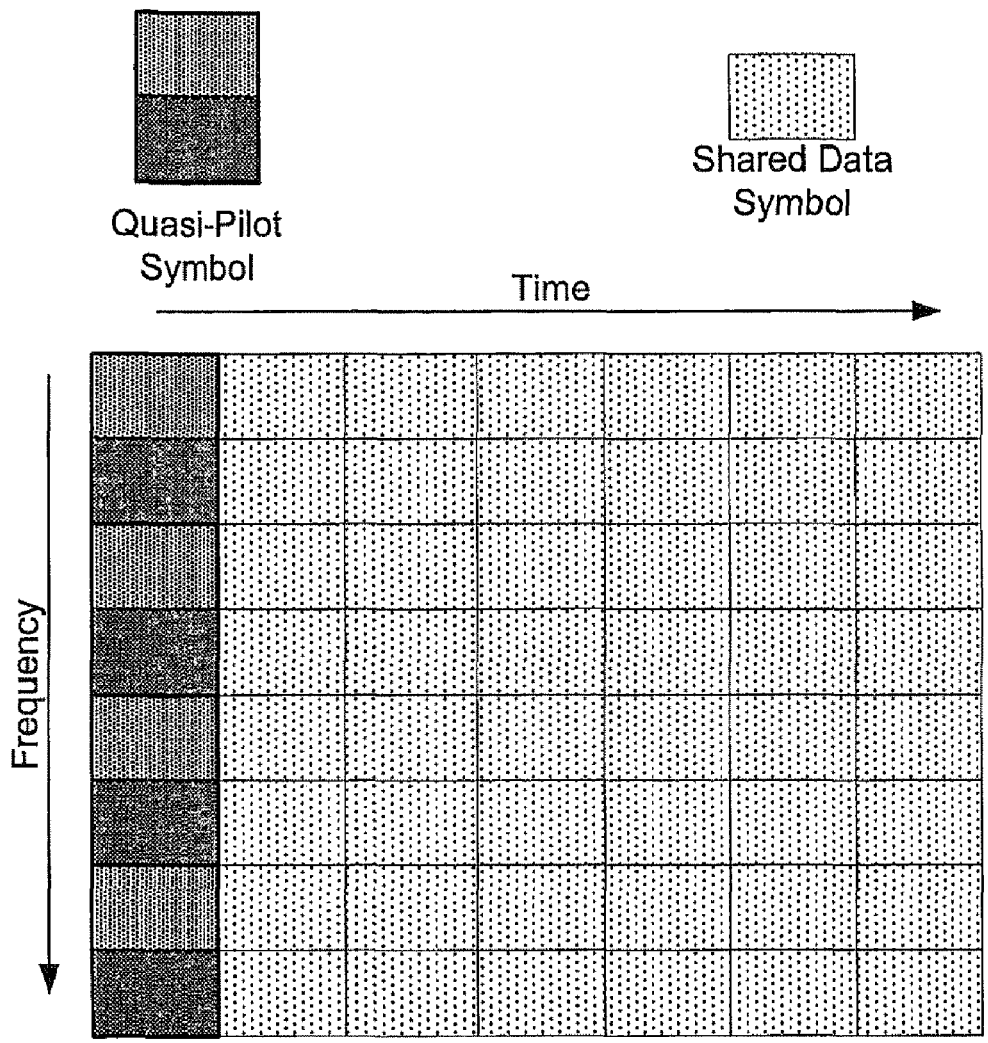
FIGS. 48 to 56 illustrate different non-exhaustive possibilities how Quasi-Pilot symbols may be positioned in an OFDM frame.

A corresponding solution according to the present invention is shown in FIG. 48. This Figure shows a time-multiplexing of quasi-pilot symbols with shared data symbols. The quasi-pilot symbols contain the multiplexing of pilot bits and shared control bits according to FIG. 46. Since in this case a quasi-pilot symbol, i.e. an original and counterpart symbol carry shared control information, one quasi-pilot symbol can be used for channel estimation, and each of the constituent (original and counterpart) symbols carries the shared control information. As pilot and control information are multiplexed ultimately onto modulation symbols, this can be interpreted as a "modulation multiplexing" or "modulation division multiplexing" (MDM) of pilot and control information onto the same symbol. The multiplexing of original and counterpart symbols is according to FIG. 48 in frequency-domain, therefore it is called "frequency counterpart multiplexing" (FCM). In summary the first OFDM symbol is therefore an FCM-MDM structure.

Figure 49:
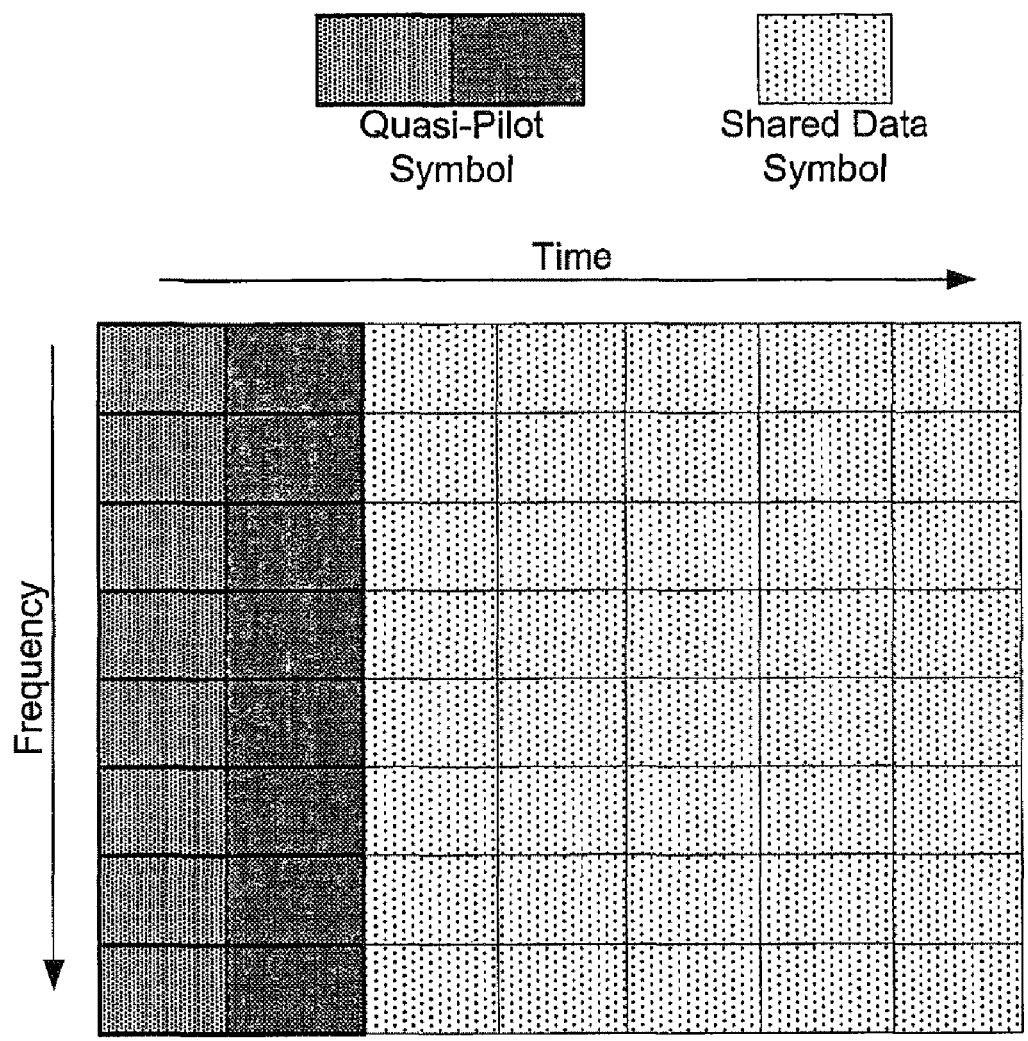

The multiplexing of original and counterpart symbols could however also be realised in time domain, as shown in FIG. 49. Here we have a TCM-MDM structure, "time counterpart multiplexing-modulation division multiplexing", where as before the quasi-pilot and shared data part is time multiplexed.

Figure 50:
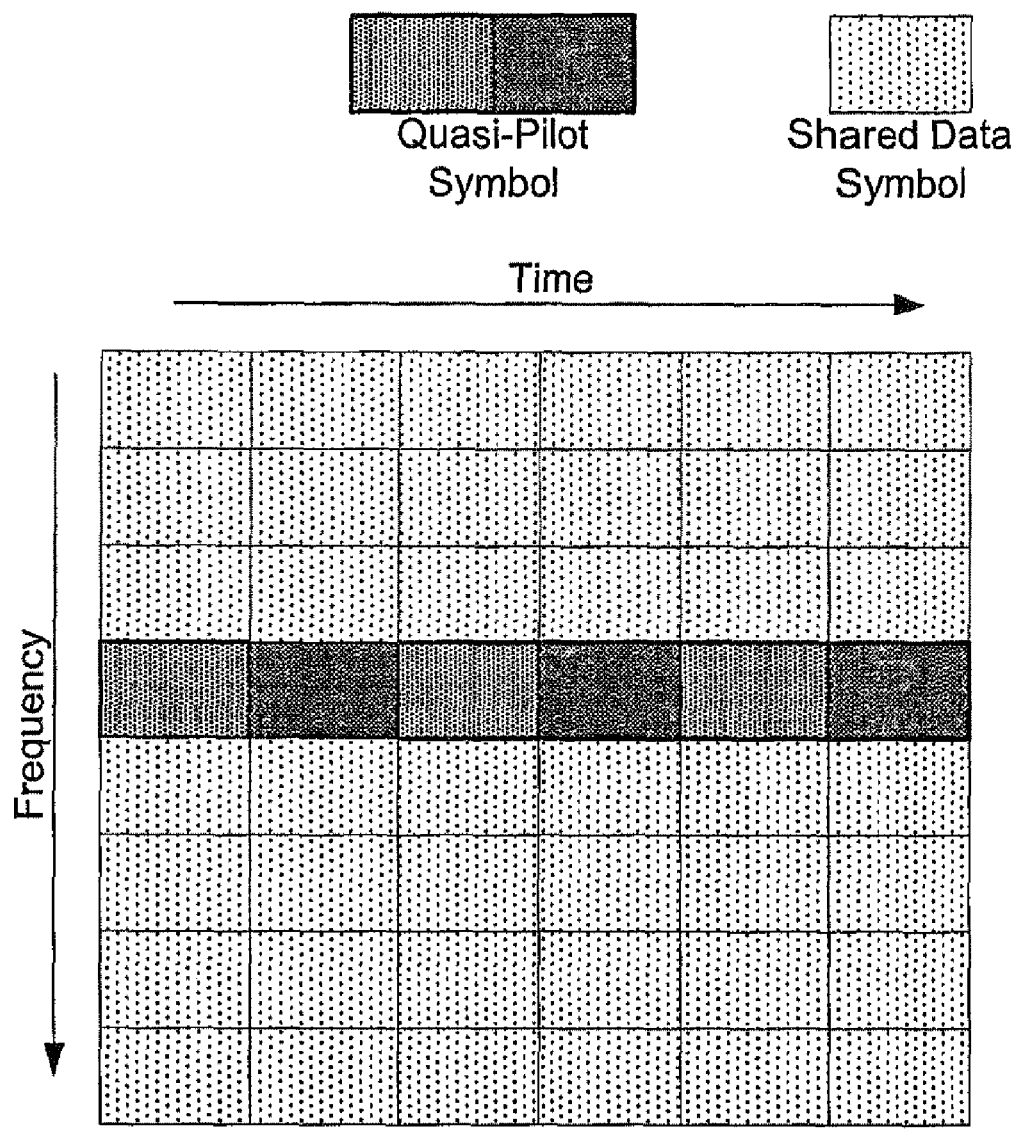
Figure 51:
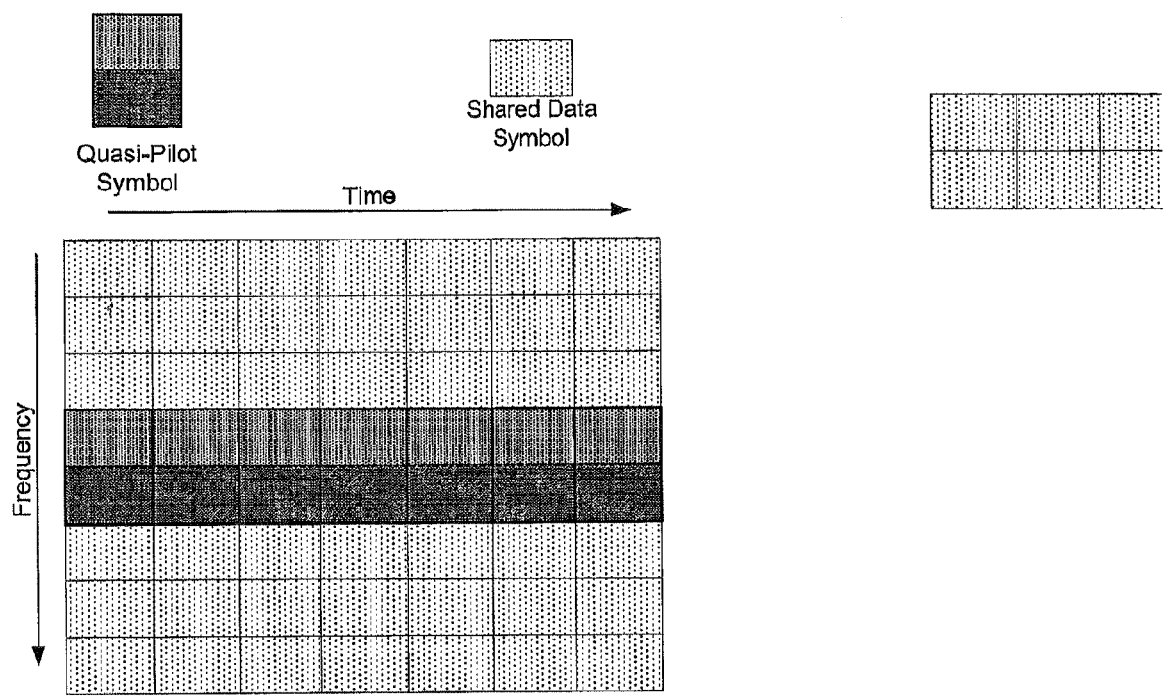
Figure 52:
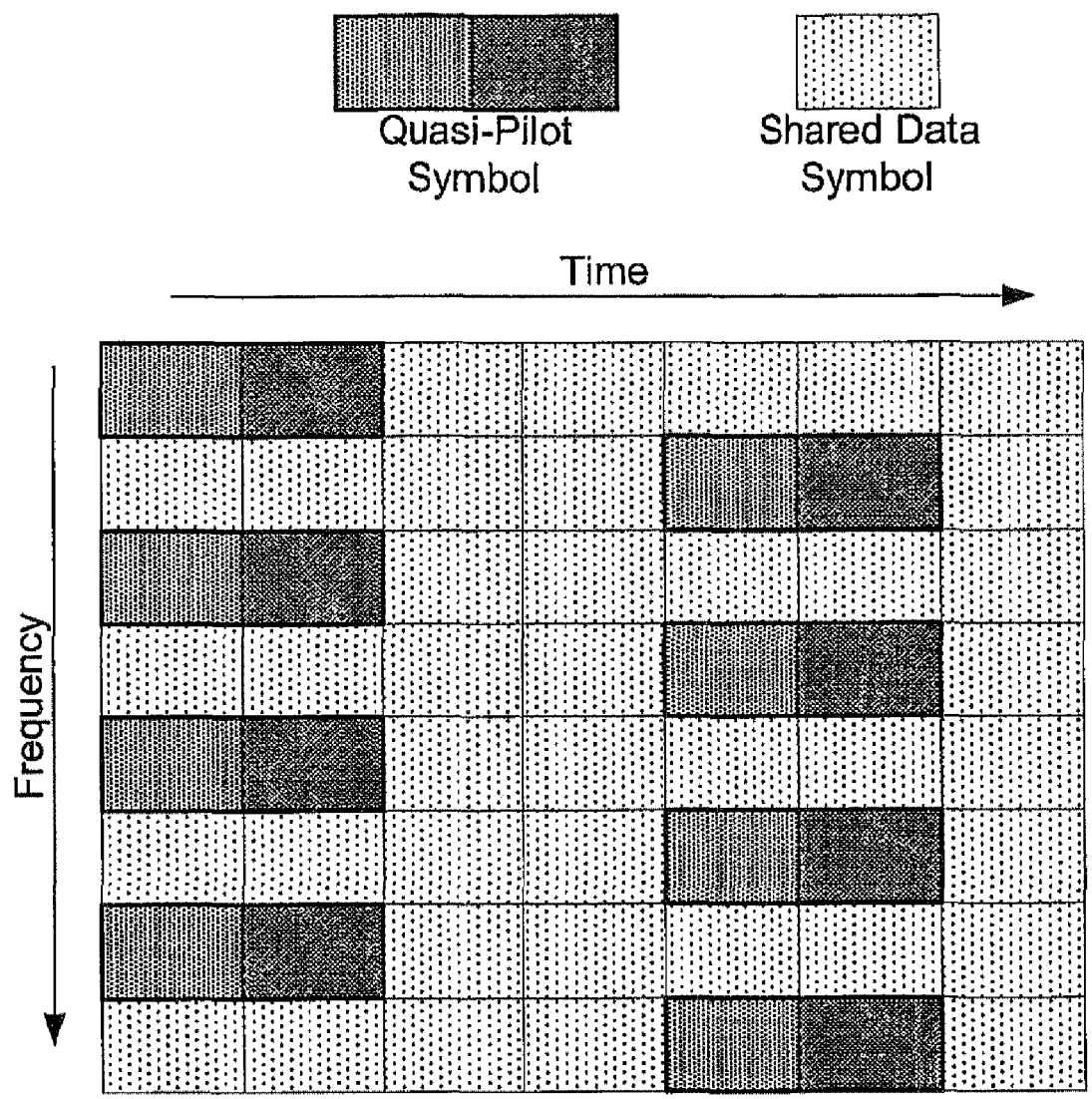
Figure 53:
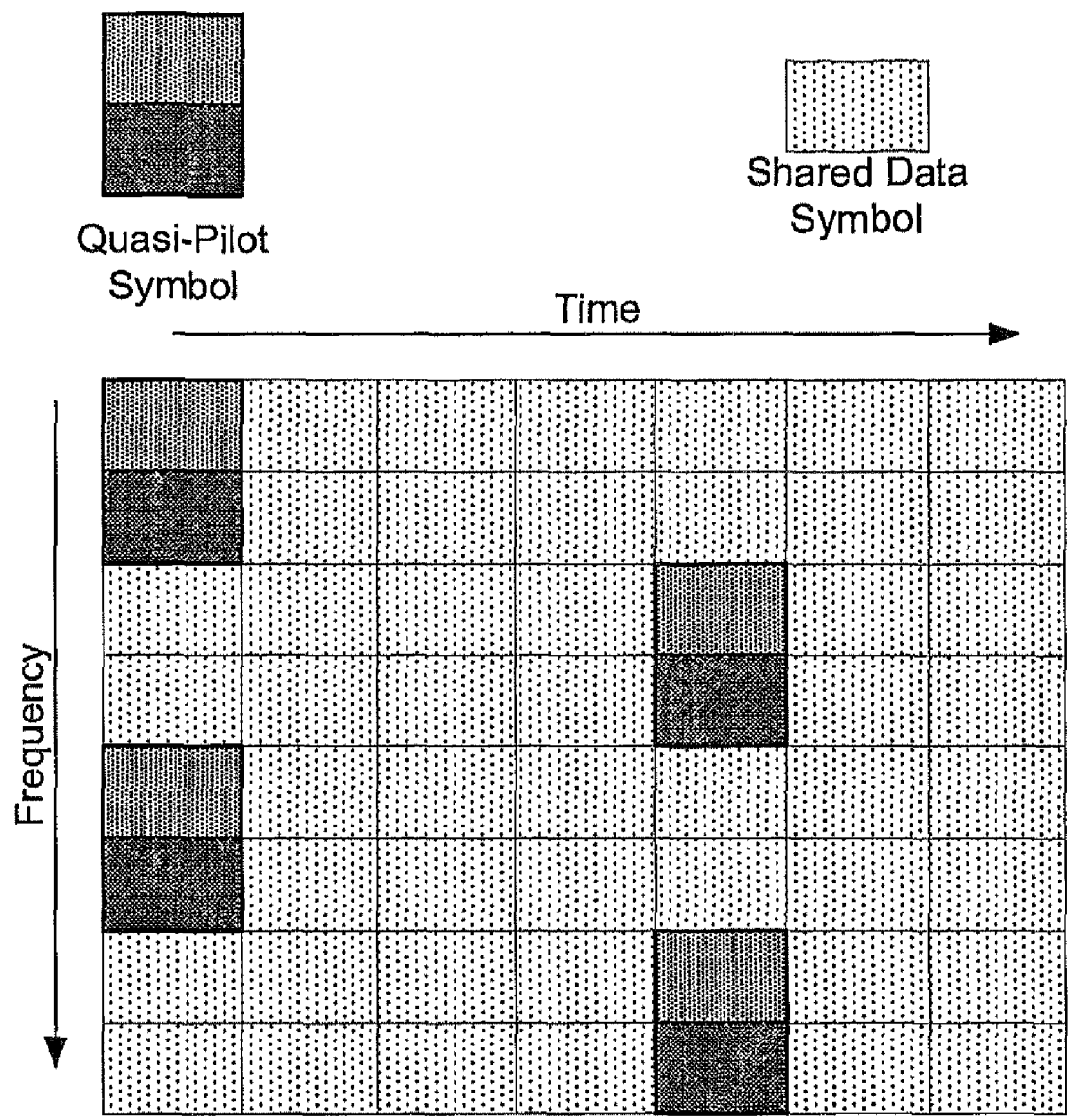
Figure 54:
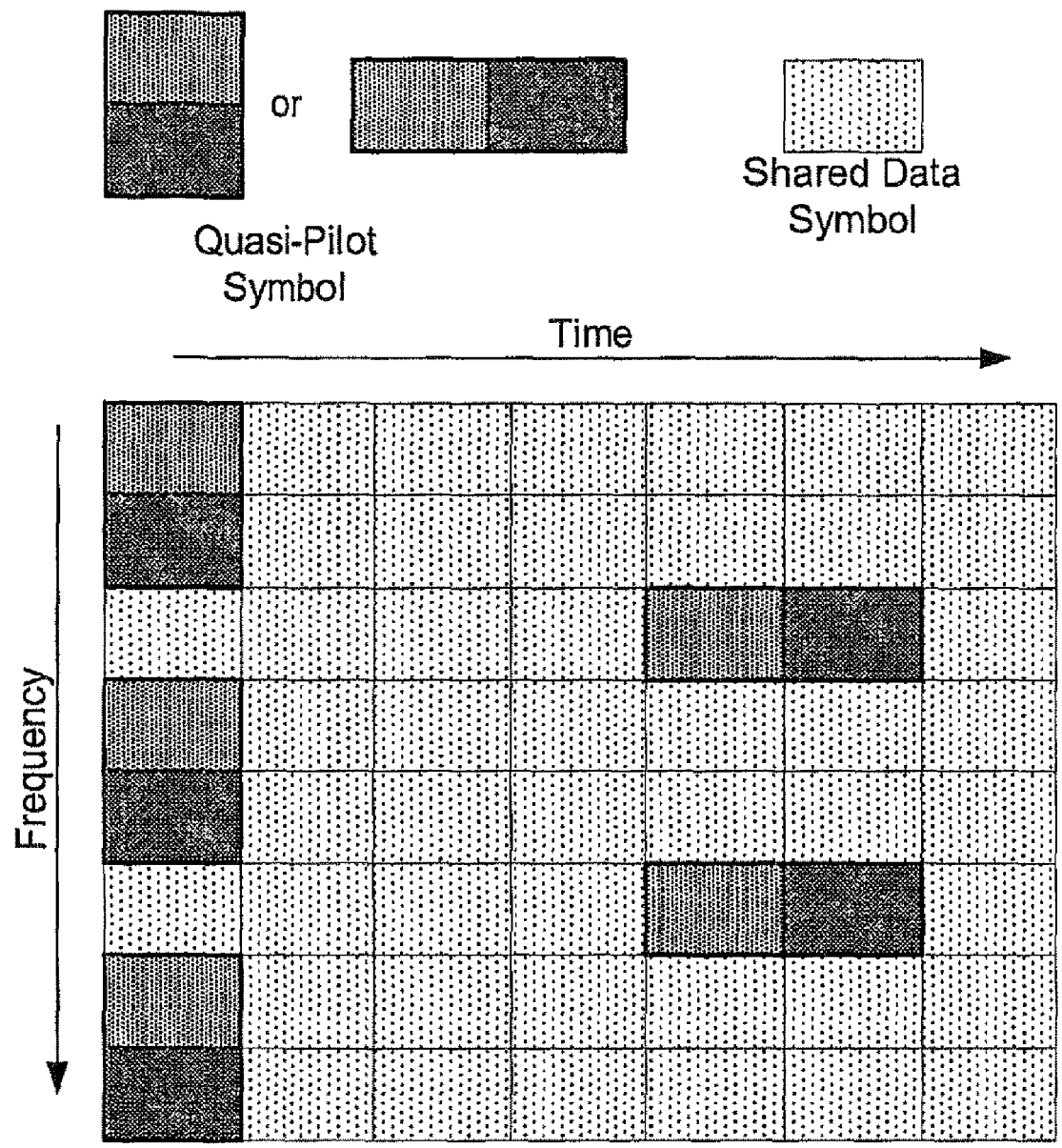
Figure 55:
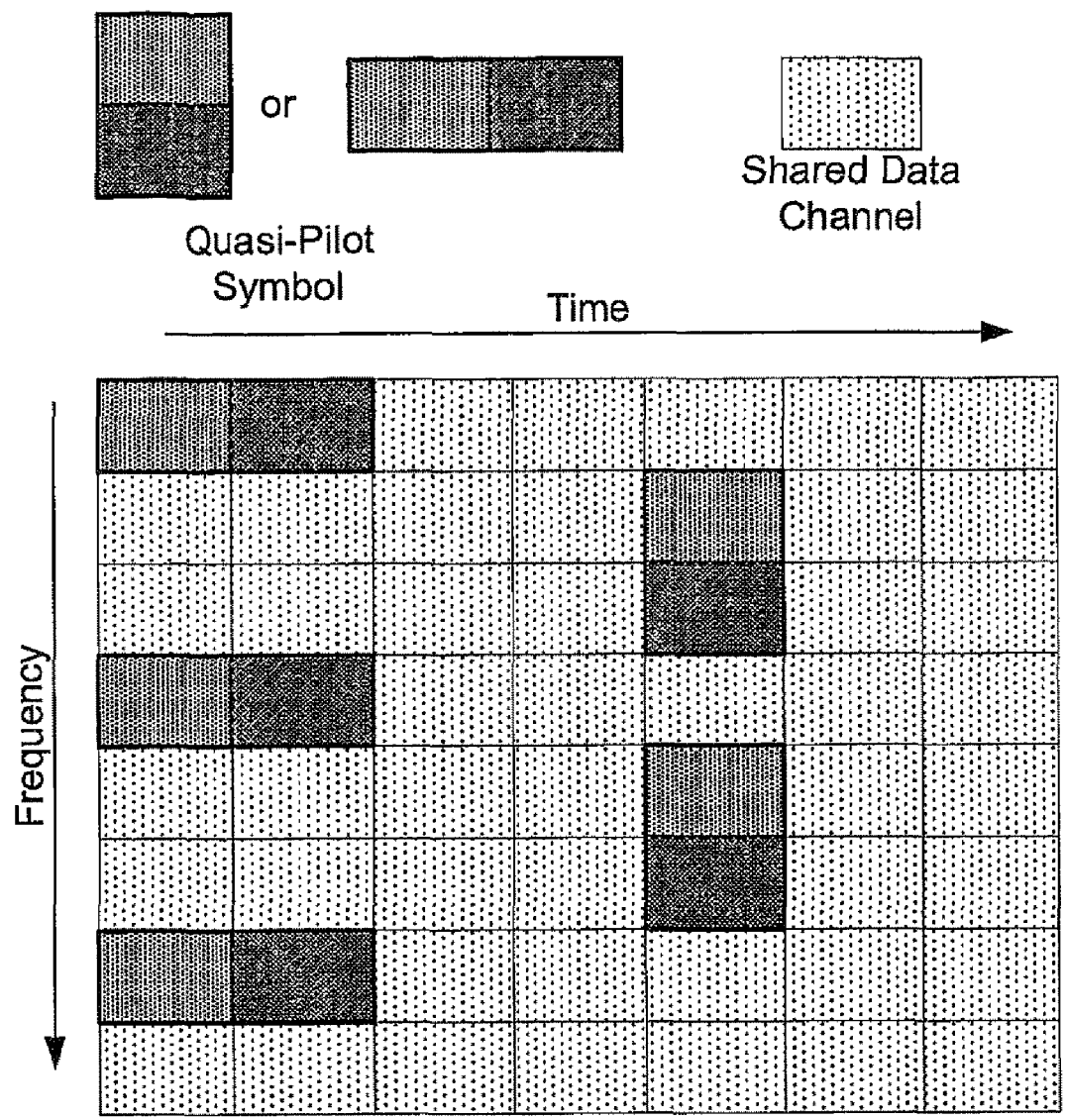
Figure 56:
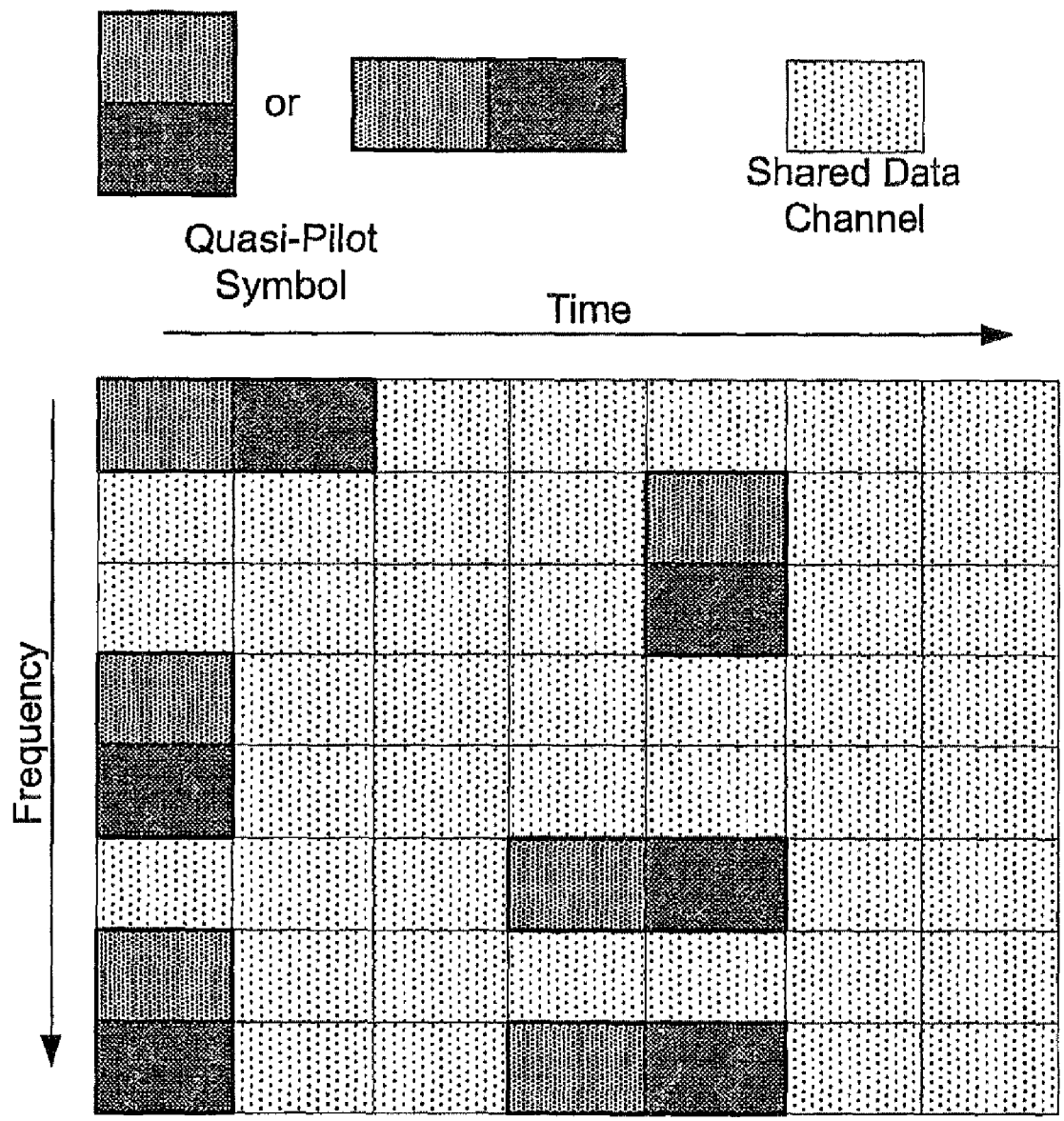

FIG. 50 and FIG. 51 show a similar approach however here the quasi-pilot and shared data symbols are frequency-multiplexed.

Of course neither the multiplexing between quasi-pilot and shared data nor the multiplexing of original/counterpart has to be the same within one OFDM frame. Examples are shown in FIGS. 52-56, where there various degrees of freedom are realised with respect to quasi-pilot/shared data multiplexing and original/counterpart multiplexing.

It should be apparent to those skilled in the art that the order of original and counterpart symbol in FIGS. 48-56 is not important; for example in FIG. 49 the first OFDM symbol may always transmit the counterpart symbol, while the second OFDM symbol always transmits the original symbol. Mixed forms are of course also possible.

Apart from a complex combination, e.g. the addition of complex values, of original and counterpart symbol, it is also possible to combine other parameters or components of these symbols to improve the reliability of the channel estimation by reducing the number of parameter/component states/levels after combination compared to the number of parameter/component states/levels before combination. Such parameters or components of a symbol are for example the real part, imaginary part, power, amplitude, phase, or terms or quantities derived from one or more of these.

In another embodiment of the invention, the target of improving the channel estimation capability is achieved by reducing the number of possible amplitude levels, achieved by reducing the number of different combined values obtainable for all data word values, by adding for each data word value amplitude values associated with said data word value according to a first and at least one further mappings, to a lower number than the number of amplitude levels within said first mapping.

In another embodiment of the invention, the target of improving the channel estimation capability is achieved by reducing the number of possible power levels, achieved by reducing the number of different combined values obtainable for all data word values, by adding for each data word value power values associated with said data word value according to a first and at least one further mappings, to a lower number than the number of different power levels within said first mapping.

In another embodiment of the invention, the target of improving the channel estimation capability is achieved by reducing the number of possible phase levels, achieved by reducing the number of different combined values obtainable for all data word values, by adding for each data word value phase values associated with said data word value according to a first and at least one further mappings, to a lower number than the number of different phase levels within said first mapping.

Figure 62:
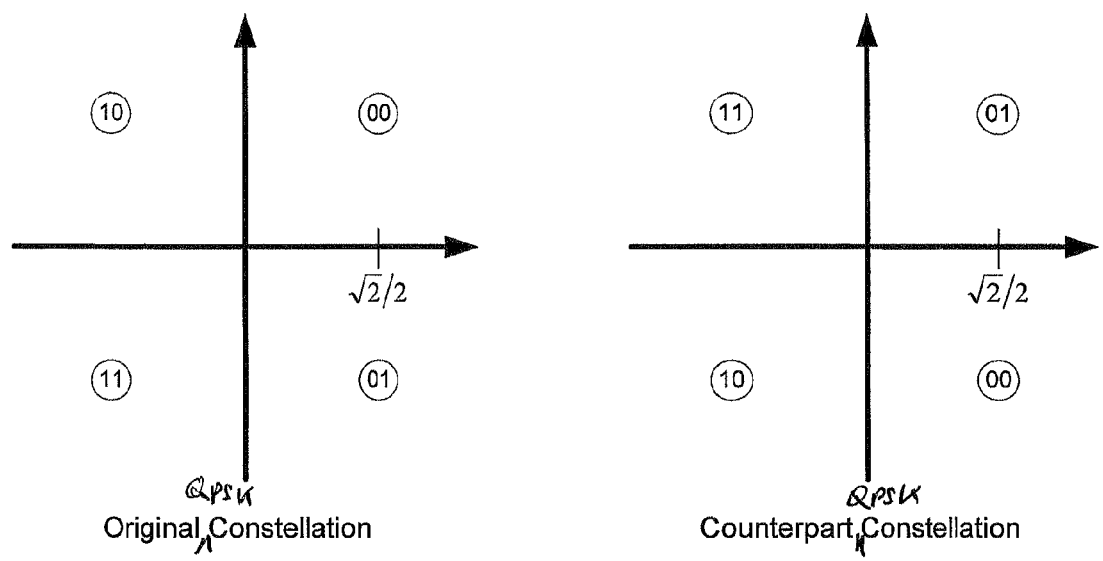
FIG. 62 is an example of QPSK showing original and counterpart constellations when the power combination and phase combination should result each in one level.
Figure 63:
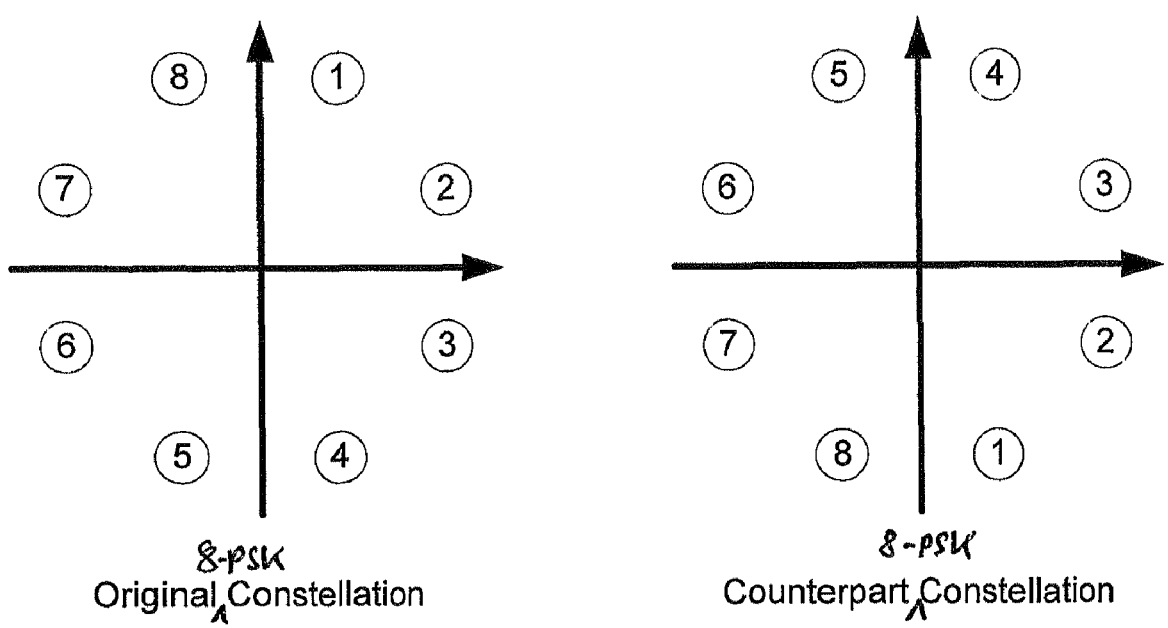
FIG. 63 is an example of 8-PSK showing original and counterpart constellations when the power combination and phase combination should result each in one level.
Figure 64:
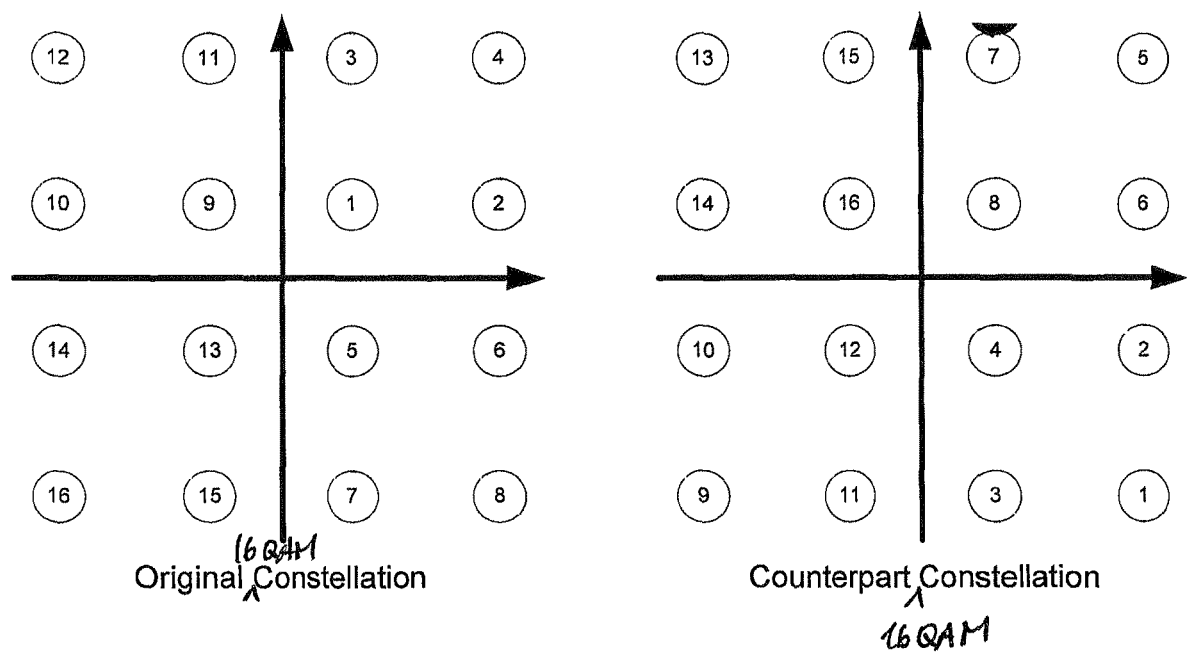
FIG. 64 is an example of 16-QAM showing original and counterpart constellations when the power combination and phase combination should result each in one level.
Figure 6J:
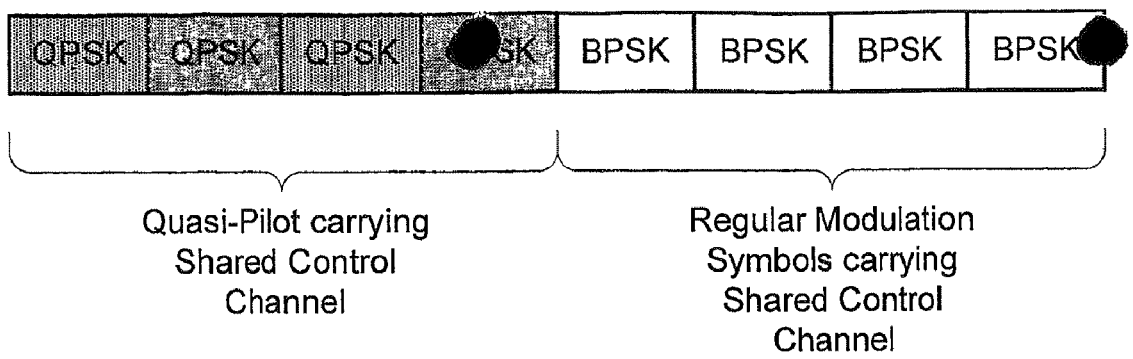
Figure 67:
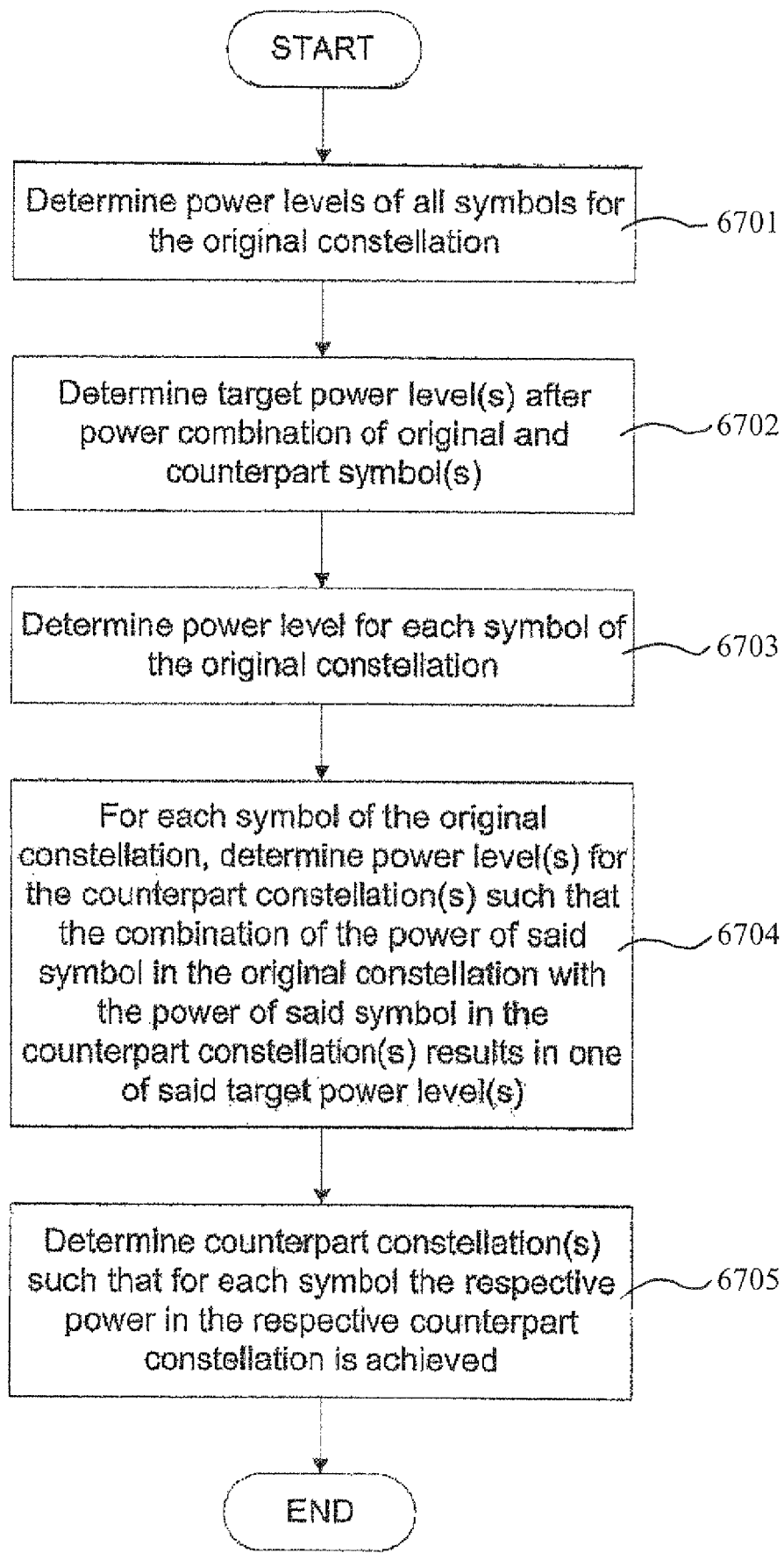
FIG. 67 is a flowchart diagram about the method to obtain one or more counterpart constellation(s) from an original constellation when power combination is considered.
Figure 68:
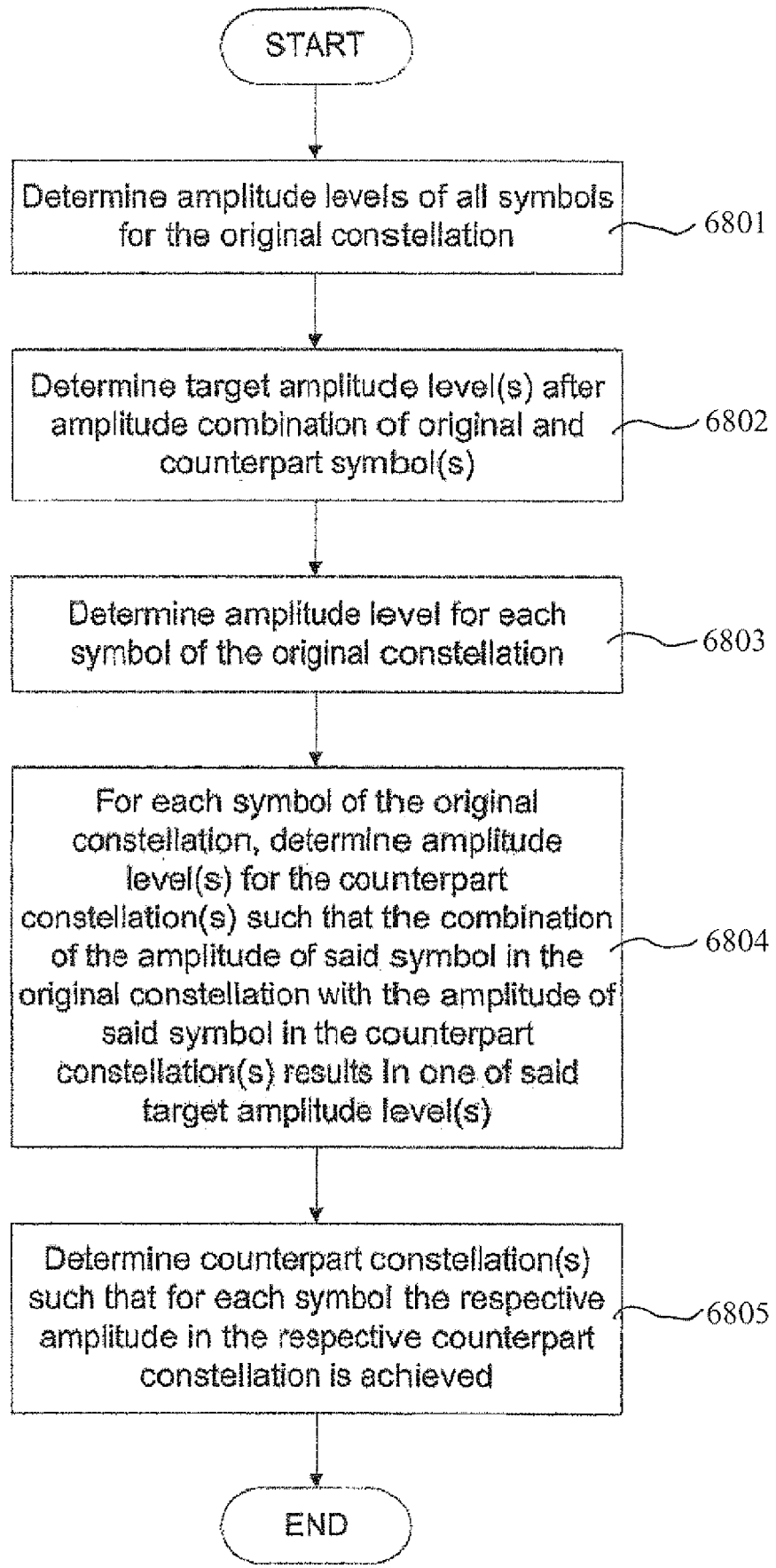
FIG. 68 is a flowchart diagram about the method to obtain one or more counterpart constellation(s) from an original constellation when amplitude combination is considered.
Figure 69:
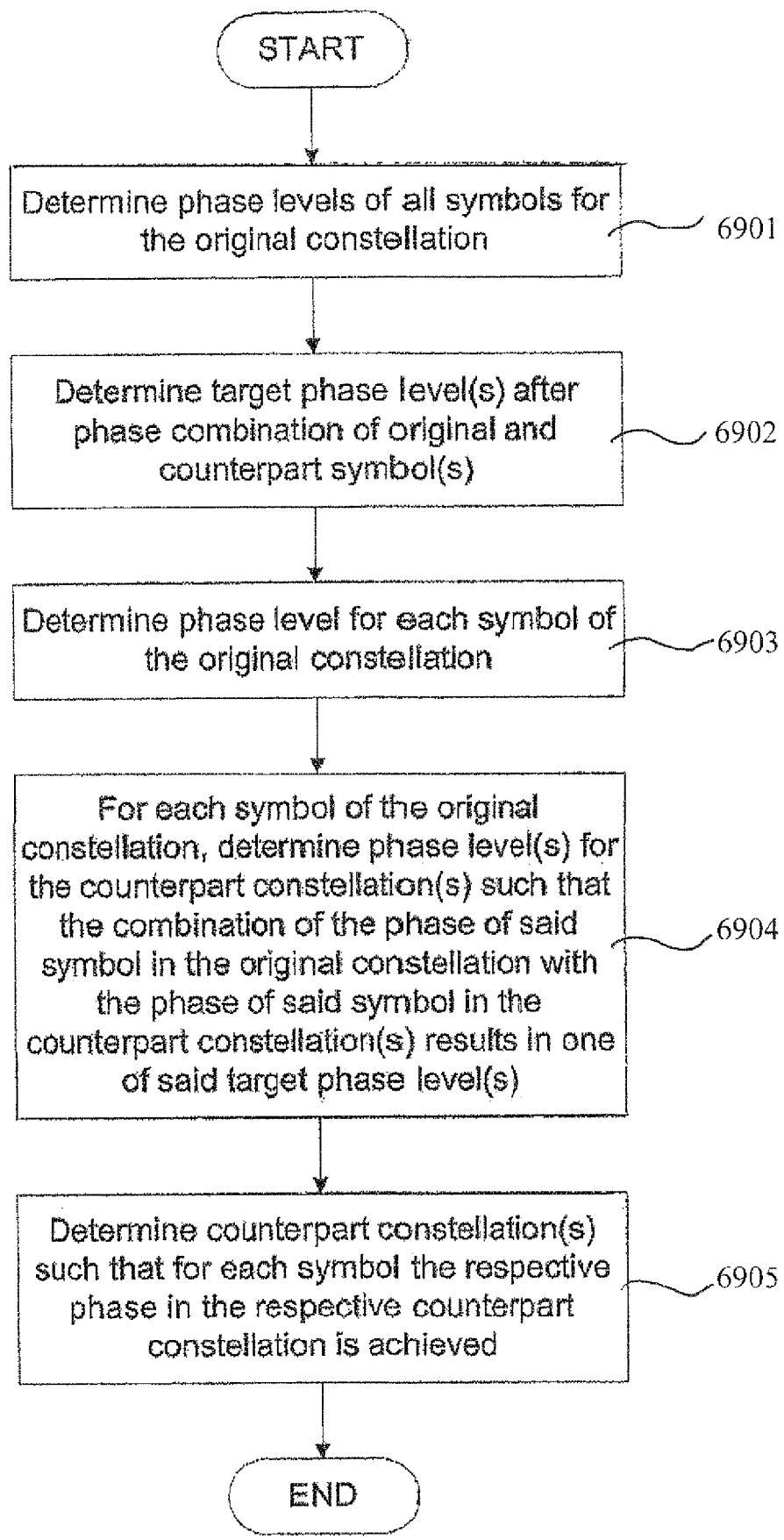
FIG. 69 is a flowchart diagram about the method to obtain one or more counterpart constellation(s) from an original constellation when phase combination is considered.

For each of the mentioned level reductions, or for a combination of any of the above mentioned level reductions counterpart symbol(s) or sequence(s) can be easily generated applying the principles that have been outlined for the coherent combination case mutatis mutandis. The general principle is shown as flowcharts in FIGS. 67-69. As shown in FIG. 67, a method to obtain one or more counterpart constellation(s) from an original constellation when a power combination is considered includes the operations of determining power levels of all symbols for the original constellation (6701), determining target power level(s) after a power combination of original and counterpart symbol(s) (6702), determining a power level for each symbol of the original constellation (6703), for each symbol of the original constellation, determining power level(s) for the counterpart constellation(s) such that the combination of the power of the symbol in the original constellation with the power of the symbol in the counterpart constellation(s) results in one of the target power level(s) (6704), and determining counterpart constellation(s) such that for each symbol the respective power in the respective counterpart constellation is achieved (6705). As shown in FIG. 68, a method to obtain one or more counterpart constellation(s) from an original constellation when amplitude combination is considered includes the operations of determining amplitude levels of all symbols for the original constellation (6801), determining the target amplitude level(s) after the amplitude combination of original and counterpart symbol(s) (6802), determining the amplitude level for each symbol of the original constellation (6803), for each symbol of the original constellation, determining the amplitude level(s) for the counterpart constellation(s) such that the combination of the amplitude of the symbol in the original constellation with the amplitude of the symbol in the counterpart constellation(s) results in one of the target amplitude level(s) (6804), and determining the counterpart constellation(s) such that for each symbol the respective amplitude in the respective counterpart constellation is achieved (6805). As shown in FIG. 69, a method to obtain one or more counterpart constellation(s) from an original constellation when phase combination is considered includes the operations of determining phase levels of all symbols for the original constellation (6901), determining target phase level(s) after a phase combination of original and counterpart symbol(s) (6902), determining a phase level for each symbol of the original constellation (6903), for each symbol of the original constellation, determining the phase levels) for the counterpart constellation(s) such that the combination of the phase of the symbol in the original constellation with the phase of the symbol in the counterpart constellation(s) results in one of the target phase level(s) (6904), and determining counterpart constellation(s) such that for each symbol the respective phase in the respective counterpart constellation is achieved (6905). Of course, if a combination of level reductions is desired, the step of determining the counterpart constellation can only be carried out taking the combined requirements into account. If both power and phase levels should be reduced, the step of determining the counterpart constellation has to be modified to such that for each symbol the respective power and phase in the respective counterpart constellation is achieved". It should also be apparent that the order of these steps may be changed. For example if both power and phase levels should be reduced to one and two respectively, FIGS. 62-64 show exemplary solutions for QPSK, 8-PSK, and 16-QAM respectively. It should be noted that in this and in the following sections the terms "original constellation", "counterpart constellation" are used to describe the behaviour on the symbol level, and are therefore not restricting the applicability to just one of the approaches for the generation of a Quasi-Pilot according to FIG. 46.

Applying the flowcharts from FIGS. 67 and 69 to the original QPSK from FIG. 62, assuming that the average power should be one, the following power and phase levels are determined:

| Bit sequence | Power Level | Phase Level (deg) |
|---|---|---|
| 00 | 1 | 45 |
| 01 | 1 | −45 |
| 10 | 1 | 135 |
| 11 | 1 | −135 |

Obviously achieving a single power level after combination is trivial. Then it is defined that the bit sequences should have a target phase level after combination of 0. This leads in the last step to the following for the counterpart constellation:

| Bit sequence | Power Level | Phase Level (deg) |
|---|---|---|
| 00 | 1 | −45 |
| 01 | 1 | +45 |
| 10 | 1 | −135 |
| 11 | 1 | 135 |

This is depicted as the counterpart constellation in FIG. 62. It may be noted that in this example the same effective result may be achieved by inverting the second bit from the original bit sequence to obtain the counterpart sequence, and then use the original constellation to obtain a counterpart symbol from the counterpart sequence. Those skilled in the art will recognise that the bit operation approach is generally a possible alternative to the modified constellation.

Applying the flowcharts from FIGS. 67 and 69 to the original 8-PSK from FIG. 63, assuming that the average power should be one, we determine the following power and phase levels:

| Symbol | Power Level | Phase Level (deg) |
|---|---|---|
| 1 | 1 | 67.5 |
| 2 | 1 | 22.5 |
| 3 | 1 | −22.5 |
| 4 | 1 | −67.5 |
| 5 | 1 | −112.5 |
| 6 | 1 | −157.5 |
| 7 | 1 | 157.5 |
| 8 | 1 | 112.5 |

Again achieving a single power level after combination is trivial. Then it is defined that the symbols should have a target phase level after combination of 0. This leads in the last step to the following for the counterpart constellation:

| Symbol | Power Level | Phase Level (deg) |
|---|---|---|
| 1 | 1 | −67.5 |
| 2 | 1 | −22.5 |
| 3 | 1 | 22.5 |
| 4 | 1 | 67.5 |
| 5 | 1 | 112.5 |
| 6 | 1 | 157.5 |
| 7 | 1 | −157.5 |
| 8 | 1 | −112.5 |

This is depicted as the counterpart constellation in FIG. 63. If the symbol numbers are translated into bit sequences, those skilled in the art will be easily able to apply a bit operation to achieve the same result.

Applying the flowcharts from FIGS. 67 and 69 to the original 16-QAM from FIG. 64, assuming that the average power should be one, we determine the following power and phase levels:

| Symbol | Power Level | Phase Level (deg) |
|---|---|---|
| 1 | 0.2 | 45 |
| 2 | 1.0 | arctan(1/3) |
| 3 | 1.0 | arctan(3) |
| 4 | 1.8 | 45 |
| 5 | 0.2 | −45 |
| 6 | 1.0 | −arctan(1/3) |

-continued

| Symbol | Power Level | Phase Level (deg) |
|---|---|---|
| 7 | 1.0 | −arctan(3) |
| 8 | 1.8 | −45 |
| 9 | 0.2 | 135 |
| 10 | 1.0 | 90 + arctan(3) |
| 11 | 1.0 | 90 + arctan(1/3) |
| 12 | 1.8 | 135 |
| 13 | 0.2 | −135 |
| 14 | 1.0 | −90 − arctan(3) |
| 15 | 1.0 | −90 − arctan(1/3) |
| 16 | 1.8 | −135 |

The unique target power level after combination is set to 2.0. Then it is defined that the symbols should have a target phase level after combination of 0. This leads in the last step to the following for the counterpart constellation:

| Symbol | Power Level | Phase Level (deg) |
|---|---|---|
| 1 | 1.8 | −45 |
| 2 | 1.0 | −arctan(1/3) |
| 3 | 1.0 | −arctan(3) |
| 4 | 0.2 | −45 |
| 5 | 1.8 | 45 |
| 6 | 1.0 | arctan(1/3) |
| 7 | 1.0 | arctan(3) |
| 8 | 0.2 | 45 |
| 9 | 1.8 | −135 |
| 10 | 1.0 | −90 − arctan(3) |
| 11 | 1.0 | −90 − arctan(1/3) |
| 12 | 0.2 | −135 |
| 13 | 1.8 | 135 |
| 14 | 1.0 | 90 + arctan(3) |
| 15 | 1.0 | 90 + arctan(1/3) |
| 16 | 0.2 | 135 |

This is depictured as the counterpart constellation in FIG. 64. If the symbol numbers are translated into bit sequences, those skilled in the art will be easily able to apply a bit operation to achieve the same result.

Upon inspection of FIGS. 62 to 64 it is noted therefore that these are sufficient to reduce the number of either power or amplitude, and of phase levels to one after combination of original and counterpart if the combination is done separately for power/amplitude and phase respectively.

The actual estimation of a channel coefficient h in such a case may preferably employ the following strategy. Assume that the power levels of a symbol from an original and counterpart constellation is denoted by $p_O$ and $p_C$ respectively, and likewise the amplitude levels by $a_O$ and $a_C$, and the phase levels by $\phi_O$ and $\phi_C$. Assuming that a channel coefficient h can be decomposed into an amplitude gain k and a phase shift δ as in $$h = k \cdot e^{j \cdot \delta}$$

then the following characteristics for the received power, amplitude and phase levels (neglecting other channel influences) are obtained:

$$p_O^r = p_O \cdot k^2, \ p_C^r = p_C \cdot k^2,$$

$$a_O^r = a_O \cdot k, \ a_C^r = a_C \cdot k,$$

$$\phi_O^r = \phi_O + \delta, \ \phi_C^r = \phi_C + \delta$$

By adding the received values, we can obtain:

$$p_O^r + p_C^r = p_O \cdot k^2 + p_C \cdot k^2 = (p_O + p_C) \cdot k^2$$

$$a_O^r + a_C^r = a_O \cdot k + a_C \cdot k = (a_O + a_C) \cdot k$$

$$\phi_O^r + \phi_C^r = \phi_O + \delta + \phi_C + \delta = \phi_O \phi_C + 2\delta$$

Therefore the channel amplitude gain k and the phase shift δ can be estimated as $$\hat{k} = \sqrt{\frac{p_O^r + p_C^r}{p_O + p_C}} \text{ or } \hat{k} = \frac{a_O^r + a_C^r}{a_O + a_C}$$

$$\hat{\delta} = \frac{\varphi_O^r + \varphi_C^r}{2} - \frac{\varphi_O + \varphi_C}{2}$$

It may be noted that these equations are given for the simple case that one original symbol and one counterpart symbol are sufficient. In case there exist several counterpart constellation that are used, the denominator in the channel amplitude gain equation has to account for the sum of all these counterpart constellations instead of just the single one; likewise the denominator in the channel phase shift equation has to be the number of counterpart constellations plus one (for the original constellation).

To inspect the power, amplitude, and phase levels in some more detail than in Table 1, Table 2 lists the actual levels assuming that each constellation is normalised to an average power per symbol of one.

TABLE 2

Power, amplitude, and phase levels of selected digital modulation methods

| Modulation Scheme | Power Levels | Amplitude Levels | Phase Levels (deg) |
|---|---|---|---|
| BPSK | 1 | 1 | 0; 180 |
| QPSK | 1 | 1 | 45; 135; −45; −135 |
| 2-ASK/2-PSK | 0.2; 1.8 | sqrt(1/5); sqrt(9/5) | 0; 180 |
| 4-ASK | 1/21; 9/21; 25/21; 49/21 | sqrt(1/21); sqrt(9/21); sqrt(25/21); sqrt(49/21) | 0 |
| 8-PSK | 1 | 1 | 22.5; 67.5; 112.5; 157.5; −22.5; −67.5; −112.5; −157.5 |
| 16-PSK | 1 | 1 | 11.25; 33.75; 56.25; 78.75; 101.25; 123.75; 146.25; 168.75; −11.25; −33.75; −56.25; −78.75; −101.25; −123.75; −146.25; −168.75 |

TABLE 2-continued

Power, amplitude, and phase levels of selected digital modulation methods

| Modulation Scheme | Power Levels | Amplitude Levels | Phase Levels (deg) |
|---|---|---|---|
| 4-ASK/4-PSK | 1/21; 9/21; 25/21; 49/21 | sqrt(1/21); sqrt(9/21); sqrt(25/21); sqrt(49/21) | 45; 135; −45; −135 |
| 16-QAM | 0.2; 1.0; 1.8 | sqrt(1/5); 1.0; sqrt(9/5) | arctan(1/3); 45; arctan(3); 90 + arctan(1/3); 135; 90 + arctan(3); −arctan(1/3); −45; −arctan(3); −90 − arctan(1/3); −135; −90 − arctan(3) |

This will be subsequently exemplified for the 16-QAM depicted in FIG. 64. With Table 2 and FIG. 64 we see that for any of the 16 symbols the sum is in this case always $$p_O + p_C = 2,$$

$$\phi_O + \phi_C = 0$$

(or equivalently $\phi_O + \phi_C = 2\rho = 360°$, depending on the angle interpretation). Using the values for this 16-QAM example, we get $$\hat{k} = \sqrt{\frac{p_O^r + p_C^r}{2}}$$

$$\hat{\delta} = \frac{\varphi_O^r + \varphi_C^r}{2}$$

For the examples of QPSK and 8-PSK in FIGS. 62 and 63, it is noted that both the sum of power levels and of amplitude levels is $$p_O + p_C = a_O + a_C = 2,$$

therefore one may use either of the amplitude or power level combination to arrive at the estimation for the channel amplitude gain k. This is possible for any pure PSK scheme. From Table 2 it may also be concluded that for pure ASK schemes the amplitude levels are preferable, since the constellations can easily be constructed such that a single counterpart constellation is sufficient to reduce the combination to a single amplitude level. Since a mix of ASK and PSK (like 2-ASK/2-PSK or 4-ASK/4-PSK) has to respect the preferences (or restrictions) of each constituent scheme, the amplitude level combination is also preferable in those cases, as the ASK prefers amplitude level combination to power level combination due to just a single required counterpart constellation.

Figure 70:
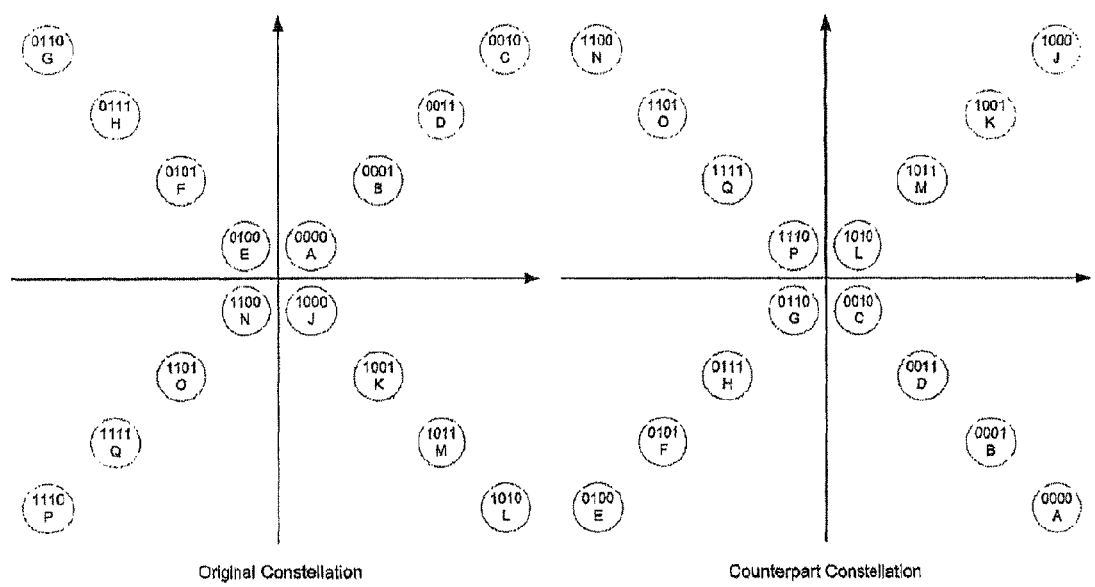
FIG. 70 is an example of 4-ASK/4-PSK showing original and counterpart constellations when the amplitude combination and phase combination should result each in one level.

This is further exemplified for the 4-ASK/4-PSK in FIG. 70. For sake of generality each constellation point is labelled with a bit sequence (numeric) as well as with a symbol label (alphabetic). Applying the flowcharts from FIGS. 68 and 69 to the original 4-ASK/4-PSK, assuming that the average power should be one, we determine the following amplitude and phase levels:

| Bit sequence/Symbol | Amplitude Level | Phase Level (deg) |
|---|---|---|
| 0000/A | sqrt(1/21) = 1/sqrt(21) | 45 |
| 0001/B | sqrt(9/21) = 3/sqrt(21) | 45 |
| 0010/C | sqrt(49/21) = 7/sqrt(21) | 45 |
| 0011/D | sqrt(25/21) = 5/sqrt(21) | 45 |
| 0100/E | sqrt(1/21) = 1/sqrt(21) | 135 |
| 0101/F | sqrt(9/21) = 3/sqrt(21) | 135 |
| 0110/G | sqrt(49/21) = 7/sqrt(21) | 135 |
| 0111/H | sqrt(25/21) = 5/sqrt(21) | 135 |
| 1000/J | sqrt(1/21) = 1/sqrt(21) | −45 |
| 1001/K | sqrt(9/21) = 3/sqrt(21) | −45 |
| 1010/L | sqrt(49/21) = 7/sqrt(21) | −45 |
| 1011/M | sqrt(25/21) = 5/sqrt(21) | −45 |
| 1100/N | sqrt(1/21) = 1/sqrt(21) | −135 |
| 1101/O | sqrt(9/21) = 3/sqrt(21) | −135 |
| 1110/P | sqrt(49/21) = 7/sqrt(21) | −135 |
| 1111/Q | sqrt(25/21) = 5/sqrt(21) | −135 |

The unique target amplitude level after combination is set to 8/sqrt(21). Then we define the target phase level after combination of 0. This leads in the last step to the following for the counterpart constellation:

| Bit sequence/Symbol | Amplitude Level | Phase Level (deg) |
|---|---|---|
| 0000/A | sqrt(49/21) = 7/sqrt(21) | −45 |
| 0001/B | sqrt(25/21) = 5/sqrt(21) | −45 |
| 0010/C | sqrt(1/21) = 1/sqrt(21) | −45 |
| 0011/D | sqrt(9/21) = 3/sqrt(21) | −45 |
| 0100/E | sqrt(49/21) = 7/sqrt(21) | −135 |
| 0101/F | sqrt(25/21) = 5/sqrt(21) | −135 |
| 0110/G | sqrt(1/21) = 1/sqrt(21) | −135 |
| 0111/H | sqrt(9/21) = 3/sqrt(21) | −135 |
| 1000/J | sqrt(49/21) = 7/sqrt(21) | 45 |
| 1001/K | sqrt(25/21) = 5/sqrt(21) | 45 |
| 1010/L | sqrt(1/21) = 1/sqrt(21) | 45 |
| 1011/M | sqrt(9/21) = 3/sqrt(21) | 45 |
| 1100/N | sqrt(49/21) = 7/sqrt(21) | 135 |
| 1101/O | sqrt(25/21) = 5/sqrt(21) | 135 |
| 1110/P | sqrt(1/21) = 1/sqrt(21) | 135 |
| 1111/Q | sqrt(9/21) = 3/sqrt(21) | 135 |

This is depicted as the counterpart constellation in FIG. 70. It may be noted that in this example the same effective result may be achieved by inverting the first and third bits from the original bit sequence to obtain the counterpart sequence, and then use the original constellation to obtain a counterpart symbol from the counterpart sequence.

The effect to arrive at the counterpart constellation may again be either achieved by modifying the mapping rule between bit sequence to modulation state, or by modifying the original bit sequence into a counterpart sequence prior to mapping said counterpart sequence to a modulation state according to the mapping rule that is used also for the original bit sequence mapping.

It may be noted that in the case of power or amplitude or phase combining a single counterpart constellation can be constructed that is always sufficient to achieve the goal of power/amplitude/phase level reduction, provided that the counterpart constellation does not have to have the same layout in the complex plane as the original constellation; such a different layout can for example be seen comparing the right-hand and left-hand constellations in FIG. 6.

It may be noted that the described possibilities of using the quasi-pilot for data transmission, in particular for the type of data e.g. control data, signalling data, broadcast data etc., are applicable regardless of the method how the reduction of ambiguity levels for the quasi-pilot is achieved. Therefore it is also preferable to transmit for example a shared control channel using a quasi-pilot like in FIGS. 48-56 in case that the quasi-pilot has been generated using e.g. the power- and phase-combination method. Those skilled in the art will perceive that there is no fundamental difference of what kind of data can be transmitted in a quasi-pilot generated using the complex-combination method compared to using one or more of the power-/amplitude-/phase-combination method(s).

While the invention has been described with respect to the embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method for transmitting data in a digital communication system, the method comprising:
    a) selecting a subset of all available modulation states in a pre-determined modulation scheme, to be used for transmission;
    b) a first transmission step of transmitting a first symbol representing a first plurality of bits, the first symbol having a first modulation state comprised in said subset; and
    c) at least one further transmission step of transmitting further symbols representing the first plurality of bits, each of the further symbols having a further modulation state comprised in said subset, wherein addition, for each combination of bit values, of complex values associated with said first and said further modulation states, yields the same phase of a complex result for all combinations of values of the bits within the plurality of bits, and wherein:
    the first modulation state is obtained according to a first mapping of bit value combinations to modulation states;
    the at least one further transmission step comprises exactly one further transmission step; and
    the one further modulation state is obtained according to a second mapping of bit value combinations to modulation states;
    wherein the second mapping of bit value combinations to modulation states is obtained from the first mapping of bit value combinations to modulation states by:
    i. dividing a complex plane representing the first mapping of bit value combinations to modulation states into at least two non-overlapping adjacent sub-planes;
    ii. determining symmetry axes for at least a part of the sub-planes with respect to modulation states comprised within each of the part of the sub-planes; and
    iii. assigning to at least a part of the bit value combinations a complex value in said second mapping, having a position in the complex plane which is essentially mirrored from a position of a complex value assigned to said bit value combination according to a first assignment, with respect to a point on the symmetry axis of a sub-plane in which the complex value according to said first assignment is located; and
    wherein the subset of modulation states to be used for the transmissions comprises all modulation states within one of the at least two sub-planes.

2. The method of claim 1, wherein the addition, for each combination of bit values, of complex values associated with said first and said further modulation states, yields the same result for all combinations of values of the bits within the plurality of bits.

3. The method according to claim 1, wherein in step iii the point on the symmetry axis, serving as a center for mirroring, is an average of all complex values assigned to said at least part of the modulation states in the first assignment and located within said sub-plane.

4. The method according to claim 1, wherein said complex plane is divided into said sub-planes with respect to symmetry axes regarding positions of the complex values of all modulation-states comprised in the first mapping.

5. The method according to claim 1, wherein said complex plane is divided into said sub-planes such that no complex values of modulation states are located on border lines between sub-planes.

6. The method according to claim 1, wherein said non-overlapping adjacent sub-planes are half planes of the complex plane.

7. The method according to claim 1, wherein said transmitting steps are carried out subsequently on a same transmission channel.

8. The method according to claim 1, wherein said digital communication system comprises at least one of a time-division, frequency-division, code-division, or OFDM component, and said transmitting steps are carried out in adjacent instances with respect to at least one of said components.

9. The method according to claim 1, wherein said transmission steps are applied to each transmitted symbol.

10. The method according to claim 1, wherein said second and further transmission steps are applied to a defined number of data symbols per transmission frame.

11. The method according to claim 1, wherein the number of sub-planes equals 2.

12. A computer-readable storage medium having stored thereon program instructions that, when executed in a processor of a transmitter of a digital communication system, cause the transmitter to perform the method according to claim 1.

13. A transmitter for a digital communication system, the transmitter being configured to perform the method of claim 1.

14. A base station for a mobile communication system, the base station comprising the transmitter according to claim 13.

15. A mobile station for a mobile communication system, the mobile station comprising the transmitter according to claim 13.

16. A method for transmitting data in a digital communication system, the method comprising:

a) selecting a subset of all available modulation states in a pre-determined modulation scheme, to be used for transmission;

b) a first transmission step of transmitting a first symbol representing a first plurality of bits, the first symbol having a first modulation state comprised in said subset; and c) at least one further transmission step of transmitting further symbols representing the first plurality of bits, each of the further symbols having a further modulation state comprised in said subset, wherein:

addition, for each combination of bit values, of complex values associated with said first and said further modulation states, yields the same phase of a complex result for all combinations of values of the bits within the plurality of bits, and wherein:

the first modulation state is obtained according to a first mapping of bit value combinations to modulation states;

the at least one further transmission step comprises m−1 transmission steps; and the m−1 further modulation states are obtained according to m−1 further mappings of bit value combinations to modulation states, wherein the m−1 further mappings of bit value combinations to modulation states are obtained from the first mapping of bit value combinations to modulation states by:

i. dividing a complex plane representing the first mapping of bit value combinations to modulation states into at least two non-overlapping adjacent sub-planes, the number of modulation states within at least a part of the sub-planes being m; and ii. assigning to at least a part of the bit value combinations different modulation states within the same sub-plane, one for each mapping; and wherein the subset of modulation states to be used for the transmissions comprises all modulation states within one of the at least two sub-planes.

17. A method for transmitting data in a digital communication system, the method comprising:

a) selecting a subset of all available modulation states in a pre-determined modulation scheme, to be used for transmission;

b) a first transmission step of transmitting a first symbol representing a first plurality of bits, the first symbol having a first modulation state comprised in said subset; and c) at least one further transmission step of transmitting further symbols representing the first plurality of bits, each of the further symbols having a further modulation state comprised in said subset, wherein:

addition, for each combination of bit values, of complex values associated with said first and said further modulation states, yields the same phase of a complex result for all combinations of values of the bits within the plurality of bits, the method is applied in a digital communication system employing phase-shift key modulation, and wherein:

the first modulation state is obtained according to a first mapping of bit value combinations to modulation states;

the at least one further transmission step comprises exactly one further transmission step; and the one further modulation state is obtained according to a second mapping of bit value combinations to modulation states;

wherein the second mapping of bit value combinations to modulation states is obtained from the first mapping of bit value combinations to modulation states by:

i. dividing a complex plane representing the first mapping of bit value combinations to modulation states into non-overlapping adjacent sub-planes, at least a part of the sub-planes having a symmetry axis with respect to positions of all modulation states comprised in the sub-plane;

ii. determining symmetry axes for at least a part of the sub-planes with respect to modulation states comprised within each of the part of the sub-planes; and iii. assigning to each of at least a part of the bit value combinations a complex value in said second mapping, having a position in the complex plane which is approximately mirrored from a position of a modulation state assigned to said bit value combination according to said first mapping, with respect to the symmetry axis of a sub-plane in which the modulation state according to said first mapping is located; and wherein the subset of modulation states to be used for the transmissions comprises all modulation states within one of the at least two sub-planes.

18. A method for transmitting data in a digital communication system, the method comprising:

a) selecting a subset of all available modulation states in a pre-determined modulation scheme, to be used for transmission;

b) a first transmission step of transmitting a first symbol representing a first plurality of bits, the first symbol having a first modulation state comprised in said subset; and c) at least one further transmission step of transmitting further symbols representing the first plurality of bits, each of the further symbols having a further modulation state comprised in said subset, wherein:

addition, for each combination of bit values, of complex values associated with said first and said further modulation states, yields the same phase of a complex result for all combinations of values of the bits within the plurality of bits, and wherein a first mapping and at least one further mapping are obtained from a common super-mapping by pre-pending a leading control word to a data word, wherein the super mapping maps concatenated values of the control word and the data word to modulation states, and each transmission is associated with a specific value of the control word.

19. A method for transmitting data in a digital communication system, the method comprising:

a) selecting a subset of all available modulation states in a pre-determined modulation scheme, to be used for transmission;

b) a first transmission step of transmitting a first symbol representing a first plurality of bits, the first symbol having a first modulation state comprised in said subset; and c) at least one further transmission step of transmitting further symbols representing the first plurality of bits, each of the further symbols having a further modulation state comprised in said subset, wherein:

addition, for each combination of bit values, of complex values associated with said first and said further modulation states, yields the same phase of a complex result for all combinations of values of the bits within the plurality of bits, and wherein:

step a) further comprises replacing at least one bit out of the first plurality of bits by a fixed value to obtain a second plurality of bits;

step b) further comprises mapping the second plurality of bits to the first symbol having the first modulation state according to a pre-defined mapping of bit sequences to modulation states; and step c) further comprises inverting bits of at least one subset of said second plurality of bits and keeping bits not comprised within said subset unchanged, to obtain at least one further plurality of bits and mapping said at least one further plurality of bits to the at least one further symbol having the at least one further modulation state according to said pre-defined mapping of bit sequences to modulation states.

20. The method of claim 19, wherein in step a) one bit out of the first plurality of bits is replaced by a fixed value to obtain a second plurality of bits, such that all modulation states that can be generated in step b) from said second plurality of bits lie within one half-plane of the complex plane representing said modulation states by their associated complex values.

21. The method of claim 19, wherein step c) further comprises inverting all bits comprised within a subset of said second plurality of bits, said subset being a subset of the set of combinations from one to all but one of said second plurality of bits; and step a) further comprises replacing said one bit out of the first plurality of bits corresponding to a bit from the second plurality of bits which is not comprised in the set of combinations, by a fixed value.

22. The method of claim 21, wherein said pre-defined mapping is a Gray mapping defining modulation states of a phase shift key modulation.

23. The method of claim 21, wherein said pre-defined mapping is a Gray mapping defining modulation states of a mixed modulation comprising amplitude shift key modulation and phase shift key modulation, and said first plurality of bits comprises an amplitude shift key set defining an absolute value of a complex value of a modulation state associated with said plurality of bits within said Gray mapping and a phase shift key set defining a phase value of a complex value of a modulation state associated with said plurality of bits within said Gray mapping;

and step c) further comprises:

i. at least one inverting sub-step, carried out on the amplitude shift key set, comprising:

inverting all bits comprised within one subset of said amplitude shift key set, said subset consisting of a bit which has an identical value for half of all pluralities of bits which are mapped to modulation states having the lowest transmission power of all existing modulation states, or inverting all bits comprised within one subset of said amplitude shift key set, said subset consisting of a bit which has an identical value for half of all pluralities of bits which are mapped to modulation states having the highest transmission power of all existing modulation states; or ii. at least one inverting sub-step carried out on the phase shift key set.

24. The method of claim 21, wherein said pre-defined mapping is a Gray mapping defining a modulation comprising a first component and a second component, said second component being essentially orthogonal to said first component, and wherein said first plurality of bits comprises a first set of bits associated with said first component according to a second Gray mapping of bit sequences to a first set of modulation states, and a second set of bits associated with said second component according to a third Gray mapping of bit sequences to a second set of modulation states, wherein step c) comprises the sub-steps of i. inverting a bit comprised within said first set of bits, said bit having an identical value for half of all pluralities of bits which are mapped to modulation states having the lowest transmission power of all existing modulation states within said first set of modulation states according to said second Gray mapping; or inverting a bit comprised within said first set of bits, said bit having an identical value for half of all pluralities of bits which are mapped to modulation states having the highest transmission power of all existing modulation states within said first set of modulation states according to said second Gray mapping; and ii. inverting a bit comprised within said second set of bits, said bit having an identical value for all pluralities of bits which are mapped to said second set of modulation states having an identical sign of said second component of said complex value of said second set of modulation states associated with said plurality of bits within said third Gray mapping.

25. The method of claim 24, wherein said modulation is a square quadrature amplitude modulation.

26. The method of claim 19, further comprising the step of transmitting information related to the identity of said at least one bit out of the first plurality of bits, which is replaced by a fixed value.

* * * * *